(12) United States Patent
Lee et al.

(10) Patent No.: US 12,468,144 B2
(45) Date of Patent: Nov. 11, 2025

(54) ACTUATOR DEVICE

(71) Applicant: LG INNOTEK CO., LTD., Seoul (KR)

(72) Inventors: Sung Guk Lee, Seoul (KR); Seong Min Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 46 days.

(21) Appl. No.: 18/265,878

(22) PCT Filed: Jan. 12, 2022

(86) PCT No.: PCT/KR2022/000515
§ 371 (c)(1),
(2) Date: Jun. 7, 2023

(87) PCT Pub. No.: WO2022/164083
PCT Pub. Date: Aug. 4, 2022

(65) Prior Publication Data
US 2024/0036304 A1    Feb. 1, 2024

(30) Foreign Application Priority Data

Jan. 29, 2021   (KR) .......................... 10-2021-0013161
Mar. 24, 2021   (KR) .......................... 10-2021-0038367

(51) Int. Cl.
*G02B 26/08*    (2006.01)
*G02B 7/09*    (2021.01)
(Continued)

(52) U.S. Cl.
CPC ............. *G02B 26/085* (2013.01); *G02B 7/09* (2013.01); *G02B 27/646* (2013.01); *G03B 3/10* (2013.01); *G03B 2205/0069* (2013.01)

(58) Field of Classification Search
CPC .......................... G02B 13/0065; G02B 27/646
See application file for complete search history.

(56) References Cited

U.S. PATENT DOCUMENTS

2018/0321504 A1    11/2018  Hu et al.
2020/0348479 A1*   11/2020  Kwon .................... G03B 17/12
(Continued)

FOREIGN PATENT DOCUMENTS

| CN | 111917946 | 11/2010 |
|----|-----------|---------|
| CN | 212391698 | 1/2021  |

(Continued)

OTHER PUBLICATIONS

International Search Report dated Apr. 18, 2022 issued in Application No. PCT/KR2022/000515.
(Continued)

*Primary Examiner* — Noam Reisner
(74) *Attorney, Agent, or Firm* — KED & ASSOCIATES, LLP

(57) ABSTRACT

A first embodiment of the present invention relates to an actuator device comprising: a housing; a holder disposed inside the housing; a reflective member disposed on the holder; a moving plate disposed between the housing and the holder; a rigid mover coupled to the holder; and a damper coupled to the rigid mover, wherein the rigid mover comprises a protruding portion coupled to the housing by the damper.

20 Claims, 52 Drawing Sheets

(51) Int. Cl.
 *G02B 27/64* (2006.01)
 *G03B 3/10* (2021.01)

(56) References Cited

U.S. PATENT DOCUMENTS

2022/0082786 A1\* 3/2022 Chang ..................... G02B 7/08
2022/0217253 A1 7/2022 Tian et al.
2023/0209196 A1\* 6/2023 Lim ........................ G02B 7/18
 348/208.8

FOREIGN PATENT DOCUMENTS

| JP | 2020-126231 | 8/2020 |
| KR | 10-0415246 | 6/2004 |
| KR | 10-2019-0136083 | 12/2019 |
| KR | 10-2020-0111657 | 9/2020 |
| TW | 201908843 | 3/2019 |
| WO | WO 2018/216778 | 11/2018 |
| WO | WO 2020/228648 | 11/2020 |

OTHER PUBLICATIONS

European Search Report issued in Application No. 22746112.6 dated Nov. 29, 2024.
Taiwanese Office Action dated Sep. 10, 2025.

\* cited by examiner (a)            (b)

ACTUATOR DEVICE

CROSS-REFERENCE TO RELATED PATENT APPLICATIONS

This application is a U.S. National Stage Application under 35 U.S.C. § 371 of PCT Application No. PCT/KR2022/000515, filed Jan. 12, 2022, which claims priority to Korean Patent Application Nos. 10-2021-0013161, filed Jan. 29, 2021 and 10-2021-0038367, filed Mar. 24, 2021, whose entire disclosures are hereby incorporated by reference.

TECHNICAL FIELD

The present embodiment relates to an actuator device.

BACKGROUND ART

A camera device is a device that photographs a picture or video of a subject, and is installed in optical devices such as smartphones, drones, and vehicles.

In recent camera devices, there is a demand for optical image stabilization (OIS) function that corrects image shake caused by user movement to improve image quality, auto focus (AF) function that automatically adjusts the distance between the image sensor and the lens to align the focal length of the lens, and a zoom function that increases or decreases the magnification of a distant subject through a zoom lens.

Meanwhile, portable devices such as smartphones, tablet PCs, and laptops have built-in micro camera modules, and these camera modules may perform an autofocus (AF) function that aligns the focal length of the lens by automatically adjusting the distance between the image sensor and the lens.

A recent camera module can perform a zooming function of zooming up or zooming out by increasing or decreasing the magnification of a distant subject through a zoom lens.

In addition, recent camera modules employ image stabilization (IS) technology to correct or prevent image shaking due to camera movement caused by an unstable fixing device or a user's movement.

Such image stabilization (IS) technology comprises an optical image stabilizer (OIS) technology, an image stabilization technology using an image sensor, and the like.

OIS technology is a technology that corrects motion by changing the path of light, and image stabilization technology using an image sensor is a technology that corrects movement by mechanical and electronic methods, but OIS technology is being adopted more and more.

Meanwhile, a zoom actuator is used for the zooming function in the camera module, and friction torque is generated when a lens is moved due to the mechanical movement of the actuator, and such a frictional torque causes technical problems such as a decrease in driving force, an increase in power consumption, or a degradation in control characteristics.

In particular, in order to obtain the best optical characteristics by using pluralities of zoom lens groups in the camera module, the alignment between the pluralities of lens groups and the alignment between the pluralities of lens groups and the image sensor must be well matched, but when decentering, which is a phenomenon in which the center of a spherical surface between lens groups deviates from the optical axis, or tilting, which is a phenomenon of lens inclination, or a phenomenon in which the central axis of the lens group and the image sensor are not aligned occurs, the angle of view is changed or out of focus occurs and it will adversely affect picture quality or resolution.

Meanwhile, when increasing the separation distance in the region where friction occurs to reduce friction torque resistance when moving the lens for zooming function in the camera module, a technical inconsistency problem is occurring, in which lens decentering or lens tilting is deepened during zoom movement or zoom reversing.

Meanwhile, as the image sensor goes to a higher pixel, the resolution increases and the size of the pixel becomes smaller, and as the pixel becomes smaller, the amount of light received at the same time decreases. Therefore, as the resolution of a camera becomes higher, the image shaking due to hand shake that occurs when the shutter speed is slowed in a dark environment becomes more severe.

Accordingly, the OIS function has recently been essentially adopted in order to photograph an image without distortion using a high-resolution camera in a dark night or moving picture.

Meanwhile, OIS technology is a method of correcting image quality by moving the camera's lens or image sensor to correct the optical path, and in particular, OIS technology detects camera movement through a gyro sensor, and based on this, the distance the lens or image sensor needs to move is calculated.

For example, as for the OIS correction method, there are a lens movement method and a module tilting method. In the lens movement method, only the lens in the camera module is moved to realign the center of the image sensor and the optical axis. On the other hand, the module tilting method is a method of moving the entire module comprising the lens and image sensor.

Especially, the module tilting method has a wider correction range than the lens movement method, and since the focal length between the lens and the image sensor is fixed, there is an advantage in that image deformation can be minimized.

Meanwhile, in the case of the lens movement method, a position recognition sensor, for example, a Hall sensor is used to detect the position and movement of the lens. On the other hand, in the module tilting method, a photo reflector is used to detect the movement of the module. However, both methods use a gyro sensor to sense the movement of the camera user.

The OIS controller uses the data recognized by the gyro sensor to predict where the lens or module should move to compensate for the user's movement.

According to the recent technology trend, ultra-slim and ultra-small camera modules are required, but there is a space limitation for OIS operation in the ultra-small camera module, which makes it difficult to implement the OIS function applied to general large cameras, and there is a problem in that it is not possible to implement an ultra-small camera module when OIS driving is applied.

In addition, in the conventional OIS technology, within the limited size of the camera module, as the OIS driver is disposed on the side surface of the solid lens assembly, the size of the lens that is the object of the OIS is limited, making it difficult to secure the amount of light.

In particular, in order to obtain the best optical characteristics in a camera module, the alignment between pluralities of lens groups and the image sensor must be well matched during implementing OIS, but in the conventional OIS technology, there is a problem that when decentering, which is a phenomenon in which the center of a spherical surface between lens groups deviates from the optical axis, or tilting, which is a phenomenon of lens inclination occurs, the angle of view is changed or defocus occurs, thereby adversely affecting image quality or resolution.

In addition, in the conventional OIS technology, AF or zooming can be implemented at the same time as OIS driving, but due to the space constraints of the camera module and the position of the driving part of the existing OIS technology, the magnet for OIS and the magnet for AF or zooming are placed close to each other, thereby causing magnetic interference, and thus, there is a problem in that the OIS driving does not operate properly, thereby causing decentering or tilting phenomenon.

In addition, since the conventional OIS technology requires a mechanical driving device for lens movement or module tilting, there is a problem in that the structure is complicated and power consumption is increased.

Meanwhile, the content described in the item simply provides background information for the present disclosure and does not constitute the prior art.

DETAILED DESCRIPTION OF THE INVENTION

Technical Subject

A first embodiment of the present invention is intended to provide an actuator device in which an OIS function is implemented through tilting of a reflective member.

Furthermore, it is intended to provide an actuator device in which stable driving performance of a moving part is secured.

An object of the second embodiment of the present invention is to provide a lens assembly driving device and a camera module comprising the same capable of exhibiting the best optical characteristics by minimizing the occurrence of a decentering or tilting phenomenon through a rapid and accurate performance test.

Technical Solution

An actuator device according to a first embodiment of the present invention comprises: a housing; a holder disposed inside the housing; a reflective member disposed on the holder; a moving plate disposed between the housing and the holder; a rigid mover coupled to the holder; and a damper coupled to the rigid mover, wherein the rigid mover may comprise a protruding portion coupled to the housing by the damper.

The housing may comprise a groove in which at least a portion of the protruding portion is disposed.

The groove of the housing may be open to the outside of the housing.

The protruding portion of the rigid mover may comprise a first protruding region being protruded to one side and a second protruding region being protruded to the other side.

The groove of the housing may comprise a first groove in which at least a portion of the first protruding region is disposed and a second groove in which at least a portion of the second protruding region is disposed.

The protruding portion may be disposed in a central region of the rigid mover.

The groove of the housing may be larger than the protruding portion of the rigid mover, and may be spaced apart from the protruding portion in an initial state and during operation.

The groove of the housing and the protruding portion of the rigid mover may be in contact with each other by an external impact.

An actuator device according to a first embodiment of the present invention comprises: a housing; a holder disposed inside the housing; a reflective member disposed on the holder; a moving plate disposed between the housing and the holder; a rigid mover coupled to the holder; and a damper coupled to the rigid mover, wherein the rigid mover may comprise a protruding portion coupled with the housing by the damper.

An actuator device according to a first embodiment of the present invention comprises: a fixed part comprising a housing; a moving part that moves with respect to the fixed part; a moving plate disposed between the fixed part and the moving part; and a damper disposed between the fixed part and the moving part, wherein the moving part may comprise a rigid mover that is adhered to the housing by the damper.

The actuator device according to the first embodiment of the present invention comprises: a fixed part; a moving part moving against the fixed part; a moving plate disposed between the fixed part and the moving part; a first magnet disposed in the moving part and having a first surface; a second magnet disposed in the fixed part and having a second surface facing the first surface; a driving unit for tilting the moving part; and a damper disposed between the fixed part and the moving part wherein, the central axis of the first magnet is disposed to be eccentric with the central axis of the moving plate in a direction perpendicular to the first surface, and wherein the area of the first surface of the first magnet may be different from the area of the second surface of the second magnet.

The fixed part comprises a housing; the moving part comprises a holder disposed inside the housing, and a rigid mover coupled to the holder and disposed with the first magnet; and the damper may be disposed between the rigid mover and the housing.

The damper may be coupled to the rigid mover and the housing.

An actuator device according to a first embodiment of the present invention may comprise: a housing; a holder disposed inside the housing; a reflective member disposed in the holder; a moving plate disposed between the housing and the holder; a rigid mover coupled to the holder; and a damper connecting the rigid mover and the housing.

The first portion of the housing may be disposed between the rigid mover and the moving plate.

The damper may be disposed on at least one of an upper portion and a lower portion of the first portion of the housing.

The actuator device comprises: a first magnet disposed on the rigid mover; and a second magnet disposed in the housing and generating a repulsive force with the first magnet, wherein at least a portion of the second magnet is disposed between the first magnet and the moving plate, and may be disposed on the opposite side of the moving plate with respect to the first portion of the housing.

The rigid mover comprises: a body portion disposed on the opposite side of the moving plate with respect to the first portion of the housing, a coupling portion extending from the body portion and coupled to the holder, and a protruding portion protruding from the body portion, wherein the damper may connect the protruding portion of the rigid mover and the housing.

The housing comprises a groove at least a portion of the protruding portion of the rigid mover is disposed in the groove of the housing, and at least a portion of the damper may be disposed in the groove of the housing and between the protruding portion of the rigid mover and the housing.

The groove of the housing may comprise a first groove portion and a second groove portion recessed from the first groove portion, and at least a portion of the damper may be disposed in the second groove portion of the housing.

The protruding portion of the rigid mover may comprise a first protruding portion formed on an upper surface of the body portion of the rigid mover, and a second protruding portion formed on a lower surface of the body portion of the rigid mover.

The housing comprises: a first surface opposite to the upper surface of the body portion of the rigid mover; and a second surface opposite to the lower surface of the body portion of the rigid mover, wherein the housing comprises: a first groove formed in the first surface of the housing; and a second groove formed in the second surface of the housing, wherein at least a portion of the first protruding portion of the rigid mover is disposed in the first groove of the housing, and wherein at least a portion of the second protruding portion of the rigid mover may be disposed in the second groove of the housing.

The housing comprises two protrusions formed on the second surface of the housing, wherein the two projections are spaced the same distance from the second groove, wherein when the body portion of the rigid mover moves downward, the body portion of the rigid mover may be in contact with the two protrusions of the housing.

An adhesive for fixing the rigid mover to the holder is comprised, wherein the holder comprises a groove and pluralities of protrusions formed in the groove, wherein at least a portion of the coupling portion of the rigid mover is inserted into the groove, and wherein at least a portion of the adhesive may be disposed between the pluralities of protrusions of the holder.

The actuator device may comprise: a third magnet and a first coil for tilting the holder about a first axis; and a fourth magnet and a second coil for tilting the holder about a second axis perpendicular to the first axis.

The damper may have a viscosity.

The housing may comprise a hole, and the rigid mover may be formed as a member separate from the holder, and may be coupled to the holder passing through the hole of the housing.

A plate coupled to the housing to cover the rigid mover is comprised, wherein the housing may comprise a groove in which an adhesive for fixing the plate to the housing is disposed.

The rigid mover may be formed of a non-magnetic metal.

A camera device according to a first embodiment of the present invention comprises: a printed circuit board; an image sensor disposed on the printed circuit board; actuator device; and a lens disposed in an optical path formed by the reflective member of the actuator device and the image sensor.

An optical device according to a first embodiment of the present invention may comprise: a main body; a camera device disposed in the body; and a display disposed in the main body and outputting at least one of an image and an image photographed by the camera device.

An optical device according to a first embodiment of the present invention may comprise: a housing comprising a first portion; a holder disposed inside the housing; a reflective member disposed in the holder; a moving plate disposed between the first portion of the housing and the holder; a rigid mover, at least a portion of which is disposed at the opposite side of the moving plate with respect to the first portion of the housing and is coupled to the holder; a first magnet disposed in the rigid mover; a second magnet disposed in the housing and generating a repulsive force with the first magnet; and a damper disposed between the rigid mover and the housing and having a viscosity.

The rigid mover comprises: a body portion disposed opposite to the moving plate with respect to the first portion of the housing; a coupling portion extending from the body portion and coupled to the holder, and a protruding portion protruding from the body portion and, wherein the damper may connect the protruding portion of the rigid mover and the housing.

The coupling portion may comprise two coupling portions being protruded from both sides of the body portion, wherein the protruding portion may comprise two protruding portions being protruded from the body portion in up and down directions.

Grease disposed between the moving plate and the housing may be comprised.

The actuator device according to the first embodiment of the present invention may comprise: a housing comprising a first portion; a holder disposed inside the housing; a reflective member disposed in the holder; a moving plate disposed between the first portion of the housing and the holder; a rigid mover at least a portion of which is disposed at the opposite side of the moving plate with respect to the first portion of the housing and is coupled to the holder to press the holder in the direction of the moving plate; a magnet and a coil for tilting the holder; and a damper disposed in the rigid mover.

A lens driving device according to a second embodiment of the present invention comprises: a housing; a lens assembly disposed inside the housing and comprising a lens barrel; a first driving unit disposed on the lens assembly; and a second driving unit facing the first driving unit, wherein an inclined surface having a different height from one side end to the other side end is disposed on a side surface of the lens barrel.

Advantageous Effects

Stable driving performance of moving parts can be secured through the first embodiment of the present invention.

Furthermore, FRA characteristics may be improved by sufficiently securing a phase margin due to the deposition of the damper.

In more detail, by applying a bond of a gel component that acts as a damper between the housing and the rigid mover, the responsiveness of the actuator can be increased by maintaining a gain value but securing a phase margin.

Through the second embodiment of the present invention, not only the optical performance of the lens can be easily measured through an inclined surface during the assembly process of a camera module, but also the maintenance of the components inside the module is easy during use.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

The direction of the optical axis used hereinafter is defined as the direction of the optical axis of each lens group coupled to the lens driving device.

Hereinafter, a reflective member driving device according to a first embodiment of the present invention will be described with reference to the drawings.

Figure 9:
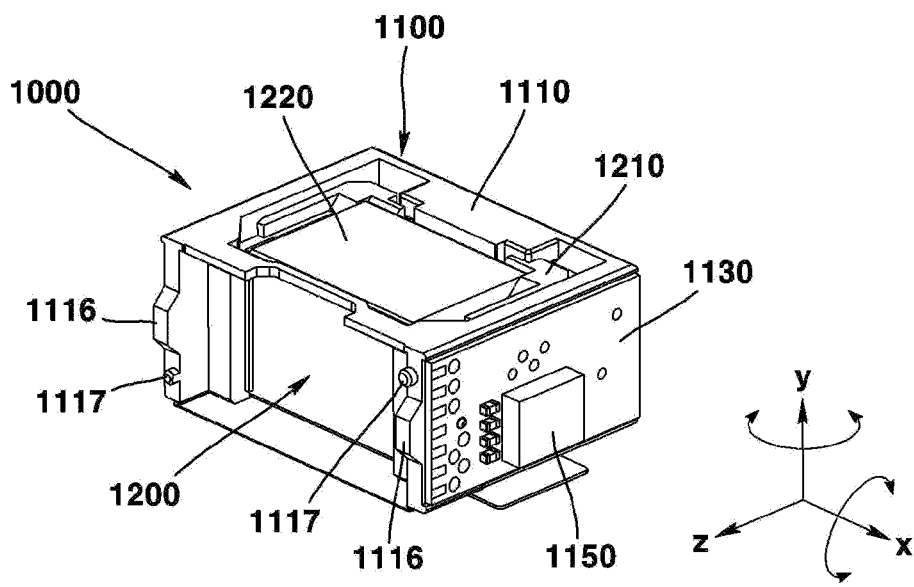
FIG. 9 is a perspective view of a reflective member driving device according to a first embodiment of the present invention.
Figure 10:
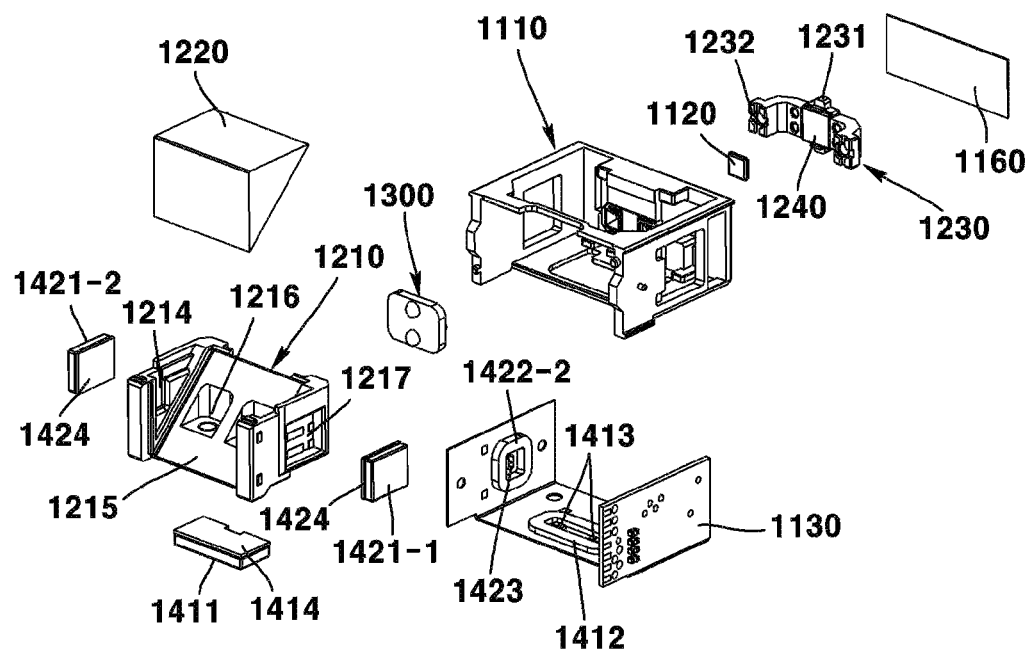
FIG. 10 is an exploded perspective view of a reflective member driving device according to a first embodiment of the present invention.
Figure 11:
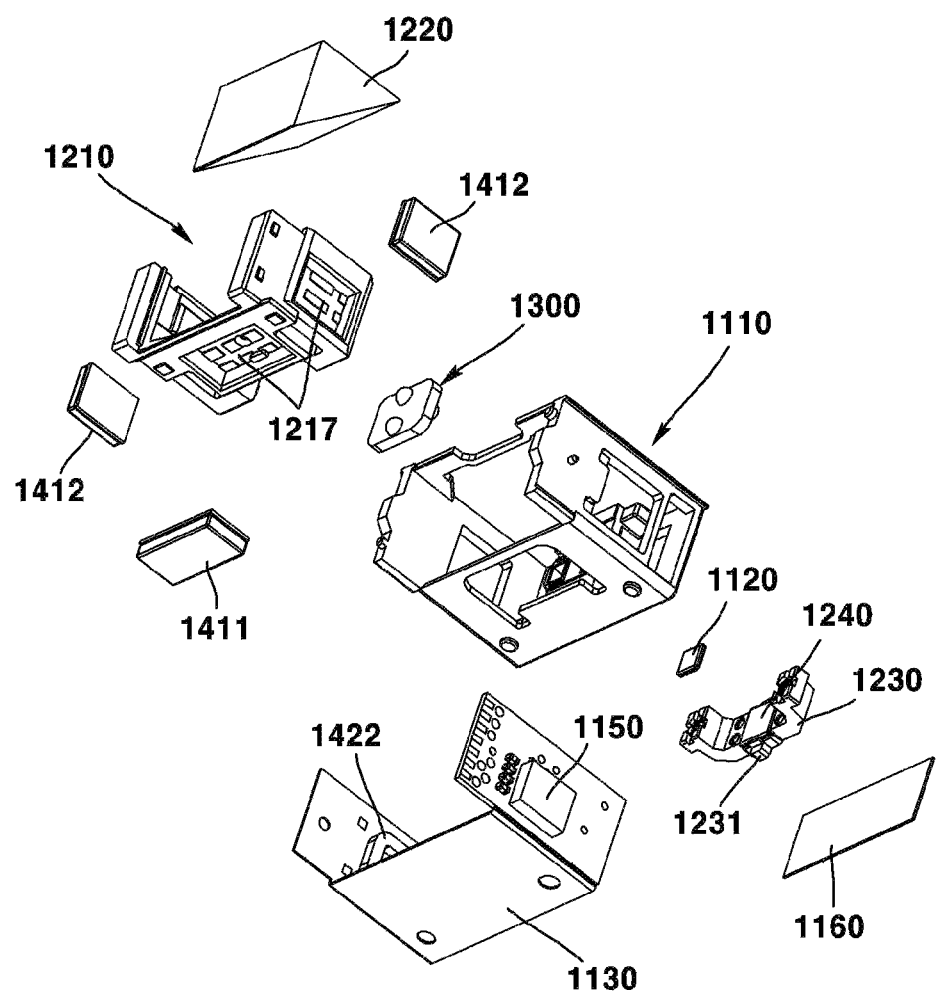
FIG. 11 is a bottom exploded perspective view of a reflective member driving device according to a first embodiment of the present invention.
Figure 12:
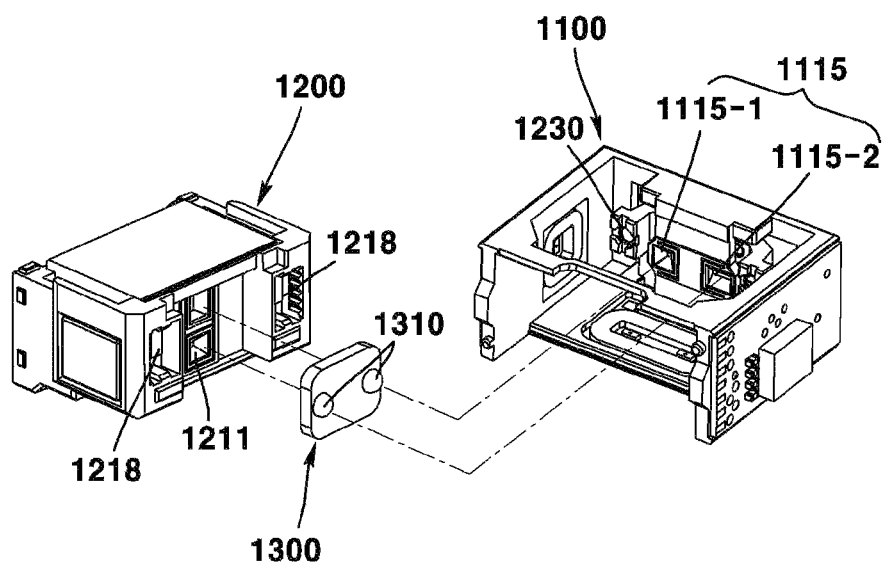
FIGS. 12 and 13 are diagrams for explaining a structure related to a moving plate of a reflective member driving device according to a first embodiment of the present invention.
Figure 13:
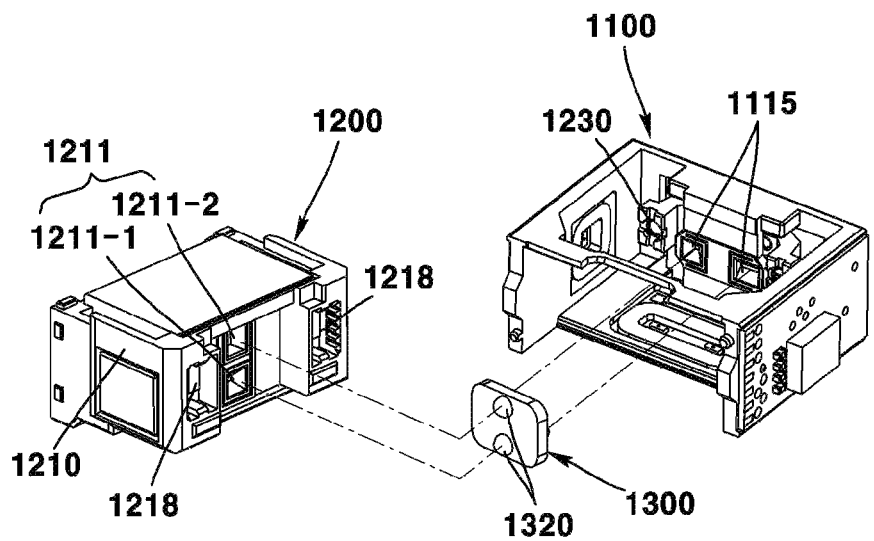
Figure 14:
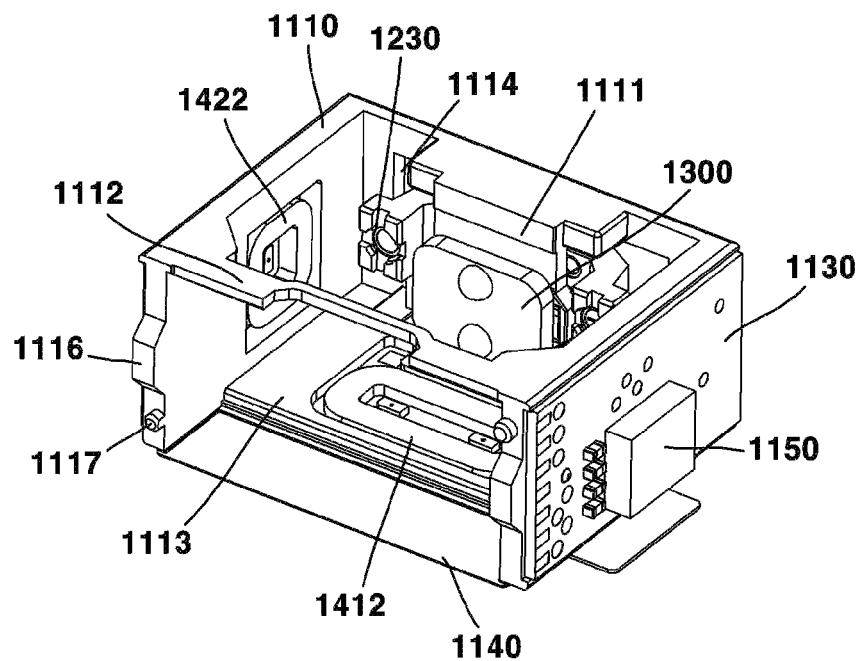
FIG. 14 is a perspective view of a state in which the configuration of a moving part of a reflective member driving device according to a first embodiment of the present invention is omitted.
Figure 15:
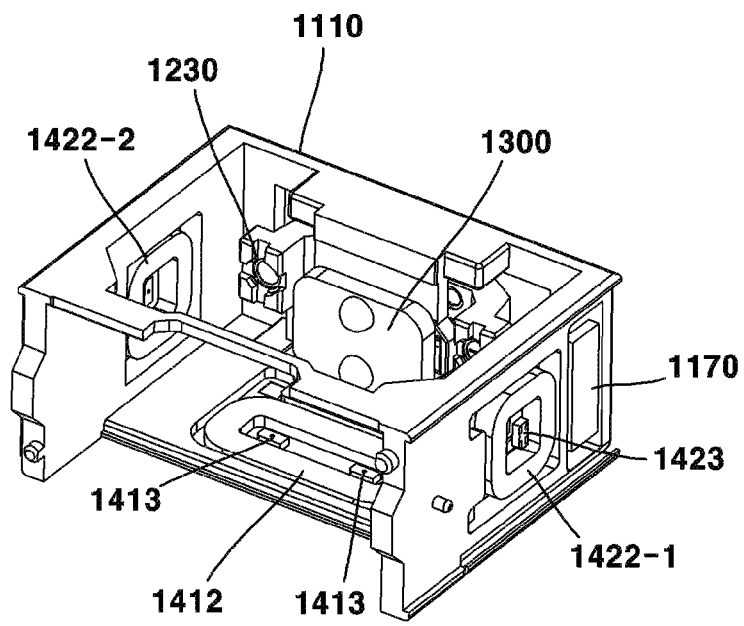
FIG. 15 is a perspective view of the reflective member driving device of FIG. 14 in a state in which components such as a substrate are omitted.
Figure 16:
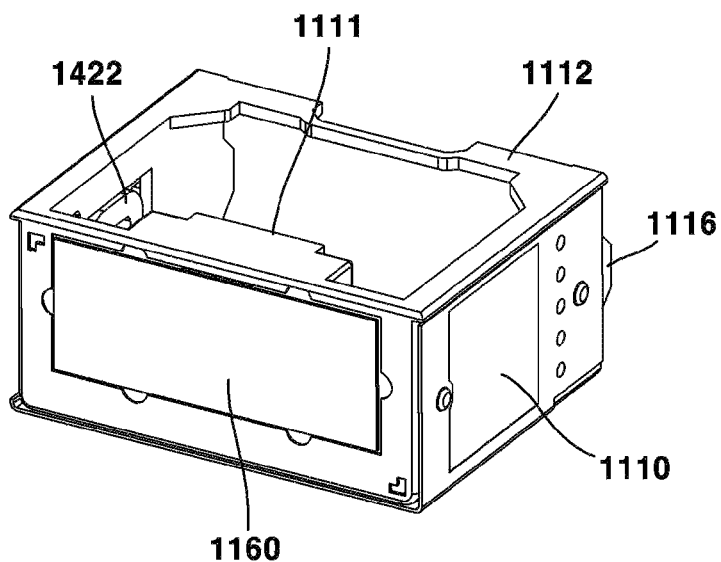
FIG. 16 is a perspective view illustrating a fixed part and related configuration of a reflective member driving device according to a first embodiment of the present invention.
Figure 17:
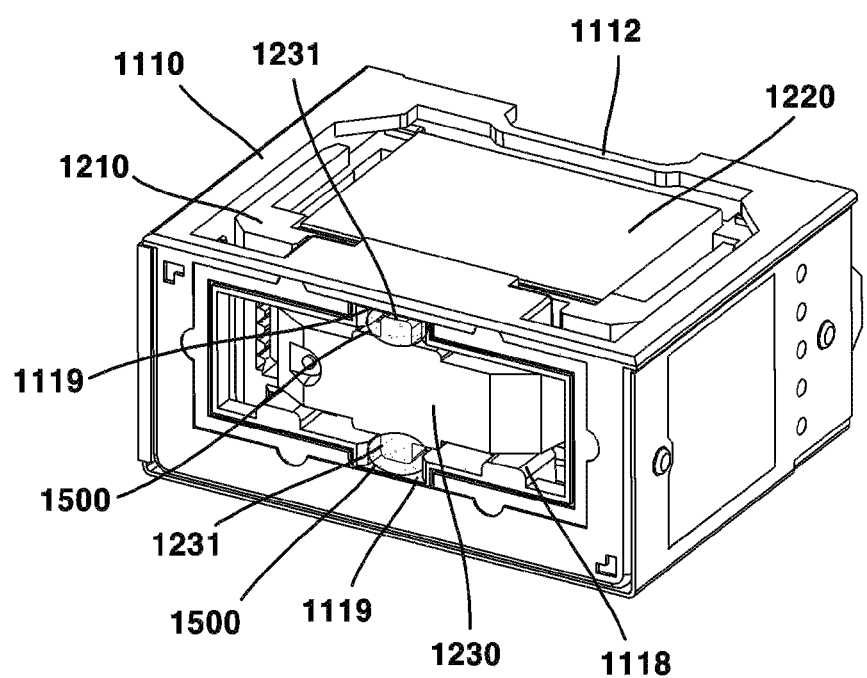
FIG. 17 is a perspective view illustrating a state in which a moving part is disposed in a fixed part in a reflective member driving device according to a first embodiment of the present invention.
Figure 18:
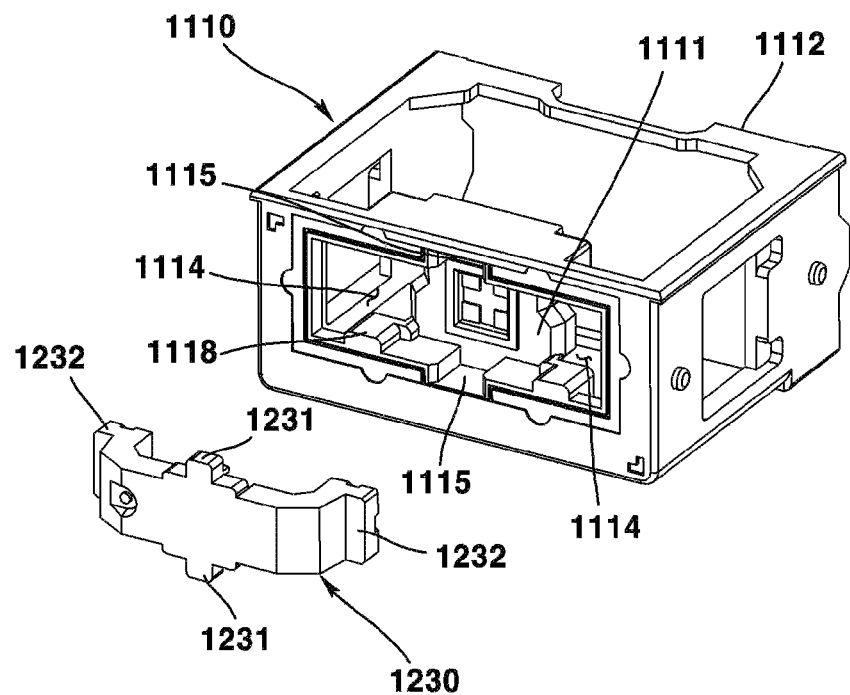
FIG. 18 is an exploded perspective view illustrating the related shapes of a rigid mover and the fixed part of a reflective member driving device according to a first embodiment of the present invention.
Figure 19:
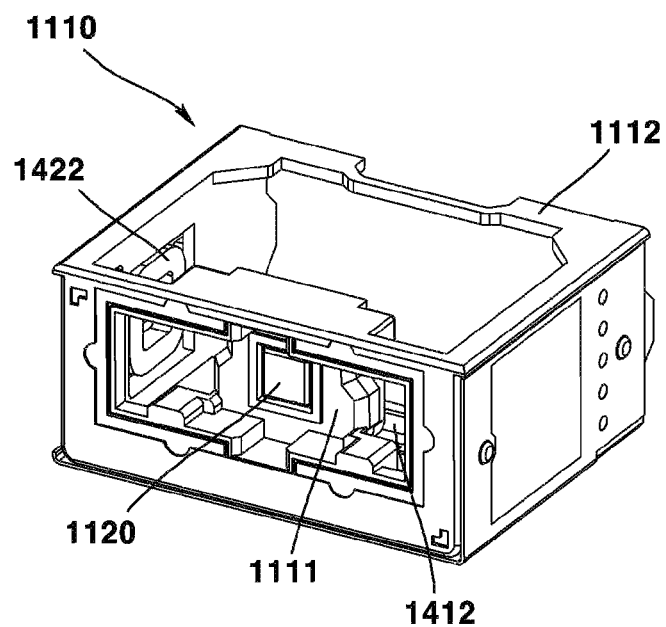
FIG. 19 is a perspective view illustrating an arrangement state of a second magnet of a fixed part of a reflective member driving device according to a first embodiment of the present invention.
Figure 20:
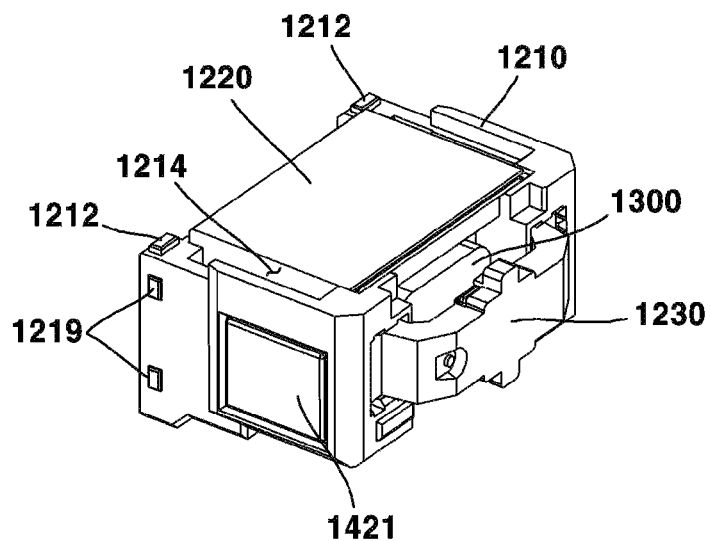
FIG. 20 is a perspective view illustrating a coupling state between a holder of a reflective member driving device and a rigid mover according to a first embodiment of the present invention.
Figure 21:
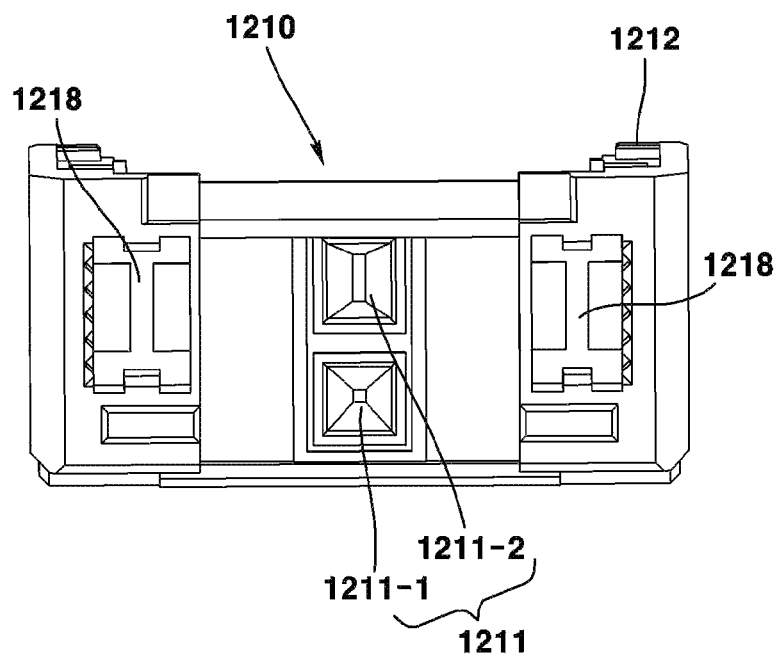
FIG. 21 is a front view illustrating a holder of a reflective member driving device according to a first embodiment of the present invention.
Figure 22:
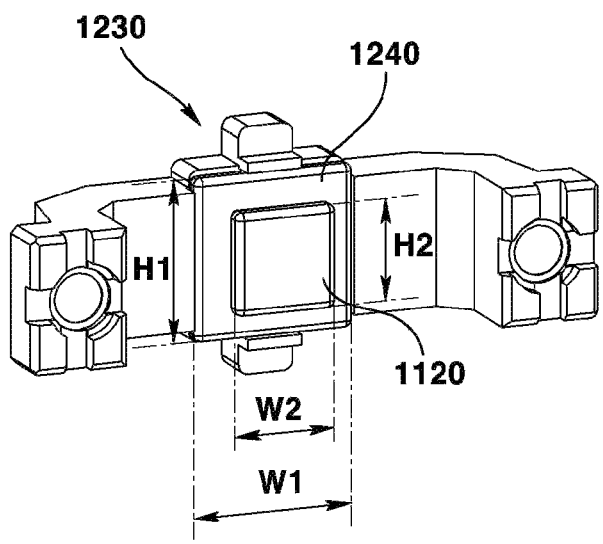
FIG. 22 is a perspective view illustrating a rigid mover, a first magnet, and a second magnet of a reflective member driving device according to a first embodiment of the present invention.
Figure 23:
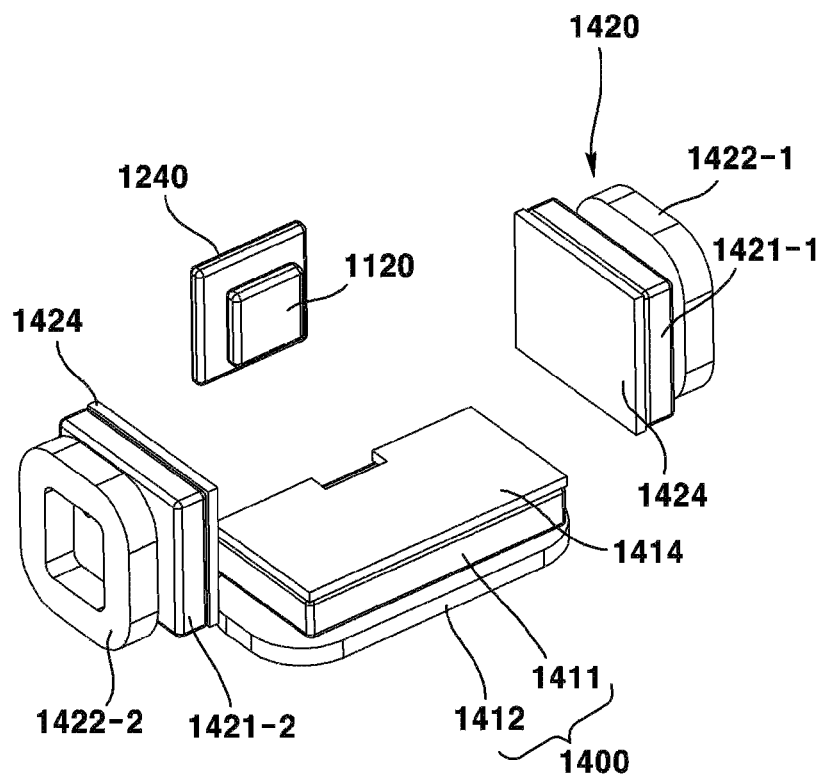
FIG. 23 is a perspective view illustrating a first magnet, a second magnet, and a driving unit of a reflective member driving device according to a first embodiment of the present invention.
Figure 24:
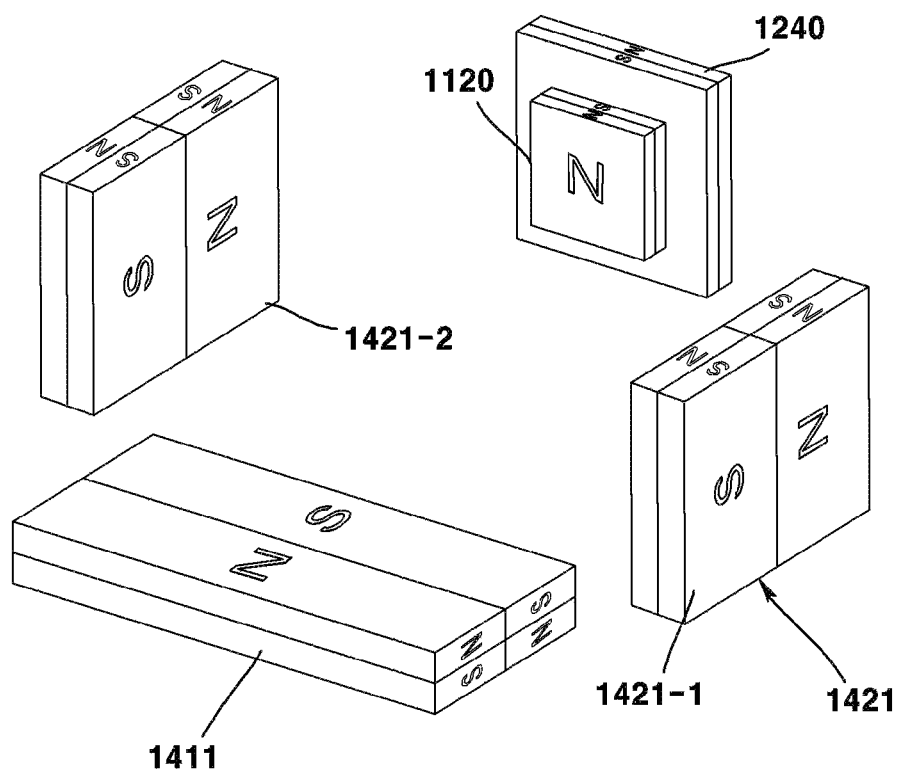
FIG. 24 is a perspective view illustrating a first magnet, a second magnet, and a driving magnet of a reflective member driving device according to a first embodiment of the present invention.
Figure 25:
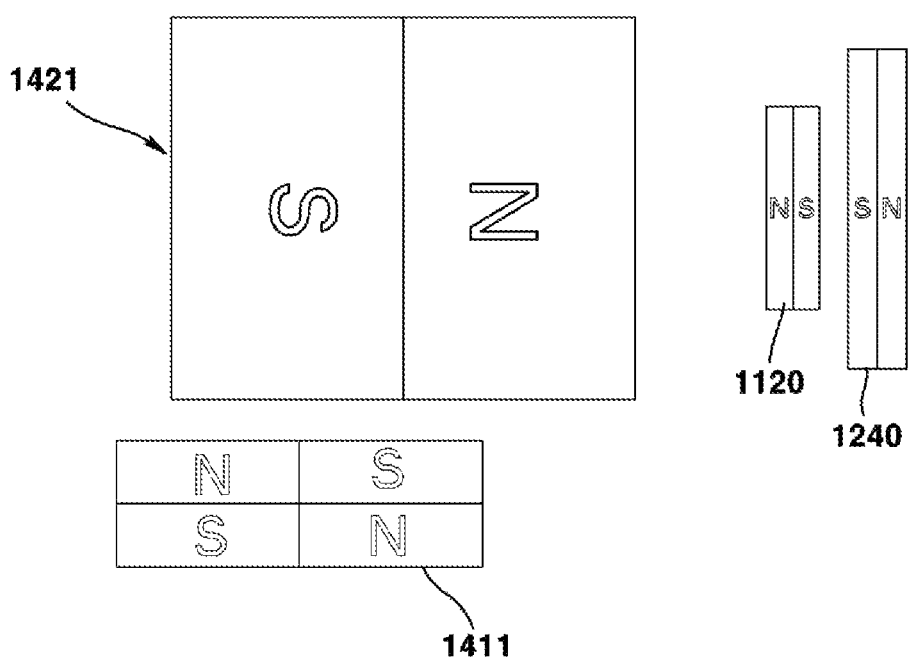
FIG. 25 is a side view illustrating a first magnet, a second magnet, and a driving magnet of a reflective member driving device according to a first embodiment of the present invention.
Figure 26:
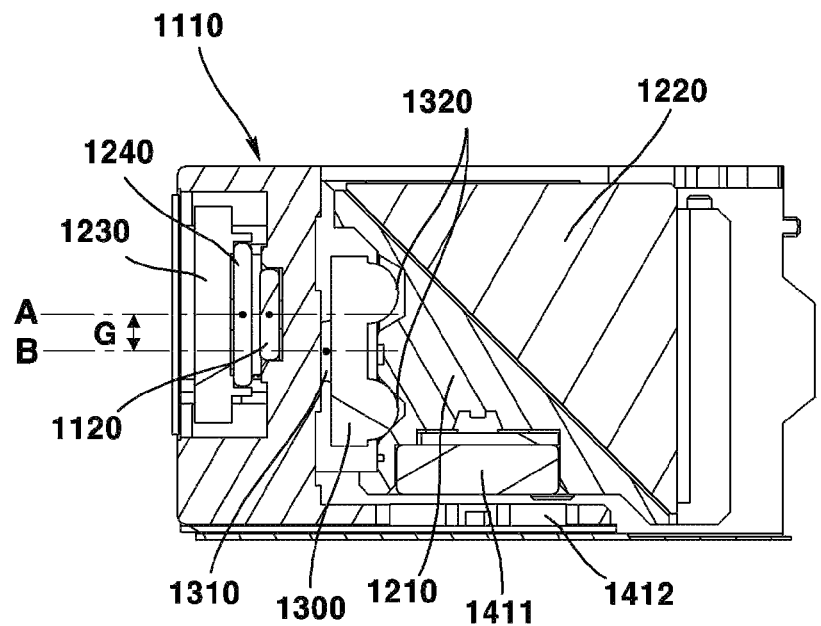
FIG. 26 is a cross-sectional view of a reflective member driving device according to a first embodiment of the present invention.
Figure 27:
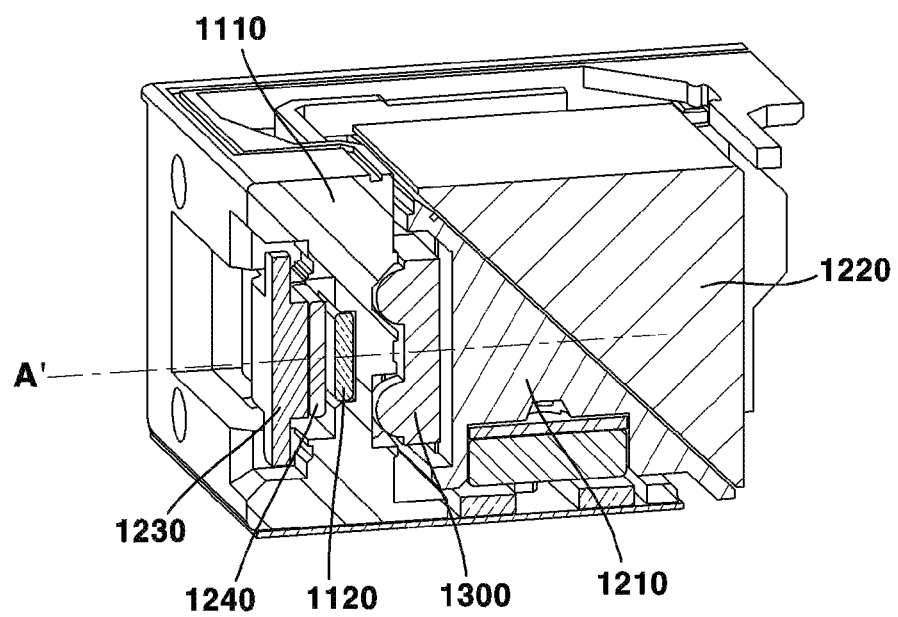
FIG. 27 is a cross-sectional perspective view of a reflective member driving device according to a modified example.
Figure 28:
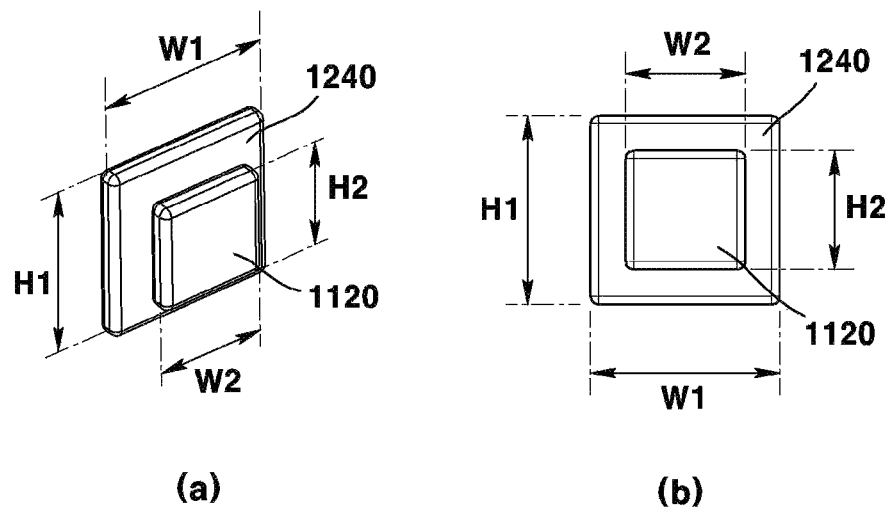
FIG. 28(*a*) is a perspective view, and (b) is a rear side view illustrating a first magnet and a second magnet of a reflective member driving device according to a first embodiment of the present invention.
Figure 29:
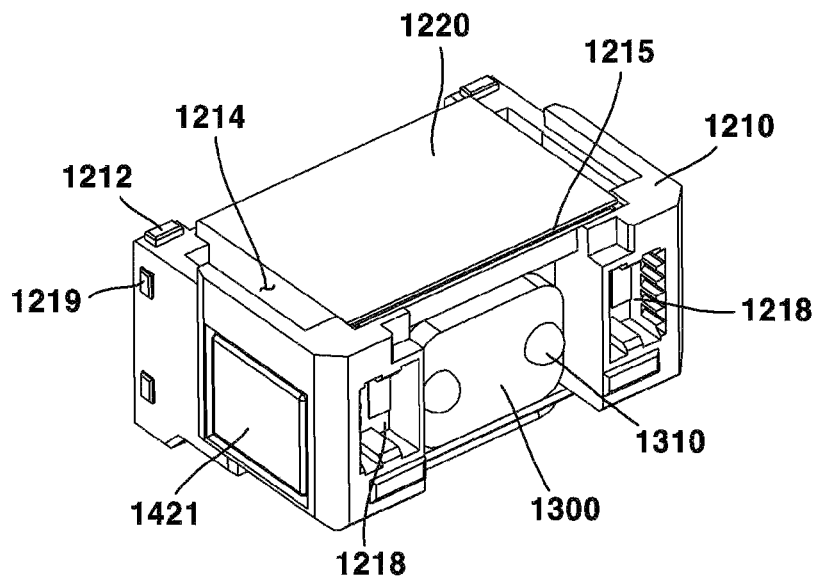
FIG. 29 is a perspective view illustrating a state in which a moving plate is disposed in a moving part of a reflective member driving device according to a first embodiment of the present invention.

FIG. 9 is a perspective view of a reflective member driving device according to a first embodiment of the present invention; FIG. 10 is an exploded perspective view of a reflective member driving device according to a first embodiment of the present invention; FIG. 11 is a bottom exploded perspective view of a reflective member driving device according to a first embodiment of the present invention; FIGS. 12 and 13 are diagrams for explaining a structure related to a moving plate of a reflective member driving device according to a first embodiment of the present invention; FIG. 14 is a perspective view of a state in which the configuration of a moving part of a reflective member driving device according to a first embodiment of the present invention is omitted; FIG. 15 is a perspective view of the reflective member driving device of FIG. 14 in a state in which components such as a substrate are omitted; FIG. 16 is a perspective view illustrating a fixed part and related configuration of a reflective member driving device according to a first embodiment of the present invention; FIG. 17 is a perspective view illustrating a state in which a moving part is disposed in a fixed part in a reflective member driving device according to a first embodiment of the present invention; FIG. 18 is an exploded perspective view illustrating the related shapes of a rigid mover and the fixed part of a reflective member driving device according to a first embodiment of the present invention; FIG. 19 is a perspective view illustrating an arrangement state of a second magnet of a fixed part of a reflective member driving device according to a first embodiment of the present invention; FIG. 20 is a perspective view illustrating a coupling state between a holder of a reflective member driving device and a rigid mover according to a first embodiment of the present invention; FIG. 21 is a front view illustrating a holder of a reflective member driving device according to a first embodiment of the present invention; FIG. 22 is a perspective view illustrating a rigid mover, a first magnet, and a second magnet of a reflective member driving device according to a first embodiment of the present invention; FIG. 23 is a perspective view illustrating a first magnet, a second magnet, and a driving unit of a reflective member driving device according to a first embodiment of the present invention; FIG. 24 is a perspective view illustrating a first magnet, a second magnet, and a driving magnet of a reflective member driving device according to a first embodiment of the present invention; FIG. 25 is a side view illustrating a first magnet, a second magnet, and a driving magnet of a reflective member driving device according to a first embodiment of the present invention; FIG. 26 is a cross-sectional view of a reflective member driving device according to a first embodiment of the present invention; FIG. 27 is a cross-sectional perspective view of a reflective member driving device according to a modified example; FIG. 28(a) is a perspective view, and (b) is a rear side view illustrating a first magnet and a second magnet of a reflective member driving device according to a first embodiment of the present invention; and FIG. 29 is a perspective view illustrating a state in which a moving plate is disposed in a moving part of a reflective member driving device according to a first embodiment of the present invention.

A reflective member driving device 1000 may perform optical image stabilization (OIS) function. The reflective member driving device 1000 may perform a handshake correction function. The reflective member driving device 1000 may move the reflective member 1220. The reflective member driving device 1000 may tilt the reflective member 1220. The reflective member driving device 1000 may tilt the reflective member 1220 around two axes. The reflective member driving device 1000 may tilt the reflective member 1220 about the x-axis and the y-axis. The x-axis and the y-axis may be perpendicular to each other.

The reflective member driving device 1000 may be a reflective member actuator. The reflective member driving device 1000 may be an OIS actuator. The reflective member driving device 1000 may be an OIS driving device. The reflective member driving device 1000 may be a prism driving device. The reflective member driving device 1000 may be an actuator. The reflective member driving device 1000 may be an actuator device. The reflective member driving device 1000 may be an actuator driving device. The reflective member driving device 1000 may be a tilting device.

The reflective member driving device 1000 may comprise a fixed part 1100. The fixed part 1100 may be a relatively fixed part when the moving part 1200 is moved. The fixed part 1100 may accommodate at least a portion of the moving part 1200. The fixed part 1100 may be disposed outside the moving part 1200.

The reflective member driving device 1000 may comprise a housing 1110. The fixed part 110 may comprise a housing 1110. The housing 1110 may be disposed outside the holder 1210. The housing 1110 may accommodate at least a portion of the holder 1210. The housing 1110 may comprise an opening or a hole in the upper plate and any one of the side plates for securing a path of light. The housing 1110 may comprise an upper plate, a lower plate, and pluralities of side plates.

The housing 1110 may comprise a first portion 1111. The first portion 1111 may be formed on a side plate of the housing 1110. A moving plate 1300 may be disposed on the first portion 1111. The first portion 1111 may be disposed between the holder 1210 and a rigid mover 1230. The first portion 1111 may be disposed between the rigid mover 1230 and the moving plate 1300. A second magnet 1120 may be disposed on the first portion 1111. The moving plate 1300 may be disposed on one side of the first portion 1111 and the second magnet 1120 may be disposed on the other side of the opposite side. A portion of the housing 1110 may be disposed between the moving plate 1300 and the rigid mover 1230.

The housing 1110 may comprise a second portion 1112. The second portion 1112 may be disposed on the holder 1210. The second portion 1112 may be in contact with the holder 1210 when the holder 1210 moves upward. The second portion 1112 may be overlapped with the holder 1210 in the moving direction of the holder 1210. The second portion 1112 may be an upper plate of the housing 1110.

The housing 1110 may comprise a third portion 1113. The third portion 1113 may be disposed below the holder 1210. The third portion 1113 may be in contact with the holder 1210 when the holder 1210 moves downward. The third portion 1113 may be overlapped with the holder 1210 in the moving direction. The third portion 1113 may be a lower plate of the housing 1110.

The housing 1110 may comprise a hole 1114. The hole 1114 may be a rigid mover through hole. The hole 1114 may be formed in the side plate of the housing 1110. The hole 1114 may be formed in the first portion 1111 of the housing 1110. A rigid mover 1230 may be disposed in the hole 1114. The rigid mover 1230 may be disposed to pass through the hole 1114. The hole 1114 may be formed to be larger than the movement space of the rigid mover 1230 so as not to interfere with the rigid mover 1230. The housing 1110 may comprise two holes 1114 into which the rigid mover 1230 is inserted.

The housing 1110 may comprise a groove 1115. The groove 1115 may be an accommodating groove of a first protrusion of the moving plate. A first protrusion 1310 of the moving plate 1300 may be disposed in the groove 1115. The groove 1115 may accommodate at least a portion of the moving plate 1300. The groove 1115 may arrest the movement except for rotation of the first protrusion 1310 of the moving plate 1300. The groove 1115 may comprise an inclined surface being in contact with the first protrusion 1310 of the moving plate 1300. An inclined surface may comprise pluralities of inclined surfaces.

The housing 1110 may comprise pluralities of grooves 1115 in which pluralities of first protrusions 1310 are disposed. The pluralities of grooves 1115 of the housing 1110 may comprise: a first groove 1115-1 in contact with a first protrusion 1310 among pluralities of first protrusions 1310 at four point; and a second groove 1115-2 in contact with the first protrusion 1310 of the other one among the pluralities of first protrusions 1310 at two points.

The groove 1115 may comprise a first groove 1115-1. The first groove 1115-1 may be a four-point contact groove. The first groove 1115-1 may be in contact with one among the two first protrusions 1310 of the moving plate 1300 at four points. Through this, the first groove 1115-1 of the housing 1110 may arrest the movement in four directions, up, down, left, and right except for rotation of one among the first protrusions 1310 of the moving plate 1300.

The groove 1115 may comprise a second groove 1115-2. The second groove 1115-2 may be a two-point contact groove. The second groove 1115-2 may be in contact with the other one among the two first protrusions 1310 of the moving plate 1300 at two points. Through this, the second groove 1115-2 of the housing 1110 may arrest the movement of the other one among the first protrusions 1310 of the moving plate 1300 in two directions. For example, the second groove 1115-2 of the housing 1110 may arrest the up and down movement of the first protrusion 1310 of the moving plate 1300 and may not arrest the left to right movement.

The housing 1110 may comprise a protruding portion 1116. The protruding portion 1116 may be coupled to the lens driving device 2000. The protruding portion 1116 may be formed on a side plate of the housing 1110. The protruding portion 1116 may be formed on a side of the housing 1110 facing the lens driving device 2000. The protruding portion 1116 may have a trapezoidal cross-section. The protruding portion 1116 may be coupled to the housing 2110 of the lens driving device 2000. The protruding portion 1116 may be inserted into the first groove 2111 of the housing 2110 of the lens driving device 2000. The protruding portion 1116 may be coupled to the housing 2110 of the lens driving device 2000 by an adhesive.

The housing 1110 may comprise a protrusion 1117. The protrusion 1117 may be coupled to the lens driving device 2000. The protrusion 1117 may be formed on the side plate of the housing 1110. The protrusion 1117 may be formed on a side of the housing 1110 facing the lens driving device 2000. The protrusion 1117 may comprise a circular cross-section. The protrusion 1117 may be coupled to the housing 2110 of the lens driving device 2000. The protrusion 1117 may be inserted into the second groove 2112 of the housing 2110 of the lens driving device 2000. The protrusion 1117 may be coupled to the housing 2110 of the lens driving device 2000 by an adhesive.

The housing 1110 may comprise a protrusion 1118. The protrusion 1118 may be a protrusion to be in contact with the rigid mover. A protrusion 1118 may be formed on a second surface of the housing 1110. The protrusion 1118 may be in contact with the rigid mover 1230. The protrusion 1118 may be formed on an inner circumferential surface of the hole 1114 of the housing 1110 through which the rigid mover 1230 passes. The protrusion 1118 may be formed to be in contact with any one or more of the lower surface and the upper surface of the rigid mover 1230 when the rigid mover 1230 is moved. The protrusion 1118 can prevent the rigid mover 1230 from being separated and removed from the original position excessively.

The protrusion 1118 may comprise pluralities of protrusions. The protrusion 1118 may comprise two protrusions. The two protrusions may be spaced apart by the same distance as the second groove disposed below among the grooves 1119 of the housing 1110. When the body portion of the rigid mover 1230 moves downward, the body portion of the rigid mover 1230 may be in contact with the two protrusions 1118 of the housing 1110.

The housing 1110 may comprise a groove 1119. At least a portion of the protruding portion 1231 may be disposed in the groove 1119. A portion of the protruding portion 1231 may be disposed in the groove 1119. The groove 1119 may be open toward the outside of the housing 1110. The groove 1119 may be larger than the protruding portion 1231 of the rigid mover 1230. The groove 1119 may be spaced apart from the protruding portion 1231 of the rigid mover 1230. In an initial state in which power is not applied to the driving unit 1400, the groove 1119 may be spaced apart from the protruding portion 1231 of the rigid mover 1230. Even when power is applied to the driving unit 1400 to be driven, the groove 1119 may be spaced apart from the protruding portion 1231 of the rigid mover 1230. The groove 1119 of the housing 1110 and the protruding portion 1231 of the rigid mover 1230 may be in contact with each other by an external impact. That is, the groove 1119 of the housing 1110 and the protruding portion 1231 of the rigid mover 1230 do not come into contact within the normal driving range of the rigid mover 1230, and they can be in contact with each other when they are outside the normal driving range due to an impact. The groove 1119 of the housing 1110 and the protruding portion 1231 of the rigid mover 1230 may perform a stopper function upon impact.

The groove 1119 may comprise a first groove portion and a second groove portion recessed from the first groove portion. The groove 1119 may be formed as a two-step groove. The groove 1119 may have a double groove shape. A damper 1500 may be disposed in the second groove portion. A contact area between the damper 1500 and the housing 1110 may be increased by the second groove portion. The second groove portion may prevent the damper 1500 from flowing.

The groove 1119 may comprise pluralities of grooves. The groove 1119 may comprise a first groove in which at least a portion of the first protruding region of the rigid mover 1230 is disposed, and a second groove in which at least a portion of the second protruding region is disposed. The housing 1110 may comprise a first surface opposite to the upper surface of the body of the rigid mover 1230. The housing 1110 may comprise a second surface facing the lower surface of the body of the rigid mover 1230. The housing 1110 may comprise a first groove formed on the first surface of the housing 1110 and a second groove formed on the second surface of the housing 1110.

The reflective member driving device 1000 may comprise a second magnet 1120. The fixed part 1100 may comprise a second magnet 1120. The second magnet 1120 may be disposed in the fixed part 1100. The second magnet 1120 may be a second repulsive force magnet. The second magnet 1120 may be disposed in the housing 1110. The second magnet 1120 may be disposed on the first portion 1111 of the housing 1110. The second magnet 1120 may be disposed on the opposite side of the moving plate 1300 with respect to the first portion 1111 of the housing 1110. The second magnet 1120 may be disposed between the first magnet 1240 and the moving plate 1300. The second magnet 1120 may be disposed to face the first magnet 1240. The second magnet 1120 may generate a repulsive force with the first magnet 1240. The second magnet 1120 may be disposed to generate a repulsive force with the first magnet 1240. The second magnet 1120 may be disposed to face the same polarity as the first magnet 1240. The second magnet 1120 may push the first magnet 1240 out.

At least a portion of the second magnet 1120 may be disposed between the first magnet 1240 and the moving plate 1300. The second magnet 1120 may be disposed between the first magnet 1240 and the moving plate 1300. The center of the second magnet 1120 may be disposed at the same height as the center of the first magnet 1240.

In a first embodiment of the present invention, the driving unit 1400 may tilt the moving part 1200 With respect to the x-axis and the y-axis of the moving plate 1300 perpendicular to each other. At this time, in the y-axis direction, a horizontal axis passing through the center of the second magnet 1120 may be disposed to be eccentric with the x-axis of the moving plate 1300. The horizontal axis may be parallel to the x-axis.

In a direction passing through the x-axis, the center of the second magnet 1120 may not be eccentric with the y-axis. When viewed from the moving plate 1300 toward the first magnet 1240, the center of the second magnet 1120 may be disposed to coincide with the y-axis. The center of the second magnet 1120 may be disposed at the same height as the center of the first magnet 1240. The center of the second magnet 1120 may be disposed at the same height as the center of the first magnet 1240. The center of gravity of the second magnet 1120 may be disposed at the same height as the center of gravity of the first magnet 1240.

The second magnet 1120 may comprise a second surface disposed opposite to the first surface of the second magnet 1120. The first magnet 1240 may comprise a first surface facing the second surface of the second magnet 1120. The first surface of the first magnet 1240 may have the same polarity as the second surface of the second magnet 1120.

In a direction in which the first surface of the first driving magnet 1411 faces, the second magnet 1120 may be disposed so as not to be overlapped the first driving magnet 1411. In a direction in which the first surface of the second magnet 1120 faces, the second magnet 1120 may be disposed so as not to be overlapped with the first driving magnet 1411.

The reflective member driving device 1000 may comprise a substrate 1130. The fixed part 1100 may comprise a substrate 1130. The substrate 1130 may be a flexible printed circuit board (FPCB). The substrate 1130 may be a flexible printed circuit board. The substrate 1130 may be disposed in the housing 1110.

The reflective member driving device 1000 may comprise a suspension (SUS) 1140. The fixed part 1100 may comprise a SUS 1140. The suspension 1140 may be disposed on the substrate 1130. The suspension 1140 may be disposed on the outer surface of the substrate 1130. The suspension 1140 may reinforce the strength of the substrate 1130.

The reflective member driving device 1000 may comprise a gyro sensor 1150. The fixed part 1100 may comprise a gyro sensor 1150. The gyro sensor 1150 may detect shaking of the camera device 10. The shake detected by the gyro sensor 1150 may be offset through the hand shake correction function. The gyro sensor 1150 may be disposed on the substrate 1130. The gyro sensor 1150 may be disposed on an outer surface of the substrate 1130.

The reflective member driving device 1000 may comprise a plate 1160. The fixed part 1100 may comprise a plate 1160. The plate 1160 may be coupled to the housing 1110. The plate 1600 may cover up the rigid mover 1230. The plate 1600 may cover the rigid mover 1230. The plate 1160 may be disposed to cover the open portion of the housing 1110. The plate 1160 may be disposed to close the open front of the housing 1110. The plate 1160 may be formed of a metal plate. The housing 1110 may comprise a groove in which an adhesive for fixing the plate 1160 to the housing 1110 is disposed.

The reflective member driving device 1000 may comprise a driver IC 1170. The fixed part 1100 may comprise a driver IC 1170. The driver IC 1170 may be disposed on the substrate 1130. The driver IC 1170 may be electrically connected to the first coil 1412 and the second coil 1422. The driver IC 1170 may supply current to the first coil 1412 and the second coil 1422. The driver IC 1170 may control at least one of a voltage and a current applied to each of the first coil 1412 and the second coil 1422. The driver IC 1170 may be electrically connected to the Hall sensors 1413 and 1423. The driver IC 1170 may feedback-control the voltage and current applied to the first coil 1412 and the second coil 1422 through the position of the reflective member 1220 detected by the Hall sensors 1413 and 1423.

The reflective member driving device 1000 may comprise a moving part 1200. The moving part 1200 may be a moving part. The moving part 1200 may be a movable part. The moving part 1200 may be a mover. The moving part 1200 may move with respect to the fixed part 1100. The moving part 1200 may be tilted with respect to the fixed part 1100. The moving part 1200 may be disposed inside the fixed part 1100. At least a portion of the moving part 1200 may be spaced apart from the fixed part 1100.

In a first embodiment of the present invention, in an initial state in which no current is applied to the driving unit 1400, the moving part 1200 may be in contact with the fixed part 1100.

The reflective member driving device 1000 may comprise a holder 1210. The moving part 1200 may comprise a holder 1210. The holder 1210 may be disposed inside the housing 1110. The holder 1210 is movable with respect to the housing 1110. The holder 1210 may be tilted with respect to the housing 1110. At least a portion of the holder 1210 may be spaced apart from the housing 1110. The holder 1210 may be in contact with the housing 1110.

In a first embodiment of the present invention, the holder 1210 may move between the second portion 1112 and the third portion 1113 of the housing 1110 by a first driving unit 1410. In an initial state in which no current is applied to the first driving unit 1410, the holder 1210 may be in contact with the housing 1110. In the initial state, the holder 1210 may be in contact with the inner surface of the housing 1110 adjacent to the incident surface of the reflective member 1220. As current is applied to the driving unit 1400, the holder 1210 may be spaced apart from the inner surface of the housing 1110 and may be tilted with respect to the first axis of the moving plate 1300.

The holder 1210 may comprise a groove 1211. The groove 1211 may be an accommodating groove of a second protrusion of the moving plate. A second protrusion 1320 of the moving plate 1300 may be disposed in the groove 1211. The groove 1211 may accommodate at least a portion of the moving plate 1300. The groove 1211 may arrest the movement except for rotation of the second protrusion 1320 of the moving plate 1300. The groove 1211 may comprise an inclined surface being in contact with the second protrusion 1320 of the moving plate 1300. An inclined surface may comprise pluralities of inclined surfaces.

The holder 1210 may comprise pluralities of grooves 1211 in which pluralities of second protrusions 1320 are being disposed. The pluralities of grooves 1211 of the holder 1210 comprise a first groove 1211-1 in four-point contact with one of the second protrusions 1320 among the pluralities of second protrusions 1320, and pluralities of second protrusions 1320. It may comprise a second groove 1211-2 in two-point contact with the other second protrusion 1320.

The groove 1211 may comprise a first groove 1211-1. The first groove 1211-1 may be a four-point contact groove. The first groove 1211-1 may be in contact with one among the two second protrusions 1320 of the moving plate 1300 at four points. Through this, the first groove 1211-1 of the holder 1210 may arrest the movement in four directions, up, down, left, and right except for rotation of one among the second protrusions 1320 of the moving plate 1300.

The groove 1211 may comprise a second groove 1211-2. The second groove 1211-2 may be a two-point contact groove. The second groove 1211-2 may be in contact with the other one among the two second protrusions 1320 of the moving plate 1300 at two points. Through this, the second groove 1211-2 of the holder 1210 may arrest the movement of the other one among the second protrusions 1320 of the moving plate 1300 in two directions. For example, the second groove 1211-2 of the holder 1210 may arrest the movement in the left and right directions of the second protrusion 1320 of the moving plate 1300 and may not arrest the movement in up and down directions.

The holder 1210 may comprise a first protrusion 1212. The first protrusion 1212 may be an upper stopper. The first protrusion 1212 may be formed on an upper surface of the holder 1210. The first protrusion 1212 may be protruded from an upper surface of the holder 1210. The first protrusion 1212 may be in contact with the housing 1110 when the holder 1210 moves upward. The first protrusion 1212 may be in contact with the second portion 1112 of the housing 1110 when the holder 1210 moves upward.

The holder 1210 may comprise a second protrusion 1213. The second protrusion 1213 may be a lower stopper. The second protrusion 1213 may be formed on a lower surface of the holder 1210. The second protrusion 1213 may be protruded from a lower surface of the holder 1210. The second protrusion 1213 may be in contact with the housing 1110 when the holder 1210 moves downward. The second protrusion 1213 may be in contact with the third portion 1113 of the housing 1110 when the holder 1210 moves downward.

In a first embodiment of the present invention, in the initial state, the first protrusion 1212 of the holder 1210 may be in contact with the second portion 1112 of the housing 1110. The second protrusion 1213 of the holder 1210 may come into contact with the third portion 1113 of the housing 1110 by applying a current to the first driving unit 1410 or by impact.

The holder 1210 may comprise an adhesive accommodating groove 1214. The adhesive accommodating groove 1214 may receive an adhesive for fixing the reflective member 1220 to the holder 1210. The adhesive accommodating groove 1214 may be formed on a surface in contact with the reflective member 1220. An adhesive may be disposed in the adhesive accommodating groove 1214.

The holder 1210 may comprise a groove 1215. The groove 1215 may be a separation groove providing a separation space between the groove 1215 and the reflective member 1220. The groove 1215 may be formed on a surface in contact with the reflective member 1220. A contact area between the reflective member 1220 and the holder 1210 may be reduced by the groove 1215.

The holder 1210 may comprise a groove 1216. The groove 1216 may be a slimming groove. The groove 1216 may be formed in a central portion of the holder 1210. The weight of the holder 1210 may be reduced by the groove 1216.

The holder 1210 may comprise a magnet accommodating groove 1217. Driving magnets 1411 and 1421 may be disposed in the magnet accommodating groove 1217. The magnet accommodating groove 1217 may be formed in a shape corresponding to the driving magnets 1411 and 1421. The magnet accommodating groove 1217 may be concavely formed on a lower surface of the holder 1210. The magnet accommodating groove 1217 may be formed on a lower surface and both side surfaces of the holder 1210. The magnet accommodating groove 1217 may comprise pluralities of magnet accommodating grooves. The magnet accommodating groove 1217 may comprise a first magnet accommodating groove accommodating the first driving magnet 1411 and the yoke 1414. The magnet accommodating groove 1217 may comprise a second magnet accommodating groove accommodating the second driving magnet 1421 and the yoke 1424.

The holder 1210 may comprise a groove 1218. The groove 1218 may be a rigid mover accommodating groove. A coupling portion 1232 of the rigid mover 1230 may be disposed in the groove 1218. The groove 1218 may be formed in a shape corresponding to the coupling portion 1232 of the rigid mover 1230. The groove 1218 may comprise a groove in which an adhesive for fixing the coupling portion 1232 of the rigid mover 1230 to the holder 1210 is accommodated. The holder 1210 may comprise pluralities of protrusions formed inside the groove 1218. At least a portion of the coupling portion 1232 of the rigid mover 1230 may be inserted into the groove 1218. The reflective member driving device 1000 may comprise an adhesive for fixing the rigid mover 1230 to the holder 1210. At least a portion of the adhesive may be disposed between the pluralities of protrusions formed inside the grooves 1218 of the holder 1210. Through this, the coupling force between the rigid mover 1230 and the holder 1210 may be enhanced.

The holder 1210 may comprise a side stopper 1219. The side stopper 1219 may be formed on both sides of the holder 1210. The side stopper 1219 may be protruded from the side surface of the holder 1210. The side stopper 1219 may be in contact with the housing 1110 when the holder 1210 moves laterally. The side stopper 1219 may be in contact with the side plate of the housing 1110 when the holder 1210 moves laterally.

The reflective member driving device 1000 may comprise a reflective member 1220. The moving part 1200 may comprise a reflective member 1220. The reflective member 1220 may be disposed on the holder 1210. The reflective member 1220 may be disposed inside the holder 1210. The reflective member 1220 may be coupled to the holder 1210. The reflective member 1220 may be fixed to the holder 1210. The reflective member 1220 may be fixed to the holder 1210 by an adhesive. The reflective member 1220 may move integrally with the holder 1210. The reflective member 1220 may change the path of light. The reflective member 1220 may reflect light. The reflective member 1220 may comprise a prism. The reflective member 1220 may comprise a mirror. The reflective member 1220 may be formed in a triangular prism shape. An angle between a path of light incident to the reflective member 1220 and a path of exiting light may be 90 degrees.

The reflective member driving device 1000 may comprise a rigid mover 1230. The moving part 1200 may comprise a rigid mover 1230. The rigid mover 1230 may be coupled to the holder 1210. The rigid mover 1230 may be formed as a member separate from the holder 1210. The rigid mover 1230 may be coupled to the holder 1210 through the hole 1114 of the housing 1110. The rigid mover 1230 may be formed of a non-magnetic metal. A first magnet 1240 and a second magnet 1120 may be disposed between the rigid mover 1230 and the holder 1210. The first magnet 1240 and the second magnet 1120 may be disposed to face the same polarity and may repel each other. The first magnet 1240 fixed to the housing 1110 may push the second magnet 1120 outward. The rigid mover 1230 to which the second magnet 1120 is fixed by the repulsive force of the first magnet 1240 may also be pressed toward the outer side. The holder 1210 to which the rigid mover 1230 is fixed may also be pressed toward the outer side. Through this, the holder 1210 may press the moving plate 1300 against the housing 1110. Through this, the moving plate 1300 may be disposed between the holder 1210 and the housing 1110 without being separated and removed.

The rigid mover 1230 may comprise a protruding portion 1231. The protruding portion 1231 may be extended from the body portion of the rigid mover 1230. The protruding portion 1231 may be coupled to the housing 1110 by the damper 1500. The protruding portion 1231 may be disposed in a central region of the rigid mover 1230. The protruding portion 1231 may be formed in a central region of the rigid mover 1230. The protruding portion 1231 may be protruded from an upper surface of the body portion of the rigid mover 1230. The protruding portion 1231 may in contact with the housing 1110 when the rigid mover 1230 moves.

The protruding portion 1231 may comprise pluralities of protruding portions. The protruding portion 1231 of the rigid mover 1230 may comprise a first protruding portion formed on an upper surface of the body portion of the rigid mover 1230. It may comprise a second protruding portion formed on a lower surface of the body portion of the rigid mover 1230. At least a portion of the first protruding portion of the rigid mover 1230 may be disposed in the first groove of the housing 1110. At least a portion of the second protruding portion of the rigid mover 1230 may be disposed in the second groove of the housing 1110. The protruding portion 1231 may comprise a first protruding region being protruded to one side and a second protruding region being protruded to the other side. Each of the first and second protruding regions may be referred to as a protruding portion.

The rigid mover 1230 may comprise a body portion. The body portion may be disposed at an opposite side of the moving plate 1300 with respect to the first portion 1111 of the housing 1110. The rigid mover 1230 may comprise two coupling portions 1232 being protruded from both sides of the body portion. The rigid mover 1230 may comprise two protruding portions 1231 being protruded up and down directions from the body portion.

The rigid mover 1230 may comprise a coupling portion 1232. The coupling portion 1232 may be a leg portion. The coupling portion 1232 may be extended from the body portion of the rigid mover 1230. The coupling portion 1232 may pass through the hole 1114 of the housing 1110. The coupling portion 1232 may be coupled to the holder 1210. The coupling portion 1232 may be fixed to the holder 1210 by an adhesive. At least a portion of the coupling portion 1232 may be inserted into the groove 1218 of the holder 1210.

The reflective member driving device 1000 may comprise a first magnet 1240. The moving part 1200 may comprise a first magnet 1240. The first magnet 1240 may be disposed in the moving part 1200. The first magnet 1240 may be a first repulsive force magnet. The first magnet 1240 may be disposed in the rigid mover 1230. The first magnet 1240 may be disposed in the body portion of the rigid mover 1230. The first magnet 1240 may be disposed to face the second magnet 1120. The first magnet 1240 may be disposed to generate a repulsive force with the second magnet 1120. The first magnet 1240 may be disposed to face the same polarity as the second magnet 1120. The first magnet 1240 may push the second magnet 1120.

In a first embodiment of the present invention, with respect to the first optical axis, the central axis of the first magnet 1240 may be disposed to be eccentric with the central axis of the moving plate 1300. At this time, the first optical axis may be a z-axis. The first optical axis may be an axis perpendicular to the sensor surface of the image sensor 3400. The first optical axis may be an optical axis of lens groups disposed adjacent to the image sensor 3400.

As illustrated in FIG. 26, the horizontal central axis A of the first magnet 1240 and the second magnet 1120 may be eccentrically placed to have a gap G in the longitudinal direction with the horizontal central axis B of the moving plate 1300.

When viewed from the moving plate 1300 toward the first magnet 1240, the center of the first magnet 1240 may be disposed to be eccentric with the center of the moving plate 1300.

With respect to the facing surface, the horizontal axis passing through the central axis of the first magnet 1240 may be eccentric in the direction of the horizontal axis passing through the central axis of the moving plate 1300 and a second optical axis perpendicular to the first optical axis. At this time, the horizontal axis may be an x-axis. The horizontal axis may be disposed in a horizontal direction. The second optical axis may be a y-axis. The second optical axis may be an axis parallel to the sensor surface of the image sensor 3400. The second optical axis may be disposed in a vertical direction. With respect to the facing surface, the horizontal axis that meets or comes into contact with the central axis of the first magnet 1240 may be eccentric in the direction of the horizontal axis passing through the central axis of the moving plate 1300 and the second optical axis perpendicular to the first optical axis. The center of the first magnet 1240 may be disposed to be eccentric in the longitudinal direction with respect to the center of the moving plate 1300.

With respect to the facing surface, the vertical axis passing through the central axis of the first magnet 1240 may not be eccentric in the direction of the vertical axis and the horizontal axis passing through the central axis of the moving plate 1300. At this time, the horizontal axis may be an x-axis. The horizontal axis may be disposed in a horizontal direction. The second optical axis may be a y-axis. The second optical axis may be an axis parallel to the sensor surface of the image sensor 3400. The second optical axis may be disposed in a vertical direction. The center of the first magnet 1240 may be disposed so as not to be eccentric in the horizontal direction with respect to the center of the moving plate 1300.

With respect to the facing surface, a horizontal line passing through the center of the first magnet 1240 may be eccentric in the vertical direction from a horizontal line passing through the center of the moving plate 1300. With respect to the facing surface, the vertical line passing through the center of the first magnet 1240 may not be eccentric in the horizontal direction from the vertical line passing through the center of the moving plate 1300.

A horizontal axis of the first magnet 1240 may be disposed higher than a horizontal axis of the moving plate 1300. As a modified embodiment, the horizontal axis of the first magnet 1240 may be disposed lower than the horizontal axis of the moving plate 1300.

The first magnet 1240 and the second magnet 1120 may be disposed between the rigid mover 1230 and the moving plate 1300.

The size of the first magnet 1240 may be different from the size of the second magnet 1120. The first magnet 1240 may be formed in a size different from that of the second magnet 1120. The size of the first magnet 1240 may be larger than the size of the second magnet 1120. The first magnet 1240 may be formed to be larger than the second magnet 1120.

The area of the first surface of the first magnet 1240 may be larger than the area of the second surface of the second magnet 1120 facing the first surface. The first surface and the second surface are arbitrarily referred to as one of the two surfaces, and the other may be referred to as the second surface, and both may be referred to as the first surface. The first magnet 1240 may comprise a first surface. The second magnet 1120 may comprise a first surface facing the first surface of the first magnet 1240. The area of the first surface of the first magnet 1240 may be larger than the area of the first surface of the second magnet 1120.

The first surface of the first magnet 1240 may comprise a first side. The first surface of the second magnet 1120 may comprise a first side disposed in a direction corresponding to the first side of the first magnet 1240. The first side of the second magnet 1120 may be 55% to 75% of the first side of the first magnet 1240. The first side of the second magnet 1120 may be 60% to 66% of the first side of the first magnet 1240. The first side of the second magnet 1120 may be 62% to 64% of the first side of the first magnet 1240. The height H1 of the first magnet 1240 may be greater than the height H2 of the second magnet 1120. The width W1 of the first magnet 1240 may be greater than the width W2 of the second magnet 1120.

The area of the first surface of the second magnet 1120 may be 30% to 50% of the area of the first surface of the first magnet 1240. The area of the first surface of the second magnet 1120 may be 35% to 45% of the area of the first surface of the first magnet 1240. The area of the first surface of the second magnet 1120 may be 38% to 42% of the area of the first surface of the first magnet 1240.

The first magnet 1240 and the second magnet 1120 may be formed to have the same thickness. The volume of the second magnet 1120 may be 30% to 50% of the volume of the first magnet 1240.

When viewed from the second magnet 1120 toward the first magnet 1240, an edge region of the second magnet 1120 may be disposed inside the first surface of the first magnet 1240. The edge region may be a corner region. The edge region may be a corner. The first magnet 1240 may be disposed such that all regions of the second magnet 1120 are being overlapped with the first magnet 1240 in a first direction in which the first magnet 1240 faces the second magnet 1120. The first magnet 1240 may be disposed such that all regions of the second magnet 1120 are being overlapped with the first magnet 1240 in a first direction in which the first magnet 1240 faces the second magnet 1120.

As a modified embodiment, the size of the first magnet 1240 may be smaller than the size of the second magnet 1120. The second magnet 1120 may be formed to be larger than the first magnet 1240.

The central axes of the first magnet 1240 and the second magnet 1120 may coincide. However, in actual products, a tolerance of ±1% to ±2% may occur.

In a first embodiment of the present invention, the second magnet 1120 may comprise a second surface facing the first surface of the first magnet 1240. At this time, the central axis of the first magnet 1240 may be disposed to be eccentric with the central axis of the moving plate 1300 in a direction perpendicular to the first surface. The area of the first surface of the first magnet 1240 may be larger than the area of the second surface of the second magnet 1120.

In a first embodiment of the present invention, in an initial state in which no current is applied to the driving unit 1400, the moving part 1200 may be in contact with the fixed part 1100. When viewed from the second magnet 1120 toward the first magnet 1240, an edge of the first magnet 1240 may surround the second magnet 1120. When viewed from the second magnet 1120 toward the first magnet 1240, the second magnet 1120 may be disposed at an inner side of the corner of the first magnet 1240.

The first magnet 1240 may comprise a first surface facing the second magnet 1120 and a second surface opposite to the first surface. The first surface of the first magnet 1240 may comprise a first side and a second side shorter than the first side. The first side of the first magnet 1240 may be formed to be 1 mm to 5 mm. The second side of the first magnet 1240 may be formed to be 0.8 mm to 4 mm. A thickness between the first and second surfaces of the first magnet 1240 may be formed to be 0.1 mm to 0.5 mm.

In a first embodiment of the present invention, the force Fx formed by the first driving unit 1410 may be within 7 mN. In addition, the force Fy formed by the second driving unit 1420 may be within 7 mN. Or, the force Fx formed by the first driving unit 1410 may be within 3 mN. In addition, the force Fy formed by the second driving unit 1420 may be within 3 mN.

The first surface of the first magnet 1240 may be formed in a square shape. The first surface of the second magnet 1120 may be formed in a square shape. Or, each of the first surface of the first magnet 1240 and the first surface of the second magnet 1120 may be formed in a rectangular shape. The first magnet 1240 may have a square cross-section at least in part. The second magnet 1120 may have a square cross-section at least in part. The first magnet 1240 may be formed to have a rounded edge. The second magnet 1120 may be formed to have a rounded edge.

As a modified embodiment, the first magnet 1240 may have a circular cross section. The first magnet 1240 may be formed in a cylindrical shape. The second magnet 1120 may have a circular cross-section. The second magnet 1120 may be formed in a cylindrical shape. The first magnet 1240 may be formed to have a rounded edge. The first magnet 1240 may be formed to have a curved edge. The first magnet 1240 may be formed so that an edge has a curvature. The first magnet 1240 may be formed to have a C-cut or R-cut edge. The second magnet 1120 may be formed to have a rounded edge. The second magnet 1120 may be formed to have a curved edge. The second magnet 1120 may be formed so that an edge has a curvature. The second magnet 1120 may be formed to have a C-cut or R-cut edge.

The reflective member driving device 1000 may comprise a moving plate 1300. The moving plate 1300 may be an intermediate plate. The moving plate 1300 may be disposed between the housing 1110 and the holder 1210. The moving plate 1300 may be disposed between the rigid mover 1230 and the holder 1210. The moving plate 1300 may be disposed between the first magnet 1240 and the holder 1210. The moving plate 1300 may be placed between the fixed part 1100 and the moving part 1200. The moving plate 1300 may be disposed between the first surface of the second magnet 1120 and the holder 1210. The moving plate 1300 may guide the movement of the holder 1210 against the housing 1110. The moving plate 1300 may provide a tilt center of the holder 1210. That is, the holder 1210 may be tilted around the moving plate 1300. The moving plate 1300 may have one side disposed on the holder 1210 and the other side disposed in the housing 1110. The moving plate 1300 may be in contact with the holder 1210 and the housing 1110.

The moving plate 1300 may comprise a first surface facing the housing 1110 and a second surface facing the holder 1210. The first surface of the moving plate 1300 may comprise pluralities of first protrusions 1310 spaced apart from each other in the direction of the first axis. The second surface of the moving plate 1300 may comprise pluralities of second protrusions 1320 spaced apart from each other in the direction of the second axis.

The moving plate 1300 may comprise pluralities of first convex portions formed on one surface and pluralities of second convex portions formed on the other surface. The first convex portion may be a first protrusion 1310. The second convex portion may be a second protrusion 1320. The x-axis may correspond to a straight line connecting two convex portions among the pluralities of first convex portions. The x-axis may coincide with or parallel to a straight line connecting two convex portions among the pluralities of first convex portions. The y-axis may correspond to a straight line connecting two convex portions among the pluralities of second convex portions. The y-axis may coincide with or parallel to a straight line connecting the two convex portions among the pluralities of second convex portions. In a modified embodiment, the first protrusion may be the second protrusion 1320 and the second protrusion may be the first protrusion 1310.

The moving plate 1300 may comprise a first protrusion 1310. The first protrusion 1310 may be disposed in the housing 1110. The first protrusion 1310 may be in contact with the housing 1110. The first protrusion 1310 may be disposed in the groove 1115 of the housing 1110. The first protrusion 1310 may provide a first axis tilt center with respect to the holder 1210. The first protrusion 1310 may provide an x-axis tilt center for the holder 1210. The first protrusion 1310 may comprise two first protrusions. The two first protrusions may be spaced apart from each other in the x-axis direction. The two first protrusions may be disposed on the x-axis. The holder 1210 may be tilted around the first protrusion 1310 of the moving plate 1300 by the first driving unit 1410. The holder 1210 may be tilted up and down about the first protrusion 1310 of the moving plate 1300 by the first driving unit 1410.

A first axis of the moving plate 1300 may be defined by a first protrusion 1310 of the moving plate 1300 and a groove 1115 of the housing 1110. In a first embodiment of the present invention, by disposing the first protrusion 1310 of the moving plate 1300 in the housing 1110 side rather than the holder 1210 side, the rotation center of the tilt about the first axis can be further away. Through this, the accuracy of the Hall value for detecting the amount of the tilt movement of the first axis may be increased. A mechanical stroke for the x-axis tilt driving can be secured.

The moving plate 1300 may comprise a second protrusion 1320. The second protrusion 1320 may be disposed in the holder 1210. The second protrusion 1320 may be in contact with the holder 1210. The second protrusion 1320 may be disposed in the groove 1211 of the holder 1210. The second protrusion 1320 may provide a second axis tilt center perpendicular to the first axis for the holder 1210. The second protrusion 1320 may provide a y-axis tilt center for the holder 1210. The second protrusion 1320 may comprise two second protrusions. The two second protrusions may be spaced apart from each other in the y-axis direction. The two second protrusions may be disposed on the y-axis. The holder 1210 may be tilted around the second protrusion 1320 of the moving plate 1300 by the second driving unit 1420. The holder 1210 may be tilted in the left and right directions with respect to the second protrusion 1320 of the moving plate 1300 by the second driving unit 1420.

As a modified embodiment, the first protrusion 1310 of the moving plate 1300 provides the y-axis tilt center to the holder 1210, and the second protrusion 1320 of the moving plate 1300 may provide the x-axis tilt center.

The reflective member driving device 1000 may comprise grease. Grease may be disposed between the moving plate 1300 and the housing 1110. The grease may be formed of a material different from that of the damper 1500. The grease may be spaced apart from the damper 1500. Grease may be distinguished from the damper 1500. Grease may be applied in a shape different from that of the damper 1500. Grease may be applied at a different location than the damper 1500.

The reflective member driving device 1000 may comprise a driving unit 1400. The driving unit 1400 may move the moving part 1200 against the fixed part 1100. The driving unit 1400 may tilt the moving part 1200 against the fixed part 1100. The driving unit 1400 may tilt the holder 1210. The driving unit 1400 may tilt the moving part 1200 with respect to the orthogonal x-axis and the y-axis of the moving plate 1300. The driving unit 1400 may comprise a coil and a magnet. The driving unit 1400 may move the moving part 1200 through electromagnetic interaction. In a modified embodiment, the driving unit 1400 may comprise a shape memory alloy (SMA).

The driving unit 1400 may comprise a first driving unit 1410 and a second driving unit 1420. The first driving unit 1410 may comprise a first driving magnet 1411 and a first coil 1412. It may comprise a second driving unit 1420, a second driving magnet 1421, and a second coil 1422. The first driving magnet 1411 and the first coil 1412 may tilt the holder 1210 about the first axis. The second driving magnet 1421 and the second coil 1422 may tilt the holder 1210 about a second axis perpendicular to the first axis. One of the first driving magnet 1411 and the second driving magnet 1421 may be referred to as a third magnet, and the other may be referred to as a fourth magnet.

The driving unit 1400 may comprise a first driving unit 1410. The first driving unit 1410 may tilt the moving part 1200 against the fixed part 1100 about a first axis. The first driving unit 1410 may tilt the holder 1210 with respect to a first axis of the moving plate 1300. The first driving unit 1410 may tilt the moving part 1200 about the x-axis against the fixed part 1100. The first driving unit 1410 may comprise a coil and a magnet. The first driving unit 1410 may move the moving part 1200 through electromagnetic interaction. As a modified embodiment, the first driving unit 1410 may comprise a shape memory alloy (SMA).

The first driving unit 1410 may comprise a first driving magnet 1411. The first driving magnet 1411 may be disposed in the holder 1210. The first driving magnet 1411 may be disposed on a lower surface of the holder 1210. The first driving magnet 1411 may be fixed to the holder 1210. The first driving magnet 1411 may be fixed to the holder 1210 by an adhesive. The first driving magnet 1411 may be disposed between the holder 1210 and the lower surface of the housing 1110. The first driving magnet 1411 may be disposed between the holder 1210 and the lower plate of the housing 1110. The first driving magnet 1411 may move integrally with the holder 1210. The first driving magnet 1411 may tilt the holder 1210. The first driving magnet 1411 may tilt the holder 1210 against the first axis. The first driving magnet 1411 may be disposed to face the first coil 1412. The first driving magnet 1411 may face the first coil 1412. The first driving magnet 1411 may be disposed at a position corresponding to the first coil 1412. The first driving magnet 1411 may interact with the first coil 1412. The first driving magnet 1411 may electromagnetically interact with the first coil 1412. At least a portion of the first driving magnet 1411 may be disposed in the groove 1217 of the holder 1210.

The first driving magnet 1411 may comprise a first surface in a direction toward the reflective member 1220. The second magnet 1120 may comprise a first surface in a direction toward the reflective member 1220. The first surface of the first driving magnet 1411 may comprise a first region closest to the second magnet 1120. The first region of the first driving magnet 1411 may have a polarity different from that of the first surface of the second magnet 1120. The first surface of the first driving magnet 1411 may comprise a second region having a polarity different from that of the first region. A first region of the first driving magnet 1411 has an S pole and a second region may have an N pole. At this time, the first surface of the second magnet 1120 may have an N pole. As a modified embodiment, the first region of the first driving magnet 1411 has an N pole and the second region may have an S pole.

In a first embodiment of the present invention, magnetic field interference can be minimized through the arrangement of the magnet polarities of the first driving magnet 1411 and the second magnet 1120.

The first driving magnet 1411 may comprise a second surface opposite to the first surface of the first driving magnet 1411. The second surface of the first driving magnet 1411 may comprise a third region having a polarity different from that of the first region. The second surface of the first driving magnet 1411 may comprise a fourth region having a polarity different from that of the second region. The second surface of the first driving magnet 1411 may face the first coil 1412. The third region has an N pole and the fourth region may have an S pole. As a modified embodiment, the third region has an S pole and the fourth region may have an N pole.

The first driving magnet 1411 may comprise a neutral portion disposed between the first region and the second region. The first driving magnet 1411 may comprise a neutral portion disposed between the third region and the fourth region. The neutral portion may be a portion having a polarity close to neutral.

A region of the first driving magnet 1411 closest to the first surface of the second magnet 1120 may have a polarity for generating an attractive force with the first surface of the second magnet 1120. The first surface of the second magnet 1120 and the first region of the first driving magnet 1411 closest to the first surface of the second magnet 1120 may generate an attractive force to each other.

Each of the second magnet 1120 and the first driving magnet 1411 may comprise a first surface facing the central portion of the moving part 1200. The first surface of the first driving magnet 1411 may comprise a first region and a second region having different polarities. The first surface of the second magnet 1120 may be disposed closer to the first driving magnet 1411 than to the second driving magnet 1421. The first region of the first driving magnet 1411 may be disposed closer to the second magnet 1120 than to the second region. A first region of the first driving magnet 1411 may have a polarity different from that of the first surface of the second magnet 1120.

Each of the second magnet 1120 and the first driving magnet 1411 may comprise a first surface facing the central portion of the holder 1210. The first surface of the first driving magnet 1411 and the first surface of the second magnet 1120 may comprise regions having different polarities.

The first driving unit 1410 may comprise a first coil 1412. The first coil 1412 may be disposed on the substrate 1130. The first coil 1412 may be disposed in the housing 1110. The first coil 1412 may be disposed on the substrate 1130 at a position corresponding to the first driving magnet 1411. The first coil 1412 may be disposed below the holder 1210. The first coil 1412 may interact with the first driving magnet 1411. When a current is applied to the first coil 1412, an electromagnetic field is formed around the first coil 1412 to interact with the first driving magnet 1411. The first driving magnet 1411 and the first coil 1412 may tilt the holder 1210 with respect to the first axis. At this time, the first axis may be an x-axis.

In a first embodiment of the present invention, a first direction driving current may be applied to the first coil 1412 to drive the first coil 1412. At this time, the second direction driving current opposite to the first direction driving current may not be used to drive the first coil 1412. That is, only a current in either one of a reverse direction or a forward direction may be supplied to the first coil 1412.

The reflective member driving device 1000 may comprise a Hall sensor 1413. The Hall sensor 1413 may detect the first driving magnet 1411. The Hall sensor 1413 may detect a magnetic force of the first driving magnet 1411. The Hall sensor 1413 may detect the position of the holder 1210. The Hall sensor 1413 may detect the position of the reflective member 1220. The Hall sensor 1413 may detect a tilt amount centered about the x-axis of the holder 1210.

The reflective member driving device 1000 may comprise a yoke 1414. The yoke 1414 may be disposed between the first driving magnet 1411 and the holder 1210. The yoke 1414 may be formed in a shape corresponding to the first driving magnet 1411. The yoke 1414 may increase the interaction force between the first driving magnet 1411 and the first coil 1412.

The driving unit 1400 may comprise a second driving unit 1420. The second driving unit 1420 may tilt the moving part 1200 about the second axis against the fixed part 1100. The second driving unit 1420 may tilt the holder 1210 with respect to a second axis perpendicular to the first axis of the moving plate 1300. The second driving unit 1420 may tilt the moving part 1200 centered about the y-axis against the fixed part 1100. The second driving unit 1420 may comprise a coil and a magnet. The second driving unit 1420 may move the moving part 1200 through electromagnetic interaction. As a modified embodiment, the second driving unit 1420 may comprise shape memory alloy (SMA).

The second driving unit 1420 may comprise a second driving magnet 1421. The second driving magnet 1421 may be disposed in the holder 1210. The second driving magnet 1421 may be disposed on both side surfaces of the holder 1210. The second driving magnet 1421 may be fixed to the holder 1210. The second driving magnet 1421 may be fixed to the holder 1210 by an adhesive. The second driving magnet 1421 may be disposed between the holder 1210 and a side surface of the housing 1110. The second driving magnet 1421 may be disposed between the holder 1210 and a side plate of the housing 1110. The second driving magnet 1421 may move integrally with the holder 1210. The second driving magnet 1421 may tilt the holder 1210. The second driving magnet 1421 may tilt the holder 1210 with respect to a second axis perpendicular to the first axis. The second driving magnet 1421 may be disposed to face the second coil 1422. The second driving magnet 1421 may face the second coil 1422. The second driving magnet 1421 may be disposed at a position corresponding to the second coil 1422. The second driving magnet 1421 may interact with the second coil 1422. The second driving magnet 1421 may electromagnetically interact with the second coil 1422.

The second driving magnet 1421 may comprise a neutral portion having no polarity. The neutral portion may be a void. The neutral portion may be disposed between the N pole and the S pole. The neutral portion may be disposed between a first portion corresponding to the front of the second driving magnet 1421 and the second portion corresponding to the rear of the second driving magnet 1421. Or, the neutral portion may be disposed between an inner side portion and an outer side portion of the second driving magnet 1421.

The second driving magnet 1421 may comprise a first sub-magnet 1421-1. The first sub-magnet 1421-1 may be disposed on one side of the holder 1210. The first sub-magnet 1421-1 may be disposed to face the first sub-coil 1422-1. The first sub-magnet 1421-1 may face the first sub-coil 1422-1. The first sub-magnet 1421-1 may be disposed at a position corresponding to the first sub-coil 1422-1. The first sub-magnet 1421-1 may interact with the first sub-coil 1422-1. The first sub-magnet 1421-1 may electromagnetically interact with the first sub-coil 1422-1.

The second driving magnet 1421 may comprise a second sub-magnet 1421-2. The second sub-magnet 1421-2 may be disposed on the other side of the holder 1210. The second sub-magnet 1421-2 may be disposed opposite to the first sub-magnet 1421-1. The second sub-magnet 1421-2 may have the same size and shape as the first sub-magnet 1421-1. The second sub-magnet 1421-2 may be disposed to face the second sub-coil 1422-2. The second sub-magnet 1421-2 may face the second sub-coil 1422-2. The second sub-magnet 1421-2 may be disposed at a position corresponding to the second sub-coil 1422-2. The second sub-magnet 1421-2 may interact with the second sub-coil 1422-2. The second sub-magnet 1421-2 may electromagnetically interact with the second sub-coil 1422-2.

The second driving unit 1420 may comprise a second coil 1422. The second coil 1422 may be disposed on the substrate 1130. The second coil 1422 may be disposed in the housing 1110. The second coil 1422 may be disposed on the second portion of the substrate 1130. The second coil 1422 may be disposed on both side surfaces of the holder 1210. When a current is applied to the second coil 1422, an electromagnetic field is formed around the second coil 1422 to interact with the second driving magnet 1421. The second coil 1422 may comprise two sub-coils 1421-1 and 1421-2 disposed opposite to each other with respect to the holder 1210. The two sub-coils 1421-1 and 1421-2 may be electrically connected to each other. The second driving magnet 1421 and the second coil 1422 may tilt the holder 1210 with respect to a second axis perpendicular to the first axis. At this time, the second axis may be a y-axis. The first axis may be an x-axis, and the z-axis may be an optical axis of the image sensor 3400.

The second coil 1422 may comprise a first sub-coil 1422-1. The first sub-coil 1422-1 may be disposed on the substrate 1130. The first sub-coil 1422-1 may be disposed in the housing 1110. The first sub-coil 1422-1 may be disposed on the second portion of the substrate 1130. The first sub-coil 1422-1 may be disposed on the side of the holder 1210. When a current is applied to the first sub-coil 1422-1, an electromagnetic field is formed around the first sub-coil 1422-1 to interact with the first sub-magnet 1421-1.

The second coil 1422 may comprise a second sub-coil 1422-2. The second sub-coil 1422-2 may be disposed on the substrate 1130. The second sub-coil 1422-2 may be disposed in the housing 1110. The second sub-coil 1422-2 may be disposed on the second portion of the substrate 1130. The second sub-coil 1422-2 may be disposed on the side of the holder 1210. When a current is applied to the second sub-coil 1422-2, an electromagnetic field is formed around the second sub-coil 1422-2 to interact with the second sub-magnet 1421-2.

The second driving magnet 1421 may comprise a first sub-magnet 1421-1 disposed on a first side surface of the holder 1210 and a second sub-magnet 1421-2 disposed on a second side surface of the holder 1210. The second coil 1422 may comprise a first sub-coil 1422-1 disposed on the substrate and disposed at a position corresponding to the first sub-magnet 1421-1, and a second sub-coil 1422-2 disposed on the substrate and disposed at a position corresponding to the second sub-magnet 1421-2.

The reflective member driving device 1000 may comprise a Hall sensor 1423. The Hall sensor 1423 may detect the second driving magnet 1421. The Hall sensor 1423 may detect a magnetic force of the second driving magnet 1421. The Hall sensor 1423 may detect the position of the holder 1210. The Hall sensor 1423 may detect the position of the reflective member 1220. The Hall sensor 1423 may detect a tilt amount centered about the y-axis of the holder 1210.

The reflective member driving device 1000 may comprise a yoke 1424. The yoke 1424 may be disposed between the second driving magnet 1421 and the holder 1210. The yoke 1424 may be formed to have a shape corresponding to that of the second driving magnet 1421. The yoke 1424 may increase the interaction force between the second driving magnet 1421 and the second coil 1422.

The reflective member driving device 1000 may comprise a damper 1500. The damper 1500 may comprise an adhesive material. The damper 1500 may have viscosity. The damper 1500 may be disposed between the fixed part 1100 and the moving part 1200. The damper 1500 may be disposed between the rigid mover 1230 and the housing 1110. The damper 1500 may connect the rigid mover 1230 and the housing 1110. The damper 1500 may be coupled to the rigid mover 1230 and the housing 1110. The damper 1500 may be disposed in the rigid mover 1230. The damper 1500 may be coupled with the rigid mover 1230. The damper 1500 may be coupled to the rigid mover 1230. The rigid mover 1230 may be coupled to the housing 1110. The housing 1110 and the rigid mover 1230 may be attached to each other by the damper 1500.

The damper 1500 may be disposed on at least one among an upper portion and a lower portion of the first portion 1111 of the housing 1110. The damper 1500 may connect the protruding portion 1231 of the rigid mover 1230 and the housing 1110. At least a portion of the damper 1500 may be disposed in the groove 1119 of the housing 1110 between the protruding portion 1231 of the rigid mover 1230 and the housing 1110. At least a portion of the damper 1500 may be disposed in a second groove being recessed from the first groove portion of the housing 1110.

In a first embodiment of the present invention, a bond of a gel component that acts as a damper between the housing 1110 and the rigid mover 1230 may be applied. Through this, it is possible to increase the responsiveness of the actuator by securing a phase margin while maintaining a gain value. That is, FRA characteristics may be improved. In particular, a response characteristic of a tilt centered about the x-axis may be improved. The tilt centered about the y-axis (yaw) can also be enhanced.

Figure 30:
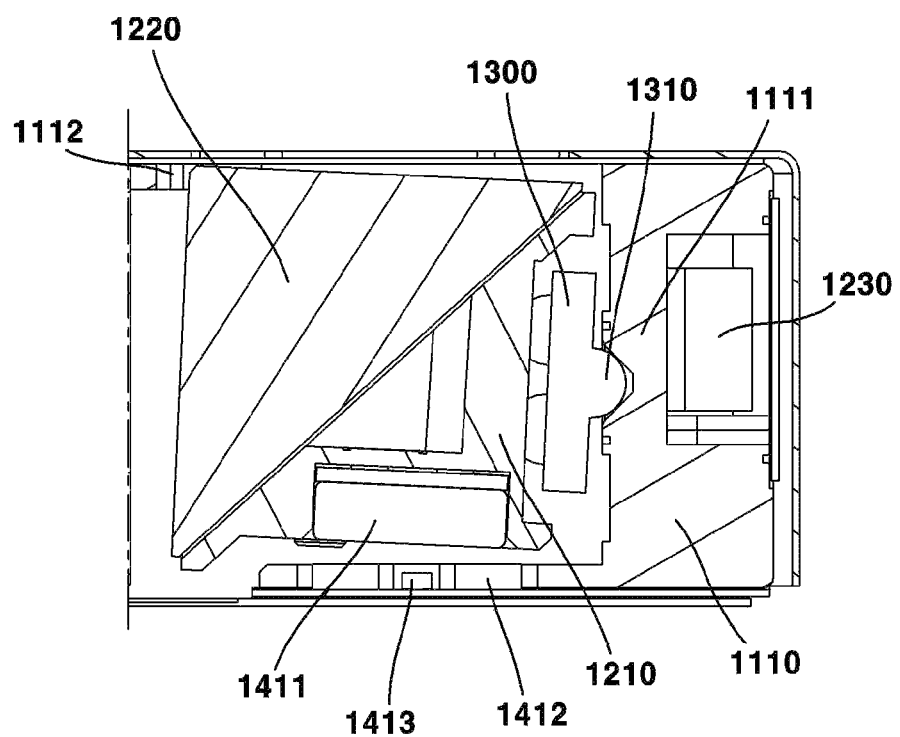
FIGS. 30 and 31 are diagrams for explaining the tilt about the x-axis of a reflective member driving device according to a first embodiment of the present invention.
Figure 31:
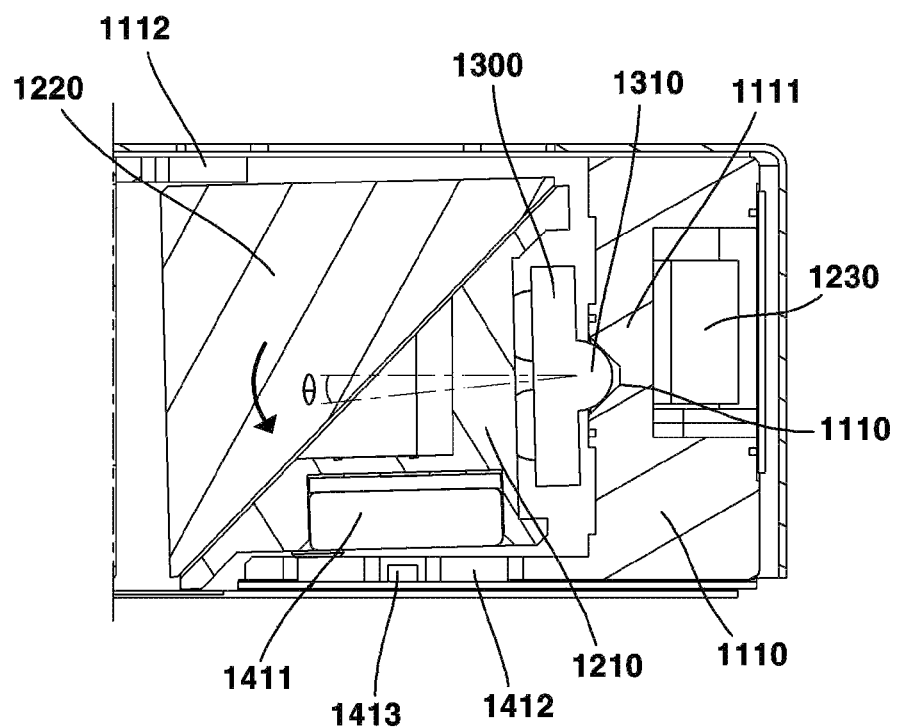

FIGS. 30 and 31 are diagrams for explaining the tilt about the x-axis of a reflective member driving device according to a first embodiment of the present invention.

In a first embodiment of the present invention, the holder 1210 may be disposed between the upper plate and the lower plate of the housing 1110 in an initial state in which current is not supplied to the first driving unit 1410. At this time, the holder 1210 may be in contact with the upper plate of the housing 1110 (refer to FIG. 30).

At this time, when a current in the first direction is applied to the first coil 1412, the holder 1210 may be tilted downward centered about the first protrusion 1310 of the moving plate 1300 by the electromagnetic interaction between the first coil 1412 and the first driving magnet 1411 (refer to θ of FIG. 31).

That is, current is applied to the first coil 1412 so that the holder 1210 may be tilted downward against the housing 1110 centered about the x-axis. At this time, since the reflective member 1220 is also tilted together with the holder 1210, the optical path is changed, so that the shaking detected by the gyro sensor 1150 can be offset.

In a first embodiment of the present invention, only the current in the first direction may be used for controlling the first coil 1412 and the current in the first direction opposite to the first direction may not be used. Through this, the separation and removal problem of the moving plate 1300 that may occur when the current in the second direction is applied to the first coil 1412 can be fundamentally blocked.

In more detail, as a comparative example, when the centers of the first magnet 1240 and the second magnet 1120 are disposed at the same height as the first protrusion 1310 of the moving plate 1300, the moving part 1200 is slid by the electromagnetic force and the moving plate 1300 may be separated and removed when the repulsive force between the first magnet 1240 and the second magnet 1120 and the electromagnetic force between the first coil 1412 and the first driving magnet 1411 are non-uniform. When the electromagnetic force between the first coil 1412 and the first driving magnet 1411 is greater than the repulsive force between the first magnet 1240 and the second magnet 1120, a phenomenon in that the rigid mover 1230 falls out as much as the gap between the first magnet 1240 and the second magnet 1120 occurs and the moving plate 1300 may be separated. This may be a cause of poor Hall calibration dynamic characteristics.

In a first embodiment of the present invention, the center axis of the repulsive force and the center axis of the x-axis driving force may deviate by a certain distance. Through this, the reflective member 1220 may be mechanically shifted in an upward direction. At this time, the upward direction may be a direction opposite to gravity.

In a first embodiment of the present invention, it can be controlled by code rather than current control. In the pivot structure like a first embodiment of the present invention, it is difficult to know the initial position in the open state for reasons such as deflection due to gravity, so the closed method (a method in which the moving part 1200 is in contact with the fixed part 1100 in the initial state) may be required. In a first embodiment of the present invention, since it is controlled by a closed method, more precise driving can be performed. Furthermore, in a first embodiment of the present invention, the noise generated by the moving part 1200 moving here and there can also be minimized by the closed method.

Figure 32:
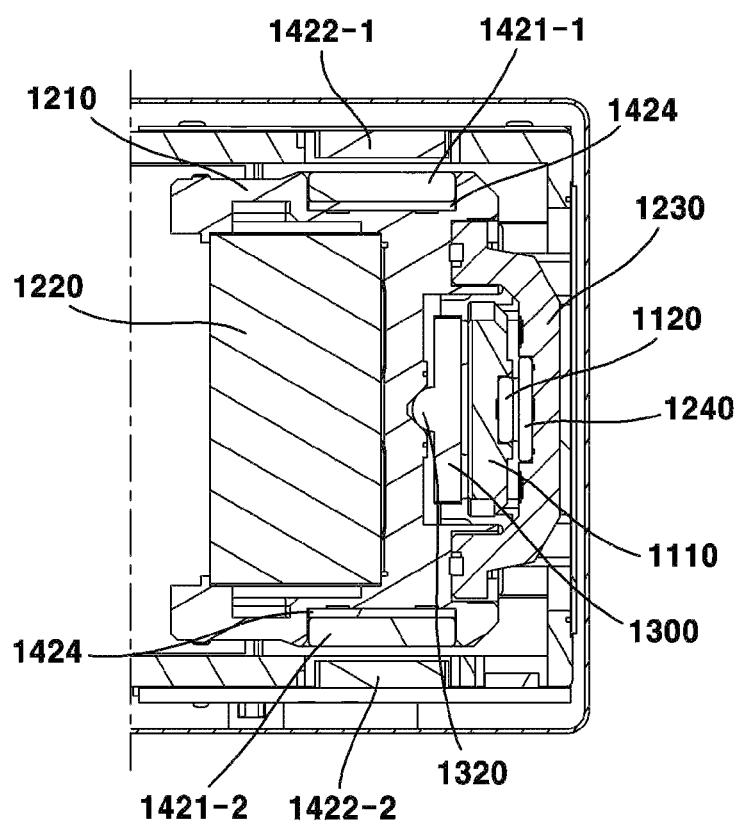
FIGS. 32 to 34 are views for explaining a tilt about the y-axis of a reflective member driving device according to a first embodiment of the present invention.
Figure 33:
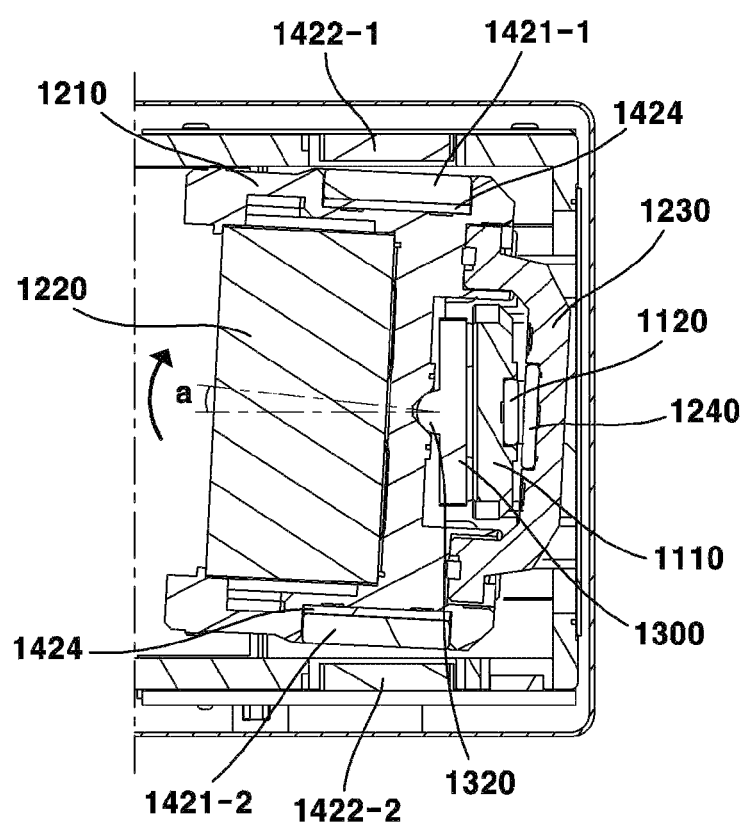
Figure 34:
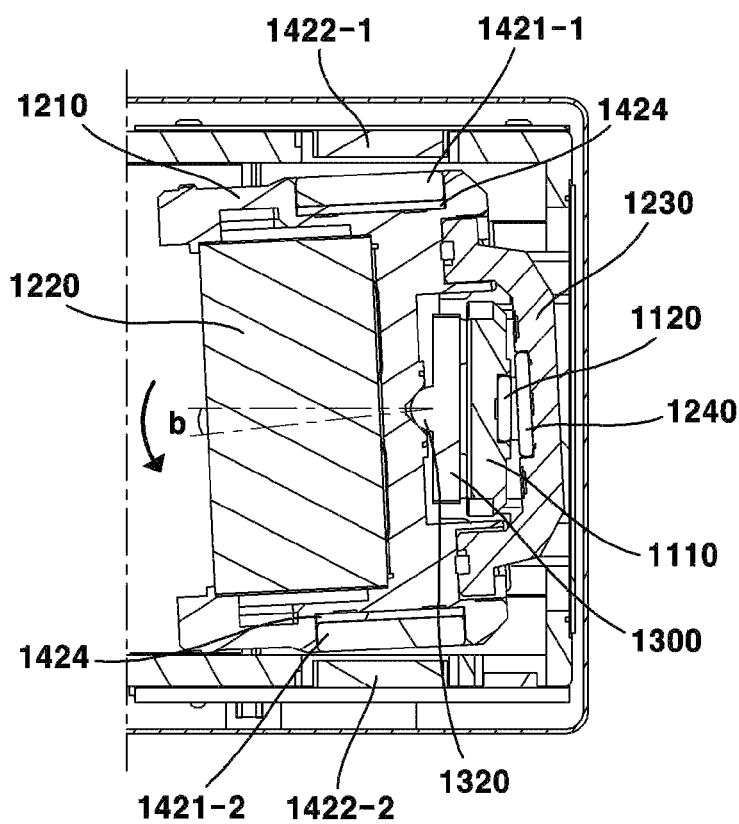

FIGS. 32 to 34 are views for explaining a tilt about the y-axis of a reflective member driving device according to a first embodiment of the present invention.

In a first embodiment of the present invention, in an initial state in which current is not supplied to the second driving unit 1420, the holder 1210 may be disposed between the both side plates of the housing 1110. At this time, the holder 1210 may be in a state of being spaced apart from all of the both side plates of the housing 1110 (refer to FIG. 32).

At this time, when a current in the first direction is applied to the second coil 1422, the holder 1210 may be tilted to one side centered about the second protrusion 1320 of the moving plate 1300 due to the electromagnetic interaction between the second coil 1422 and the second driving magnet 1421 (refer to FIG. 33a).

Meanwhile, when a current in a second direction opposite to the first direction is applied to the second coil 1422, the holder 1210 may be tilted to the other side centered about the second protrusion 1320 of the moving plate 1300 due to the electromagnetic interaction between the second coil 1422 and the second driving magnet 1421 (refer to FIG. 34b).

That is, current is selectively applied to the second coil 1422 in both directions so that the holder 1210 can be tilted in the left and right directions against the housing 1110 centered about the y-axis. At this time, since the reflective member 1220 is also tilted together with the holder 1210, the optical path is changed, so that the shaking detected by the gyro sensor 1150 may be offset. Therefore, in a first embodiment of the present invention, hand shake correction for the x-axis tilting and the y-axis tilting, that is, the 2-axis tilting can be performed.

Hereinafter, a lens driving device according to a first embodiment of the present invention will be described with reference to the drawings.

Figure 35:
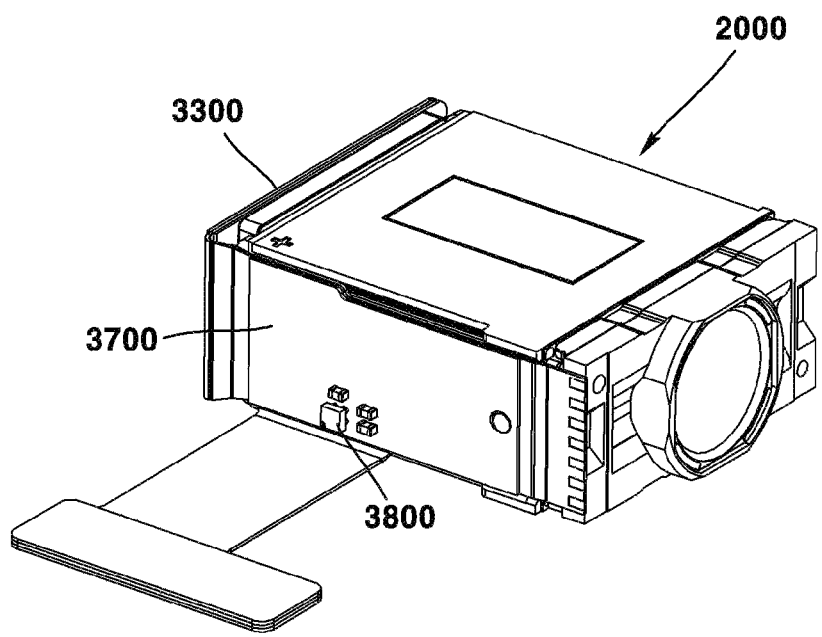
FIG. 35 is a perspective view of a lens driving device according to a first embodiment of the present invention.
Figure 36:
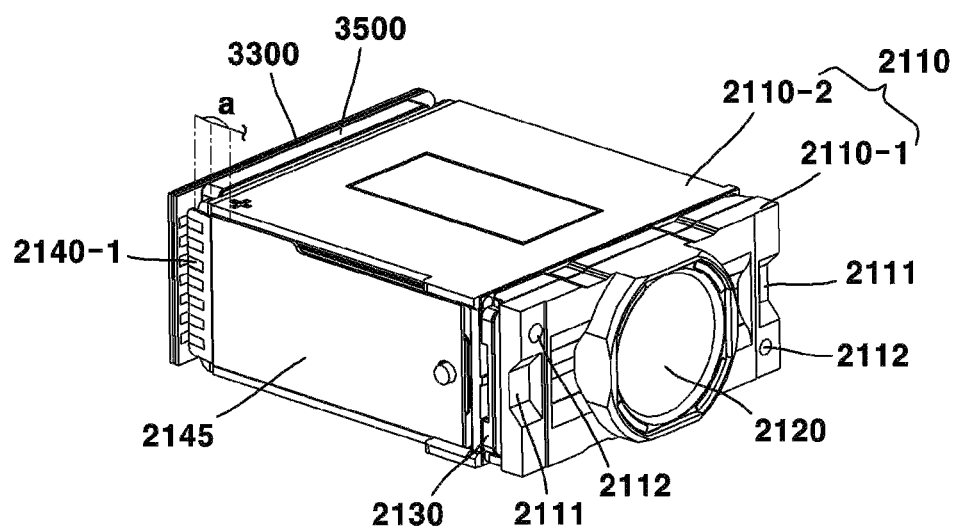
FIG. 36 is a perspective view in which some configurations of a lens driving device according to a first embodiment of the present invention are omitted.
Figure 37:
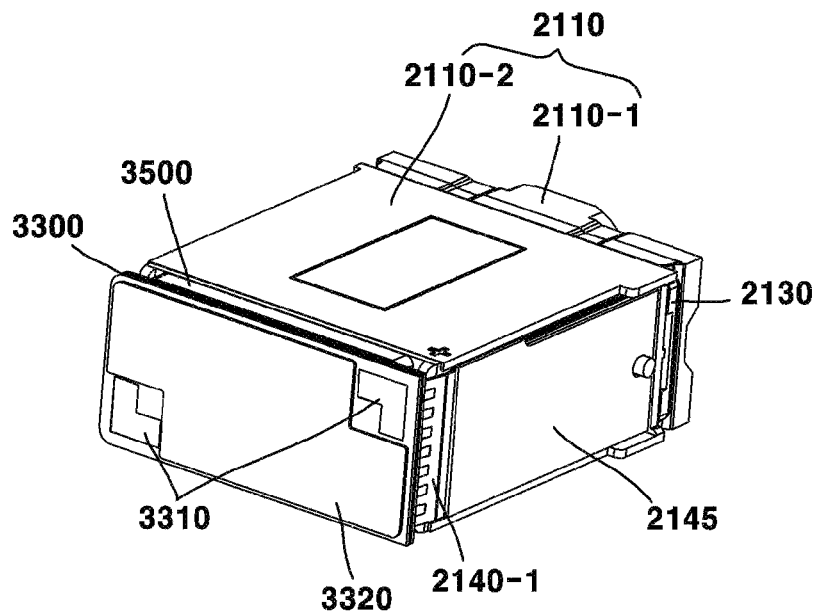
FIG. 37 is a perspective view of a lens driving device in the state illustrated in FIG. 36 as viewed from another direction.
Figure 38:
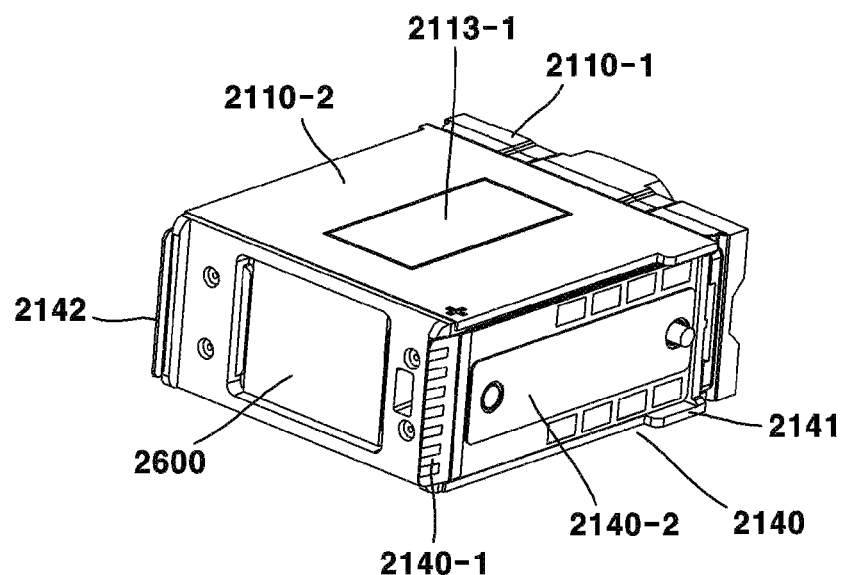
FIG. 38 is a perspective view in which some configurations of a lens driving device according to a first embodiment of the present invention are omitted.
Figure 39:
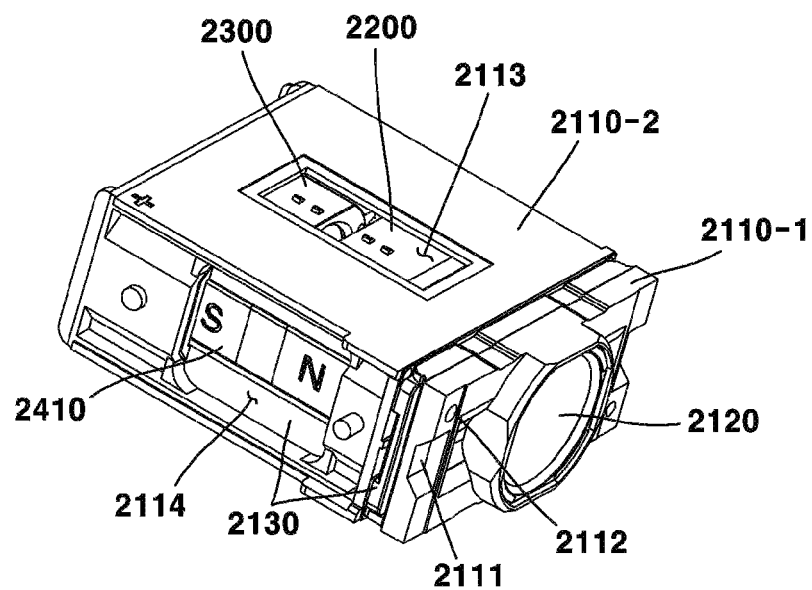
FIG. 39 is a perspective view of a state in which configurations such as a substrate and a coil are omitted in a lens driving device according to a first embodiment of the present invention.
Figure 40:
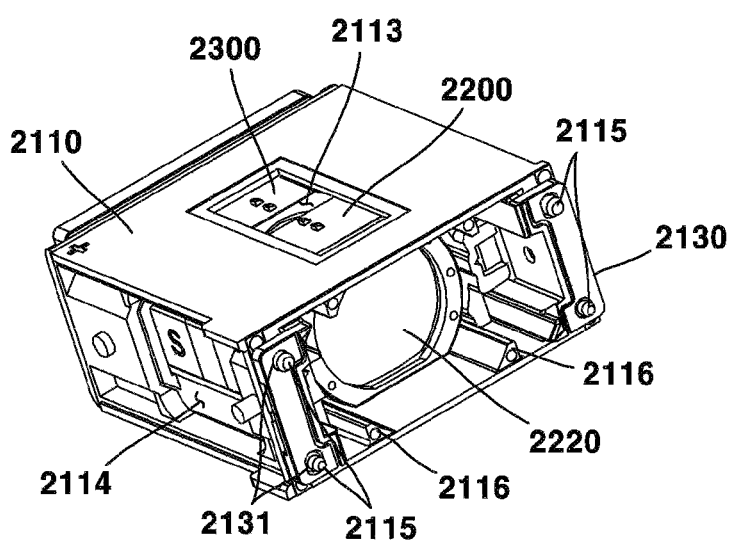
FIG. 40 is a perspective view of a state in which the first lens and related components are omitted in the lens driving device of the state illustrated in FIG. 39.
Figure 41:
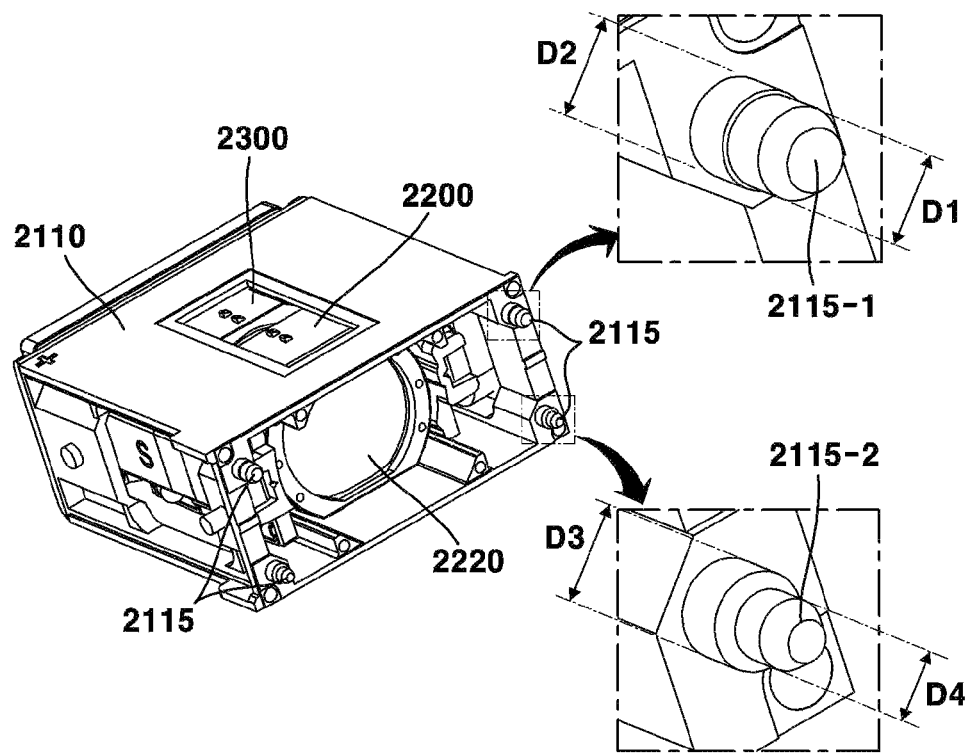
FIG. 41 is a perspective view and a partially enlarged view of a part of a lens driving device according to a first embodiment of the present invention.
Figure 42:
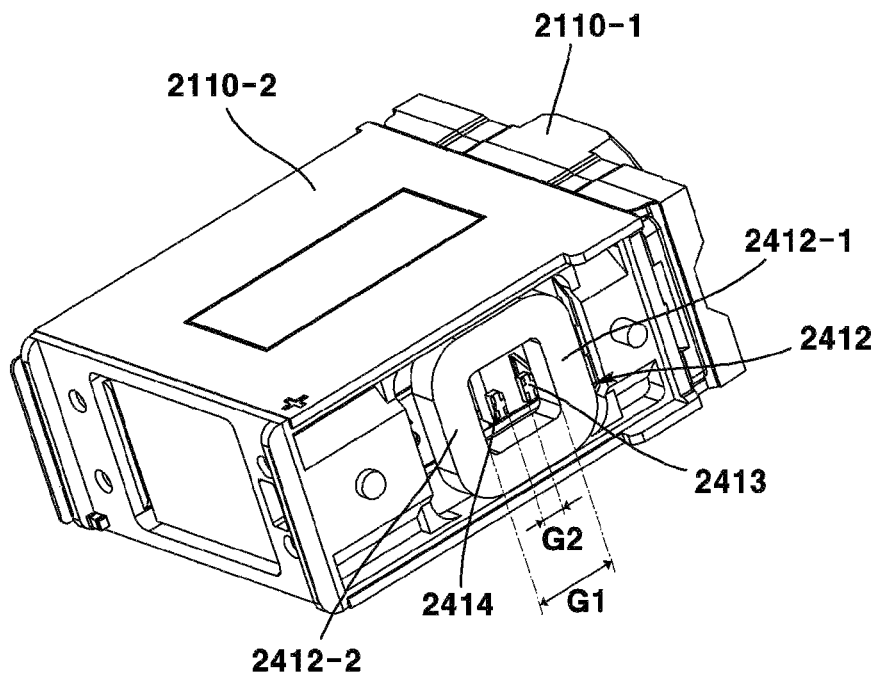
FIG. 42 is a diagram for explaining an arrangement structure of a coil and a sensor of a lens driving device according to a first embodiment of the present invention.
Figure 43:
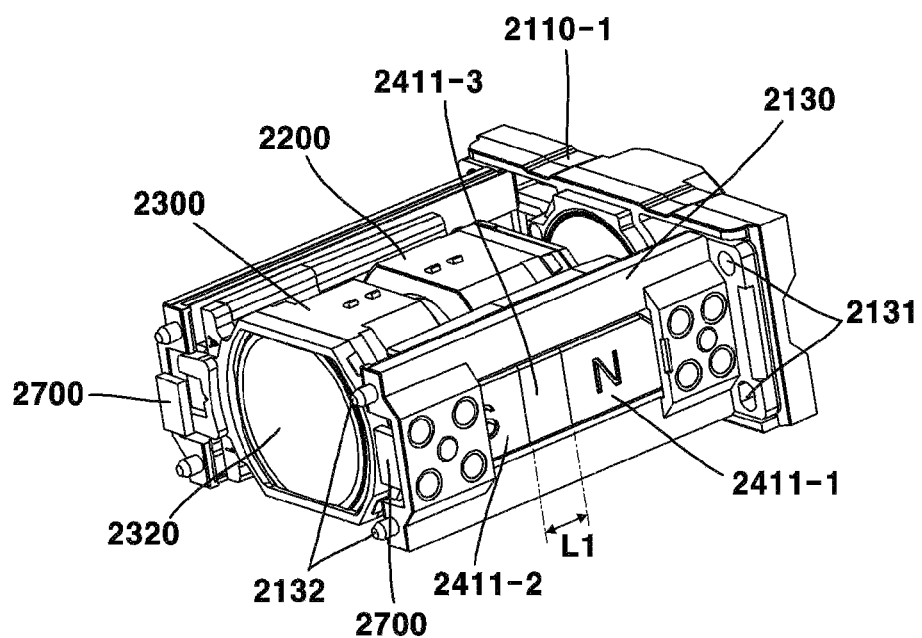
FIG. 43 is a perspective view illustrating a state in which the second housing is omitted in the lens driving device of the state illustrated in FIG. 39.
Figure 44:
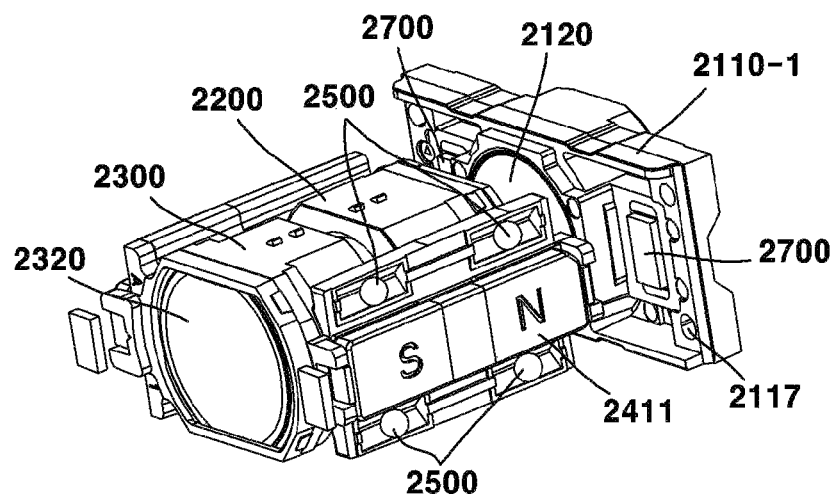
FIG. 44 is a perspective view of a state in which a guide rail is omitted from the lens driving device of the state illustrated in FIG. 43.
Figure 45:
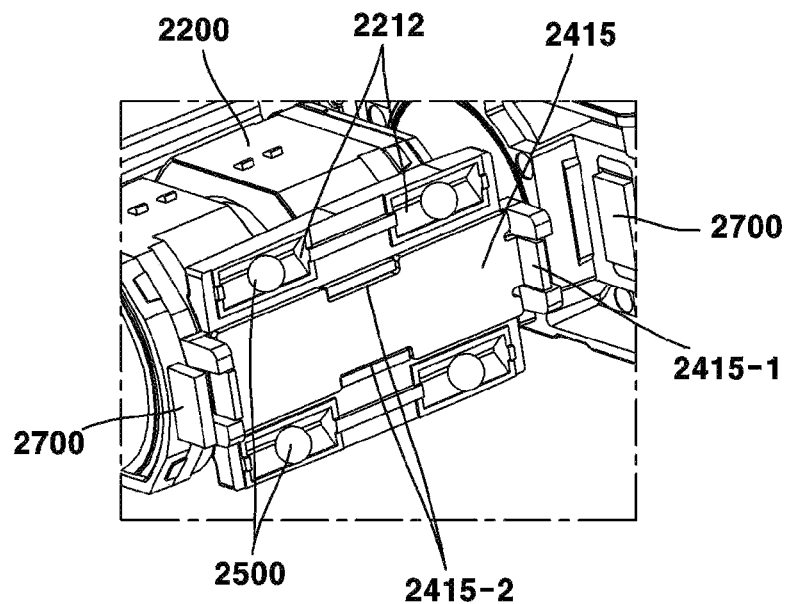
FIG. 45 is an enlarged view of some configurations of a lens driving device according to a first embodiment of the present invention.
Figure 46:
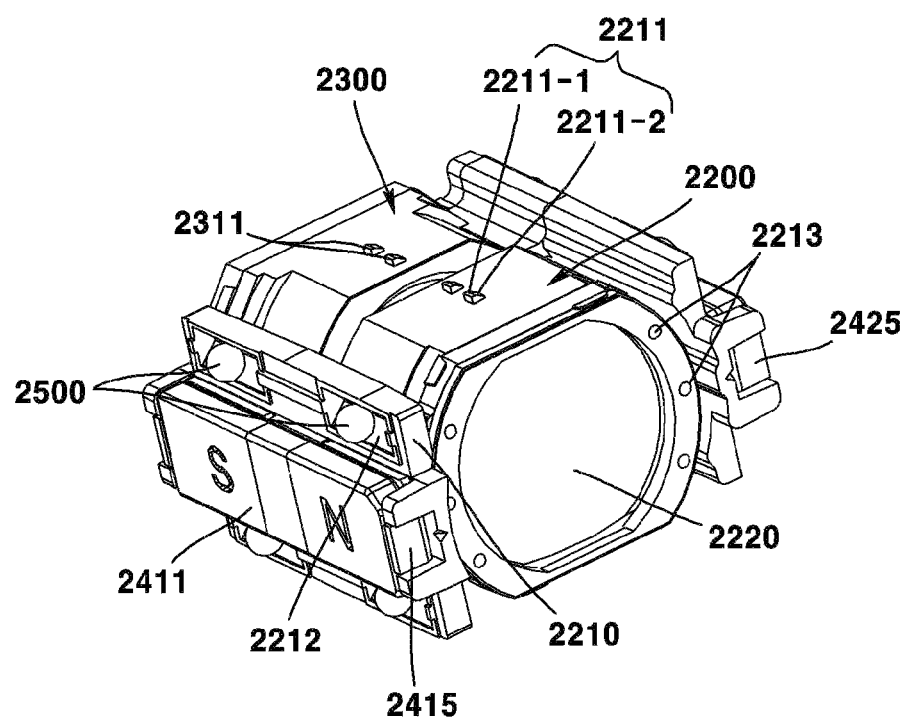
FIG. 46 is a perspective view of a first moving part and a second moving part of a lens driving device according to a first embodiment of the present invention, and a related configuration thereof.
Figure 47:
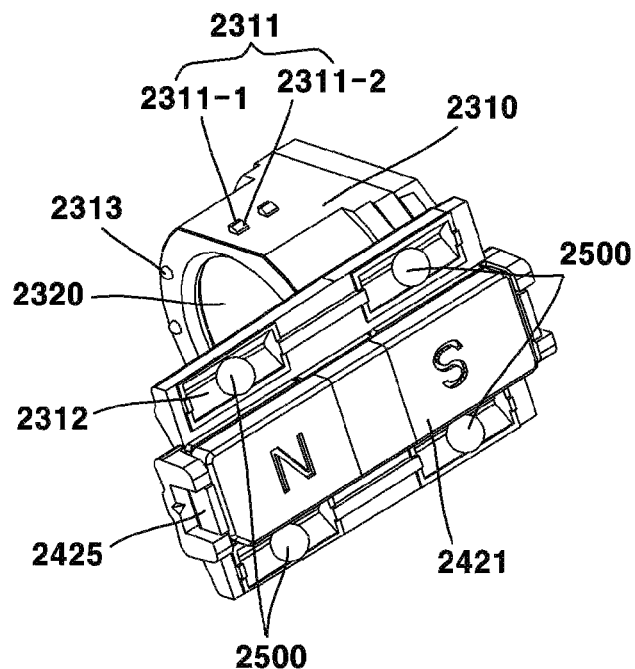
FIG. 47 is a perspective view of a second moving part of the lens driving device according to a first embodiment of the present invention and a related configuration.
Figure 48:
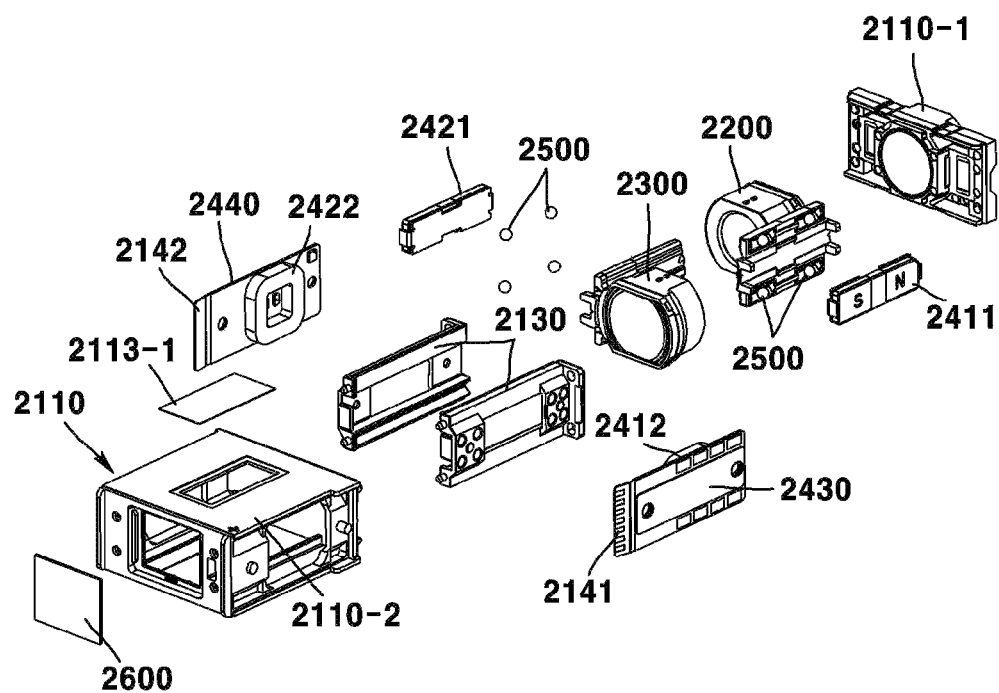
FIG. 48 is an exploded perspective view of a lens driving device according to a first embodiment of the present invention.
Figure 49:
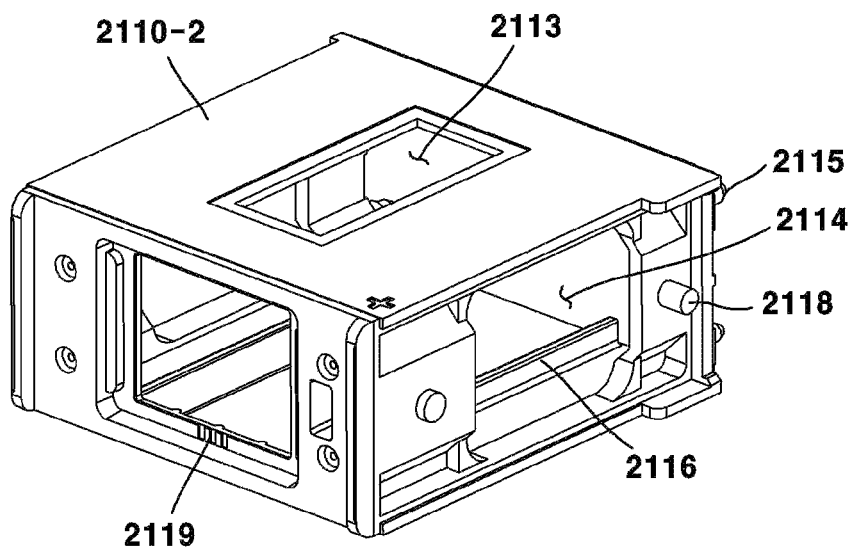
FIG. 49 is a perspective view of a second housing of a lens driving device according to a first embodiment of the present invention.
Figure 50:
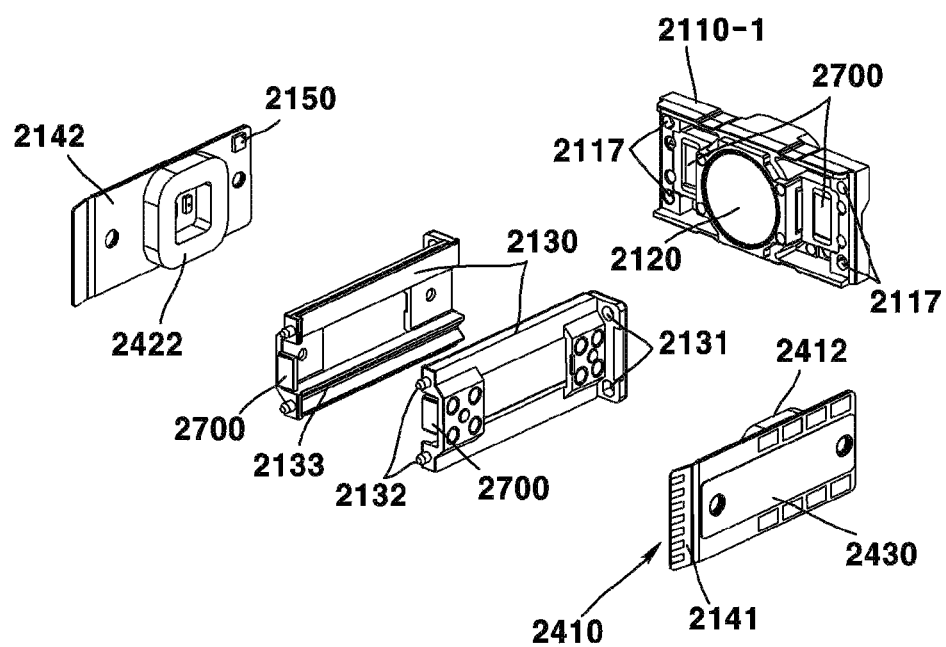
FIGS. 50 and 51 are exploded perspective views of some configurations of a lens driving device according to a first embodiment of the present invention.
Figure 51:
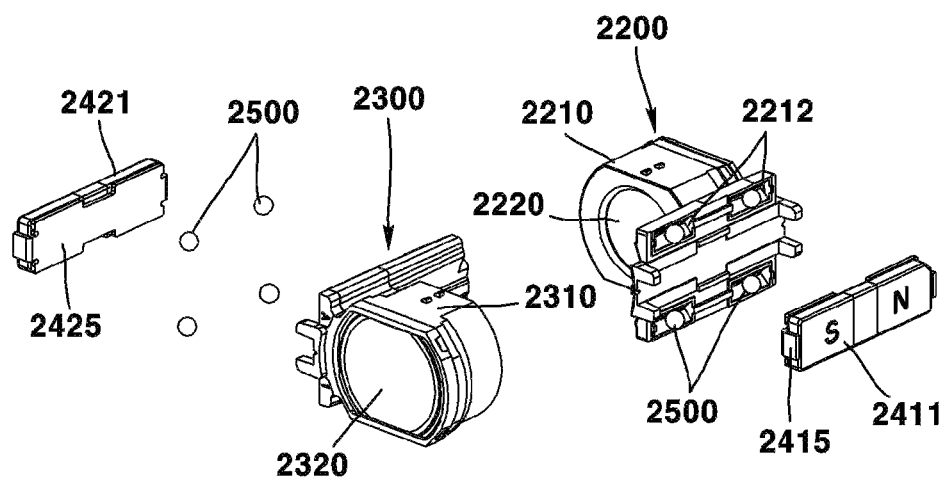
Figure 52:
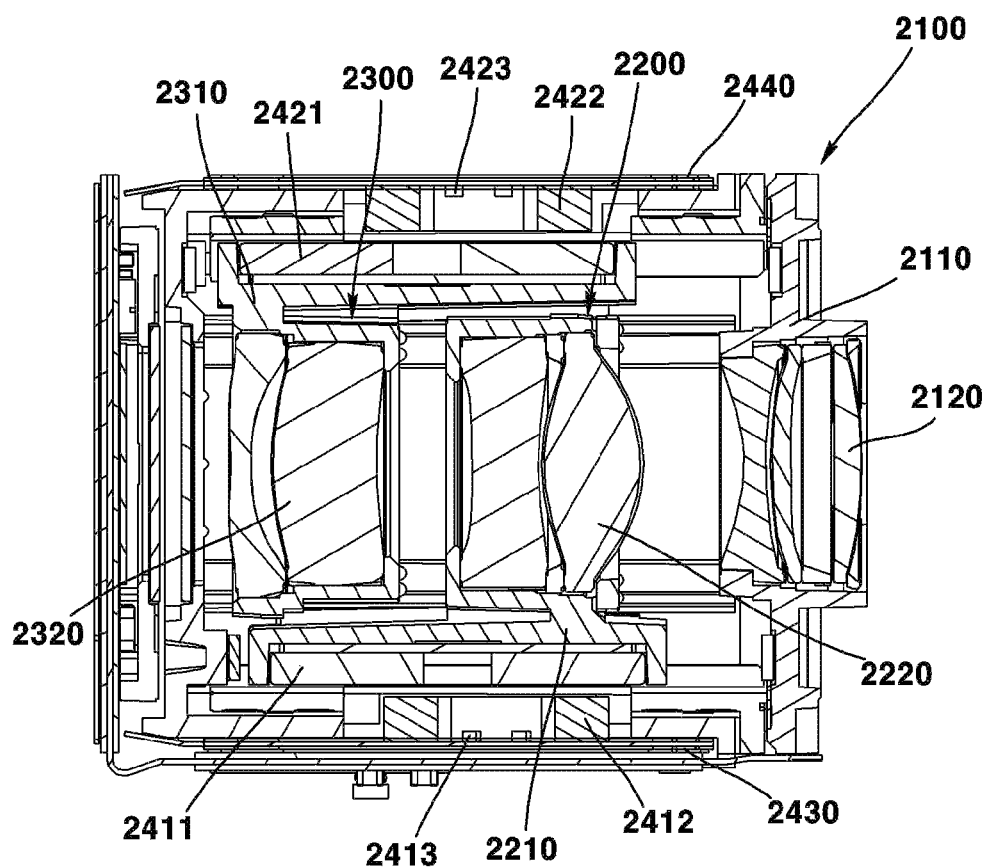
FIG. 52 is a cross-sectional view of a lens driving device according to a first embodiment of the present invention.

FIG. 35 is a perspective view of a lens driving device according to a first embodiment of the present invention; FIG. 36 is a perspective view in which some configurations of a lens driving device according to a first embodiment of the present invention are omitted; FIG. 37 is a perspective view of a lens driving device in the state illustrated in FIG. 36 as viewed from another direction; FIG. 38 is a perspective view in which some configurations of a lens driving device according to a first embodiment of the present invention are omitted; FIG. 39 is a perspective view of a state in which configurations such as a substrate and a coil are omitted in a lens driving device according to a first embodiment of the present invention; FIG. 40 is a perspective view of a state in which the first lens and related components are omitted in the lens driving device of the state illustrated in FIG. 39; FIG. 41 is a perspective view and a partially enlarged view of a part of a lens driving device according to a first embodiment of the present invention; FIG. 42 is a diagram for explaining an arrangement structure of a coil and a sensor of a lens driving device according to a first embodiment of the present invention; FIG. 43 is a perspective view illustrating a state in which the second housing is omitted in the lens driving device of the state illustrated in FIG. 39; FIG. 44 is a perspective view of a state in which a guide rail is omitted from the lens driving device of the state illustrated in FIG. 43; FIG. 45 is an enlarged view of some configurations of a lens driving device according to a first embodiment of the present invention; FIG. 46 is a perspective view of a first moving part and a second moving part of a lens driving device according to a first embodiment of the present invention, and a related configuration thereof; FIG. 47 is a perspective view of a second moving part of the lens driving device according to a first embodiment of the present invention and a related configuration; FIG. 48 is an exploded perspective view of a lens driving device according to a first embodiment of the present invention; FIG. 49 is a perspective view of a second housing of a lens driving device according to a first embodiment of the present invention; FIGS. 50 and 51 are exploded perspective views of some configurations of a lens driving device according to a first embodiment of the present invention; and FIG. 52 is a cross-sectional view of a lens driving device according to a first embodiment of the present invention.

The lens driving device 2000 may perform a zoom function. The lens driving device 2000 may perform a continuous zoom function. The lens driving device 2000 may perform an auto focus (AF) function. The lens driving device 2000 may move a lens. The lens driving device 2000 may move the lens along an optical axis. The lens driving device 2000 may move lenses formed in pluralities of groups by each group. The lens driving device 2000 may move a second group lens. The lens driving device 2000 may move a third group lens. The lens driving device 2000 may be a lens actuator. The lens driving device 2000 may be an AF actuator. The lens driving device 2000 may be a zoom actuator. The lens driving device 2000 may comprise a voice coil motor (VCM).

The lens driving device 2000 may comprise a lens. Or, the lens may be described as one configuration of the camera device 10 rather than one configuration of the lens driving device 2000. The lens may be disposed in an optical path formed by the reflective member 1220 and the image sensor 3400 of the reflective member driving device 1000. The lens may comprise pluralities of lenses. The pluralities of lenses may form pluralities of groups. The lenses may form three groups. The lens may comprise first to third lens groups. A first lens group, a second lens group, and a third lens group may be sequentially disposed between the reflective member 1220 and the image sensor 3400. The first lens group may comprise a first lens 2120. The second lens group may comprise a second lens 2220. The third lens group may comprise a third lens 2320.

The lens driving device 2000 may comprise a fixed part 2100. The fixed part 2100 may be a relatively fixed part when the first moving part 2200 and the second moving part 2300 are moved.

The lens driving device 2000 may comprise a housing 2110. The fixed part 2100 may comprise a housing 2110. The housing 2110 may be disposed outside the first holder 2210 and the second holder 2310. The housing 2110 may accommodate at least a portion of the first holder 2210 and the second holder 2310. The housing 2110 may comprise a front plate, a rear plate, and pluralities of connection plates. At this time, the front plate may be referred to as an upper plate, the rear plate may be referred to as a lower plate, and the connection plate may be referred to as a side plate.

The housing 2110 may comprise a first housing 2110-1. The first housing 2110-1 may form a front plate of the housing 2110. The first housing 2110-1 may be coupled to the first lens 2120. The first housing 2110-1 may be a cover. The first housing 2110-1 may be coupled to the reflective member driving device 1000. A first lens 2120 may be fixed to the first housing 2110-1.

The housing 2110 may comprise a second housing 2110-2. The second housing 2110-2 may be a housing. The second housing 2110-2 may form a rear plate and a connection plate of the housing 2110. The second housing 2110-2 may be open forward. The first housing 2110-1 may be coupled to the front of the second housing 2110-2. A portion of a guide rail 2130 may be disposed between the first housing 2110-1 and the second housing 2110-2.

The housing 2110 may comprise a first groove 2111. The first groove 2111 may be coupled to the protruding portion 1116 of the housing 1110 of the reflective member driving device 1000. The first groove 2111 may be formed in a shape corresponding to the protruding portion 1116 of the reflective member driving device 1000. An adhesive for coupling the reflective member driving device 1000 to the lens driving device 2000 may be disposed in the first groove 2111.

The housing 2110 may comprise a second groove 2112. The second groove 2112 may be coupled to the protrusion 1117 of the housing 1110 of the reflective member driving device 1000. The protrusion 1117 of the reflective member driving device 1000 may be inserted into the second groove 2112. The second groove 2112 may be formed in a shape corresponding to the protrusion 1117 of the reflective member driving device 1000. An adhesive for coupling the reflective member driving device 1000 to the lens driving device 2000 may be disposed in the second groove 2112.

The housing 2110 may comprise a first hole 2113. The first hole 2113 may expose the protrusion 2211 of the first holder 2210 and the protrusion 2311 of the second holder 2310. The first hole 2113 may be formed in the connection plate of the housing 2110. In the manufacturing test step, by checking the protrusion 2211 of the first holder 2210 and the protrusion 2311 of the second holder 2310 being exposed through the first hole 2113, it can be checked whether the lens driving device 2000 is operating normally.

The housing 2110 may comprise a plate 2113-1. The plate 2113-1 may cover the first hole 2113. The plate 2113-1 is disposed in the first hole 2113 and may close the first hole 2113.

The housing 2110 may comprise a second hole 2114. The second hole 2114 may be a coil accommodating hole in which a first coil 2412 and a second coil 2422 are disposed. The first coil 2412 and the second coil 2422 may be disposed in the second hole 2114. The second hole 2114 may be formed to be larger than the first coil 2412 and the second coil 2422.

The housing 2110 may comprise a protrusion 2115. The protrusion 2115 may be formed in the second housing 2110-2. The protrusion 2115 may be formed as a two-step protrusion. The protrusion 2115 may be coupled to a guide rail 2130. The protrusion 2115 may be coupled to the first housing 2110-1. The guide rail 2130 may be coupled to a portion having a large diameter of the protrusion 2115 and the first housing 2110-1 may be coupled to a portion having a small diameter of the protrusion 2115.

The protrusion 2115 may comprise a first protrusion 2115-1. The first protrusion 2115-1 may comprise a first portion having a first diameter D2 and a second portion being protruded from the first portion and having a second diameter D1. The protrusion 2115 may comprise a second protrusion 2115-2. The second protrusion 2115-2 may comprise a third portion having a third diameter D3 and a fourth portion being protruded from the third portion and having a fourth diameter D4. At this time, the fourth diameter D4 may be smaller than the second diameter D1. Through this, the first protrusion 2115-1 may be more tightly coupled to the first housing 2110-1 than the second protrusion 2115-2.

The housing 2110 may comprise a guide protrusion 2116. The guide protrusion 2116 may be formed on an inner surface of the housing 2110. The guide protrusion 2116 may be formed in a shape corresponding to the shape of at least a portion of a first holder 2210 and a second holder 2310.

Through this, the guide protrusion 2116 may guide the movement of the first holder 2210 and the second holder 2310 in an optical axis direction. In this case, the optical axis direction may be a z-axis direction perpendicular to the x-axis and the y-axis. The guide protrusion 2116 may be disposed in an optical axis direction. The guide protrusion 2116 may be extended in an optical axis direction.

The housing 2110 may comprise a groove 2117. The groove 2117 may be formed in the first housing 2110-1. The groove 2117 of the first housing 2110-1 may be coupled to the protrusion 2115 of the second housing 2110-2.

The housing 2110 may comprise a protrusion 2118. The protrusion 2118 may be coupled to the substrate 2140. The protrusion 2118 may be inserted into the groove of the substrate 2140. The protrusion 2118 may be formed to have a corresponding size and shape to fit into the groove of the substrate 2140.

The housing 2110 may comprise a vent hole 2119. The vent hole 2119 may be formed in a rear plate of the housing 2110. The vent hole 2119 may form a gap between the housing 2110 and a dummy glass 2600. Air may flow into the gap between the housing 2110 and the dummy glass 2600. A gas generated during the curing process of the adhesive may escape through the vent hole 2119.

The lens driving device 2000 may comprise a first lens 2120. Or, the first lens 2120 may be explained as one configuration of the camera device 10 rather than one configuration of the lens driving device 2000. The fixed part 2100 may comprise a first lens 2120. The first lens 2120 may be disposed on the optical axis. The first lens 2120 may be disposed between the reflective member 1220 and the image sensor 3400. The first lens 2120 may be disposed between the reflective member 1220 and the second lens 2220. The first lens 2120 may be disposed in the first housing 2110-1. The first lens 2120 may be fixed to the first housing 2110-1. The first lens 2120 may maintain a fixed state even when the second lens 2220 and the third lens 2320 are being moved.

The first lens 2120 may be a first lens group. The first lens 2120 may comprise pluralities of lenses. The first lens 2120 may comprise three lenses.

The lens driving device 2000 may comprise a guide rail 2130. The fixed part 2100 may comprise a guide rail 2130. The guide rail 2130 may be coupled between the first housing 2110-1 and the second housing 2110-2. The guide rail 2130 may guide the movement of the first holder 2210 and the second holder 2310. The rail 2130 may guide the first holder 2210 and the second holder 2310 to move in the optical axis direction. The guide rail 2130 may comprise a rail disposed in the optical axis direction. The guide rail 2130 may comprise a rail being extended in the optical axis direction. The guide rail 2130 may comprise a rail formed so that the ball 2500 rolls.

The lens driving device 2000 may comprise a substrate 2140. The fixed part 2100 may comprise a substrate 2140. The substrate 2140 may be disposed on both side surfaces of the housing 2110. The substrate 2140 may be disposed on both side surfaces of the housing 2110. The substrate 2140 may be an FPCB. A first coil 2412 and a second coil 2422 may be disposed on the substrate 2140.

The substrate 2140 may comprise a first region 2140-1. The first region 2140-1 may be formed at an end of the substrate 2140. A terminal may be disposed in the first region 2140-1. The substrate 2140 may comprise a second region 2140-2. The first region 2140-1 of the substrate 2140 may be bent inward with respect to the second region 2140-2. Through this, the size of the printed circuit board 3300 can be minimized while securing a region for soldering arrangement that connects the terminals of the board 2140 and the printed circuit board 3300. The first region 2140-1 may form an obtuse angle with the second region 2140-2.

The substrate 2140 may comprise a first substrate 2141. The first substrate 2141 may be disposed at one side of the housing 2110. A first coil 2412 may be disposed on the first substrate 2141. First and second Hall sensors 2413 and 2414 may be disposed on the first substrate 2141.

The substrate 2140 may comprise a second substrate 2142. The second substrate 2142 may be disposed at the other side of the housing 2110. The second substrate 2142 may be disposed at an opposite side of the first substrate 2141. A second coil 2422 may be disposed on the second substrate 2142. Third and fourth Hall sensors 2423 and 2424 may be disposed on the second substrate 2142.

The lens driving device 2000 may comprise a suspension (SUS) 2145. The suspension 2145 may be disposed on the substrate 2140. The suspension 2145 may reinforce the strength of the substrate 2140. The suspension 2145 may dissipate heat generated by the substrate 2140.

The lens driving device 2000 may comprise an EEPROM 2150. The EEPROM 2150 may be electrically connected to the first coil 2412 and the second coil 2422. The EEPROM 2150 may be used to control currents applied to the first coil 2412 and the second coil 2422 before connecting the lens driving device 2000 to the driver IC 3900 in the manufacturing stage. That is, the EEPROM 2150 may be used to test whether the lens driving device 2000 operates normally. The EEPROM 2150 may be disposed on an inner surface of the substrate 2140.

The lens driving device 2000 may comprise a first moving part 2200. The first moving part 2200 may move against the fixed part 2100. At least a portion of the first moving part 2200 may be disposed between the fixed part 2100 and the second moving part 2300. The first moving part 2200 may move between the fixed part 2100 and the second moving part 2300.

The lens driving device 2000 may comprise a first holder 2210. The first moving part 2200 may comprise a first holder 2210. The first holder 2210 may be disposed inside the housing 2110. The first holder 2210 may move against the housing 2110. At least a portion of the first holder 2210 may be spaced apart from the housing 2110. The first holder 2210 may be in contact with the housing 2110. The first holder 2210 may be in contact with the housing 2110 when moving. Or, in the initial state, the first holder 2210 may be in contact with the housing 2110.

The first holder 2210 may comprise a protrusion 2211. The protrusion 2211 may be a test protrusion. The protrusion 2211 may be formed on the outer surface of the first holder 2210. The protrusion 2211 may be protruded from the first holder 2210. The protrusion 2211 can be seen from the outside through the first hole 2113 of the housing 2110. The protrusion 2211 may be used to test whether the lens driving device 2000 operates normally. The protrusion 2211 may comprise a flat surface 2211-1 and an inclined surface 2211-2.

The first holder 2210 may comprise a rail groove 2212. A ball 2500 may be disposed in the rail groove 2212. In the rail groove 2212, the ball 2500 may be moved by rolling. The rail groove 2212 and the ball 2500 may be in contact at two points. The rail groove 2212 may be disposed in an optical axis direction. The rail groove 2212 may be extended in an optical axis direction.

The rail groove 2212 may comprise pluralities of rail grooves. The rail groove 2212 may comprise four rail grooves. The rail groove 2212 may comprise first to fourth rail grooves. One or more balls 2500 may be disposed in each of the pluralities of rail grooves 2212.

The first holder 2210 may comprise a protrusion 2213. The protrusion 2213 may be formed on the surface facing the first housing 2110-1 of the first holder 2210. The first holder 2210 may comprise a first surface facing the first housing 2110-1, and pluralities of protrusions 2213 formed on the first surface and being in contact with the first housing 2110-1. The protrusion 2213 may be in contact with the first housing 2110-1 when the first holder 2210 moves in a direction getting closer to the first housing 2110-1. At this time, when the protrusion 2213 is formed, the contact area between the first holder 2210 and the first housing 2110-1 can be reduced compared to the case where the protrusion 2213 is omitted. Through this, shock and noise generated due to the contact between the first holder 2210 and the first housing 2110-1 can be minimized.

The lens driving device 2000 may comprise a second lens 2220. Or, the second lens 2220 may be described as one configuration of the camera device 10 rather than one configuration of the lens driving device 2000. The first moving part 2200 may comprise a second lens 2220. The second lens 2220 may be disposed in an optical axis. The second lens 2220 may be disposed between the reflective member 1220 and the image sensor 3400. The second lens 2220 may be disposed between the first lens 2120 and the third lens 2320. The second lens 2220 may be disposed in the first holder 2210. The second lens 2220 may be coupled to the first holder 2210. The second lens 2220 may be fixed to the first holder 2210. The second lens 2220 may move against the first lens 2120. The second lens 2220 may move separately from the third lens 2320.

The second lens 2220 may be a second lens group. The second lens 2220 may comprise pluralities of lenses. The second lens 2220 may comprise two lenses.

The lens driving device 2000 may comprise a second moving part 2300. The second moving part 2300 may move against the fixed part 2100. The second moving part 2300 may move separately from the first moving part 2200. The second moving part 2300 may be disposed at a rear side of the first moving part 2200. The second moving part 2300 may move in a direction getting closer to and away from the first moving part 2200.

The lens driving device 2000 may comprise a second holder 2310. The second moving part 2300 may comprise a second holder 2310. The second holder 2310 may be disposed inside the housing 2110. The second holder 2310 may move against the housing 2110. At least a portion of the second holder 2310 may be spaced apart from the housing 2110. The second holder 2310 may be in contact with the housing 2110. The second holder 2310 may be in contact with the housing 2110 when moving. Or, in the initial state, the second holder 2310 may be in contact with the housing 2110. The second holder 2310 may be in contact with the first holder 2210. The second holder 2310 may be spaced apart from the first holder 2210. The second holder 2310 may be in contact with the first holder 2210 when moving. Or, in the initial state, the second holder 2310 may be in contact with the first holder 2210.

The second holder 2310 may comprise a protrusion 2311. The protrusion 2311 may be a test protrusion. The protrusion 2311 may be formed on an outer surface of the second holder 2310. The protrusion 2311 may be protruded from the second holder 2310. The protrusion 2311 can be seen from the outside through the first hole 2113 of the housing 2110. The protrusion 2311 may be used to test whether the lens driving device 2000 operates normally. The protrusion 2311 may comprise a flat surface 2311-1 and an inclined surface 2311-2.

The second holder 2310 may comprise a rail groove 2312. A ball 2500 may be disposed in the rail groove 2312. In the rail groove 2312, the ball 2500 may move by rolling. The rail groove 2312 and the ball 2500 may be in contact at two points. The rail groove 2312 may be disposed in an optical axis direction. The rail groove 2312 may be extended in an optical axis direction.

The rail groove 2312 may comprise pluralities of rail grooves. The rail groove 2312 may comprise four rail grooves. The rail groove 2312 may comprise first to fourth rail grooves. One or more balls 2500 may be disposed in each of the pluralities of rail grooves 2312.

The second holder 2310 may comprise a protrusion 2313. The protrusion 2313 may be formed on a surface facing the first holder 2210 of the second holder 2310. The second holder 2310 may comprise a second surface facing the first holder 2210 and pluralities of protrusions 2313 formed on a second surface and being in contact with the second holder 2310. The protrusion 2313 may be in contact with the first holder 2210 when the second holder 2310 moves in a direction getting closer to the first holder 2210. At this time, when the protrusion 2313 is formed, the contact area between the second holder 2310 and the first holder 2210 can be reduced compared to the case where the protrusion 2313 is omitted. Through this, the impact and noise generated due to the contact between the second holder 2310 and the first holder 2210 can be minimized.

The lens driving device 2000 may comprise a third lens 2320. Or, the third lens 2320 may be described as one configuration of the camera device 10 rather than one configuration of the lens driving device 2000. The second moving part 2300 may comprise a third lens 2320. The third lens 2320 may be disposed in an optical axis. The third lens 2320 may be disposed between the reflective member 1220 and the image sensor 3400. The third lens 2320 may be disposed between the second lens 2220 and the image sensor 3400. The third lens 2320 may be disposed in the second holder 2310. The third lens 2320 may be coupled to the second holder 2310. The third lens 2320 may be fixed to the second holder 2310. The third lens 2320 may move against the first lens 2120. The third lens 2320 may move separately from the second lens 2220.

The third lens 2320 may be a third lens group. The third lens 2320 may comprise pluralities of lenses. The third lens 2320 may comprise two lenses.

The lens driving device 2000 may comprise a driving unit 2400. The driving unit 2400 may move at least some of the pluralities of lenses. The driving unit 2400 may move the first moving part 2200 and the second moving part 2300 against the fixed part 2100. The driving unit 2400 may comprise a coil and a magnet. The driving unit 2400 may move the first moving part 2200 and the second moving part 2300 through electromagnetic interaction. In a modified embodiment, the driving unit 2400 may comprise a shape memory alloy.

The driving unit 2400 may comprise a first driving unit 2410. The first driving unit 2410 may move the first moving part 2200 against the fixed part 2100. The first driving unit 2410 may move the first moving part 2200 against the second moving part 2300. The first driving unit 2410 may be used to drive a zoom function. Or, the first driving unit 2410 may be used to drive an autofocus function.

The first driving unit 2410 may comprise a first driving magnet 2411. The first driving magnet 2411 may be disposed in the first moving part 2200. The first driving magnet 2411 may be disposed in the first holder 2210. The first driving magnet 2411 may be disposed on a side surface of the first holder 2210. The first driving magnet 2411 may be coupled to the first holder 2210. The first driving magnet 2411 may be fixed to the first holder 2210. The first driving magnet 2411 may be fixed to the first holder 2210 by an adhesive. The first driving magnet 2411 may move integrally with the first holder 2210. The first driving magnet 2411 may be disposed to face the first coil 2412. The first driving magnet 2411 may face the first coil 2412. The first driving magnet 2411 may be disposed at a position corresponding to the first coil 2412. The first driving magnet 2411 may interact with the first coil 2412. The first driving magnet 2411 may electromagnetically interact with the first coil 2412.

The first driving magnet 2411 may comprise a first magnet portion 2411-1. The first magnet portion 2411-1 may have a first polarity. The first driving magnet 2411 may comprise a second magnet portion 2411-2. The second magnet portion 2411-2 may have a second polarity different from the first polarity. At this time, the first polarity may be an N pole and the second polarity may be an S pole. Conversely, the first polarity may be an S pole and the second polarity may be an N pole.

The first driving magnet 2411 may comprise a neutral portion 2411-3. The neutral portion 2411-3 may be disposed between the first magnet portion 2411-1 and the second magnet portion 2411-2. The neutral portion 2411-3 may have a neutral polarity. The neutral portion 2411-3 may be a portion not being magnetized.

The first driving unit 2410 may comprise a first coil 2412. The first coil 2412 may be disposed on the substrate 2140. The first coil 2412 may be disposed on the first substrate 2141. The first coil 2412 may be disposed in the housing 2110. The first coil 2412 may be disposed outside the first holder 2210. When a current is applied to the first coil 2412, an electromagnetic field is formed around the first coil 2412 to interact with the first driving magnet 2411.

As a modified embodiment, the first coil 2412 may be disposed on the first holder 2210 and the first driving magnet 2411 may be disposed in the housing 2110.

The first coil 2412 may be formed in a ring shape. The first coil 2412 may be formed as a square ring or a circular ring. Even when the first coil 2412 is formed in a rectangular ring shape, the corner portion may be formed to be curved. The first coil 2412 may comprise a first portion 2412-1 and a second portion 2412-2 having a gap G1 therebetween. First and second Hall sensors 2413 and 2414 may be disposed in the gap G1 of the first coil 2412.

The lens driving device 2000 may comprise a Hall sensor. The Hall sensor may detect the first driving magnet 2411. The Hall sensor may comprise pluralities of Hall sensors. The Hall sensor may comprise a first Hall sensor 2413 and a second Hall sensor 2414. The first Hall sensor 2413 and the second Hall sensor 2414 may be spaced apart from each other. The first Hall sensor 2413 and the second Hall sensor 2414 may be spaced apart to form a gap G2 therebetween. The first Hall sensor 2413 and the second Hall sensor 2414 may detect the first driving magnet 2411. The first Hall sensor 2413 and the second Hall sensor 2414 may detect a magnetic force of the first driving magnet 2411. The first Hall sensor 2413 and the second Hall sensor 2414 may detect the position of the first holder 2210. The first Hall sensor 2413 and the second Hall sensor 2414 may detect the position of the second lens 2220.

The lens driving device 2000 may comprise a yoke 2415. The yoke 2415 may be disposed between the first driving magnet 2411 and the first holder 2210. The yoke 2415 may be disposed between the first driving magnet 2411 and the first moving part 2200. The yoke 2415 may be formed in a shape corresponding to the first driving magnet 2411. The yoke 2415 may increase the interaction force between the first driving magnet 2411 and the first coil 2412.

The yoke 2415 may comprise an extension portion 2415-1. The extension portion 2415-1 may surround the front and rear side surfaces of the first driving magnet 2411. The yoke 2415 may comprise a groove 2415-2. The groove 2415-2 may be formed in the central portion of the body portion of the yoke 2415.

The driving unit 2400 may comprise a second driving unit 2420. The second driving unit 2420 may move the second moving part 2300 against the fixed part 2100. The second driving unit 2420 may move the second moving part 2300 against the first moving part 2200. The second driving unit 2420 may be used to drive the auto focus function. Or, the second driving unit 2420 may be used to drive the zoom function.

The second driving unit 2420 may comprise a second driving magnet 2421. The second driving magnet 2421 may be disposed in the second moving part 2300. The second driving magnet 2421 may be disposed in the second holder 2310. The second driving magnet 2421 may be disposed on a side surface of the second holder 2310. The second driving magnet 2421 may be coupled to the second holder 2310. The second driving magnet 2421 may be fixed to the second holder 2310. The second driving magnet 2421 may be fixed to the second holder 2310 by an adhesive. The second driving magnet 2421 may move integrally with the second holder 2310. The second driving magnet 2421 may be disposed to face the second coil 2422. The second driving magnet 2421 may face the second coil 2422. The second driving magnet 2421 may be disposed at a position corresponding to the second coil 2422. The second driving magnet 2421 may interact with the second coil 2422. The second driving magnet 2421 may electromagnetically interact with the second coil 2422.

The second driving unit 2420 may comprise a second coil 2422. The second coil 2422 may be disposed in the fixed part 2100. The second coil 2422 may be disposed at a position corresponding to the second driving magnet 2421. The second coil 2422 may be disposed on the substrate 2140. The second coil 2422 may be disposed on the second substrate 2142. The second coil 24222 may be disposed in the housing 2110. The second coil 2422 may be disposed outside the second holder 2310. When a current is applied to the second coil 2422, an electromagnetic field is formed around the second coil 2422 to interact with the second driving magnet 2421.

As a modified embodiment, the second coil 2422 may be disposed on the second holder 2310 and the second driving magnet 2421 may be disposed on the housing 2110.

The lens driving device 2000 may comprise a Hall sensor. The Hall sensor may detect the second driving magnet 2421. The Hall sensor may comprise pluralities of Hall sensors. The Hall sensor may comprise a third Hall sensor 2423 and a fourth Hall sensor 2424. The third Hall sensor 2423 and the fourth Hall sensor 2424 may be spaced apart from each other. The third Hall sensor 2423 and the fourth Hall sensor 2424 may be spaced apart to form a gap G2 therebetween. The third Hall sensor 2423 and the fourth Hall sensor 2424 may detect the second driving magnet 2421. The third Hall sensor 2423 and the fourth Hall sensor 2424 may detect a magnetic force of the second driving magnet 2421. The third Hall sensor 2423 and the fourth Hall sensor 2424 may detect the position of the second holder 2310. The third Hall sensor 2423 and the fourth Hall sensor 2424 may detect the position of the third lens 2320.

The lens driving device 2000 may comprise a yoke 2425. The yoke 2425 may be disposed between the second driving magnet 2421 and the second holder 2310. The yoke 2425 may be formed to have a shape corresponding to that of the second driving magnet 2421. The yoke 2425 may increase the interaction force between the second driving magnet 2421 and the second coil 2422.

The lens driving device 2000 may comprise a first yoke 2430. The first yoke 2430 may be a magnetic material. The first yoke 2430 may be disposed such that an attractive force acts between the first yoke 2430 and the first driving magnet 2411. The first yoke 2430 may be disposed in the housing 2110. The first yoke 2430 may be disposed on the substrate 2140. The first yoke 2430 may be disposed on the first substrate 2141. The first holder 2210 may press the ball 2500 toward the guide rail 2130 by an attractive force between the first driving magnet 2411 and the first yoke 2430. That is, the ball 2500 may be maintained between the first holder 2210 and the guide rail 2130 without being separated and removed by the attractive force between the first driving magnet 2411 and the first yoke 2430.

The lens driving device 2000 may comprise a second yoke 2440. The second yoke 2440 may be a magnetic material. The second yoke 2440 may be disposed such that an attractive force acts between the second yoke 2440 and the second driving magnet 2421. The second yoke 2440 may be disposed in the housing 2110. The second yoke 2440 may be disposed on the substrate 2140. The second yoke 2440 may be disposed on the second substrate 2142. The second holder 2310 may press the ball 2500 toward the guide rail 2130 by an attractive force between the second driving magnet 2421 and the second yoke 2440. That is, the ball 2500 may be maintained between the second holder 2310 and the guide rail 2130 without being separated and removed by the attractive force between the second driving magnet 2421 and the second yoke 2440.

The lens driving device 2000 may comprise a ball 2500. The ball 2500 may guide the movement of the first holder 2210. The ball 2500 may be disposed between the guide rail 2130 and the moving parts 2200 and 2300. The ball 2500 may be disposed between the first holder 2210 and the guide rail 2130. The ball 2500 may guide the movement of the second holder 2310. The ball 2500 may be disposed between the second holder 2310 and the guide rail 2130. The ball 2500 may be formed in a spherical shape. The ball 2500 may roll over the rail groove 2212 of the first holder 2210 and the rail 2133 of the guide rail 2130. The ball 2500 may move in an optical axis direction between the rail groove 2212 of the first holder 2210 and the rail 2133 of the guide rail 2130. The ball 2500 may roll over the rail groove 2312 of the second holder 2310 and the rail 2133 of the guide rail 2130. The ball 2500 may move in an optical axis direction between the rail groove 2312 of the second holder 2310 and the rail 2133 of the guide rail 2130. The ball 2500 may comprise pluralities of balls. The ball 2500 may be provided a total of eight, four in the first holder 2210 and four in the second holder 2310.

The lens driving device 2000 may comprise a dummy glass 2600. The dummy glass 2600 may be disposed in the housing 2110. The dummy glass 2600 may close the rear opening of the housing 2110. The dummy glass 2600 may be formed to be transparent to allow light to pass therethrough.

The lens driving device 2000 may comprise a poron 2700. The poron 2700 may be a shock absorbing member. The poron 2700 can minimize the shock and noise generated by the movement of the first holder 2210 and the second holder 2310. The poron 2700 may be disposed at a portion where the first holder 2210 collides with the housing 2110. The poron 2700 may be disposed at a portion where the second holder 2310 collides with the housing 2110.

Figure 53:
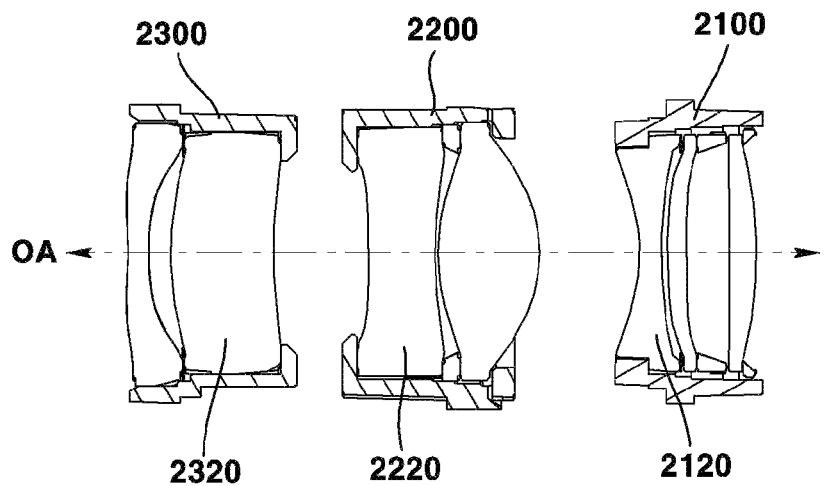
FIGS. 53 to 55 are diagrams for explaining implementation of a zoom function and an autofocus function of a lens driving device according to a first embodiment of the present invention.
Figure 54:
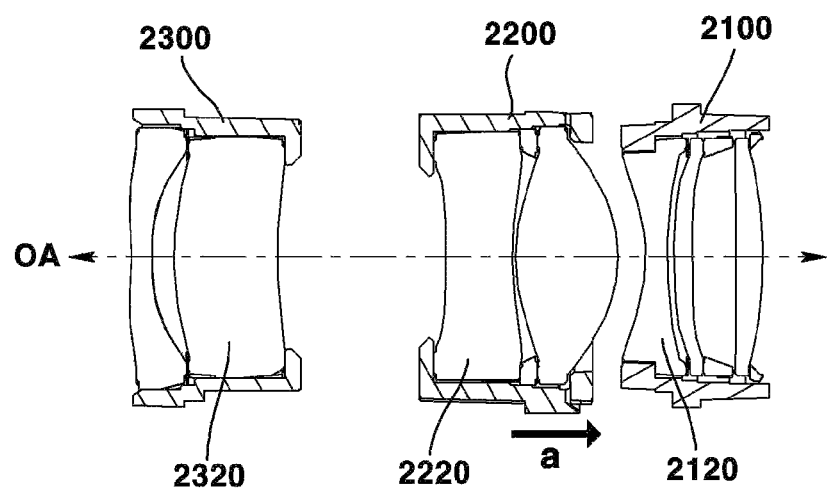
Figure 55:
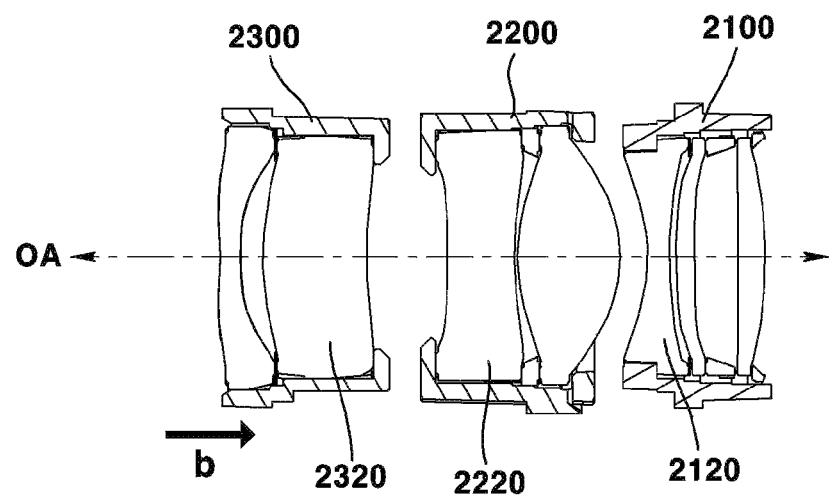

FIGS. 53 to 55 are diagrams for explaining implementation of a zoom function and an autofocus function of a lens driving device according to a first embodiment of the present invention.

In a first embodiment of the present invention, the first lens 2120, the second lens 2220, and the third lens 2320 may be disposed in a state aligned with the optical axis OA in the initial state in which current is not supplied to the driving unit 2400 (refer to FIG. 53).

At this time, when a current is applied to the first coil 2412, the second lens 2220 may move along the optical axis OA due to electromagnetic interaction between the first coil 2412 and the first driving magnet 2411 (refer to a in FIG. 54). As the second lens 2220 moves while the first lens 2120 is being fixed, a zoom function may be performed. When a current in a first direction is applied to the first coil 2412, the second lens 2220 may move in a direction getting closer to the first lens 2120. When a current in a second direction opposite to the first direction is applied to the first coil 2412, the second lens 2220 may move in a direction getting away from the first lens 2120.

Meanwhile, when a current is applied to the second coil 2422, the third lens 2320 may move along the optical axis OA due to electromagnetic interaction between the second coil 2422 and the second driving magnet 2421 (refer to FIG. 55 b). An auto focus (AF) function may be performed by relative movement of the third lens 2320 against the first lens 2120 and the second lens 2220. When a current in a first direction is applied to the second coil 2422, the third lens 2320 may move in a direction getting closer to the first lens 2120, and when a current in a second direction opposite to the first direction is applied to the second coil 2422, the third lens 2320 may move in a direction getting away from the first lens 2120.

Hereinafter, a camera device according to a first embodiment of the present invention will be described with reference to the drawings.

Figure 1:
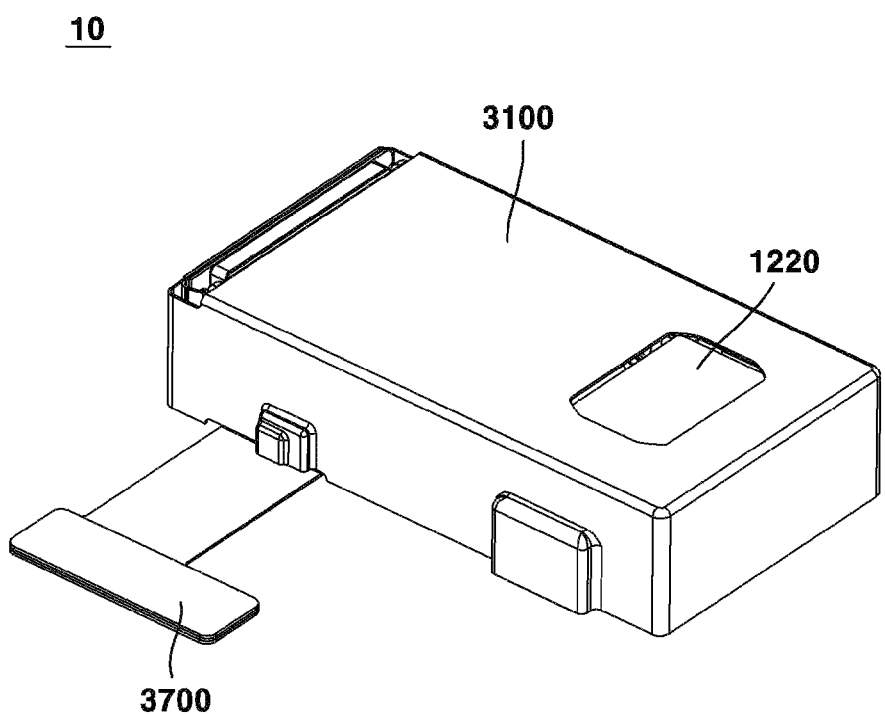
FIG. 1 is a perspective view of a camera device according to a first embodiment of the present invention.
Figure 2:
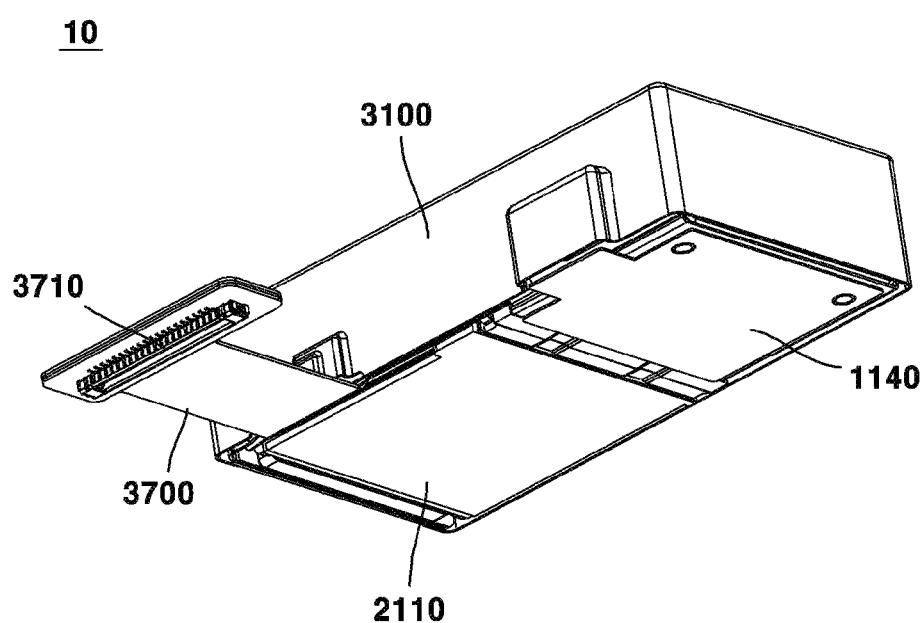
FIG. 2 is a bottom perspective view of a camera device according to a first embodiment of the present invention.
Figure 3:
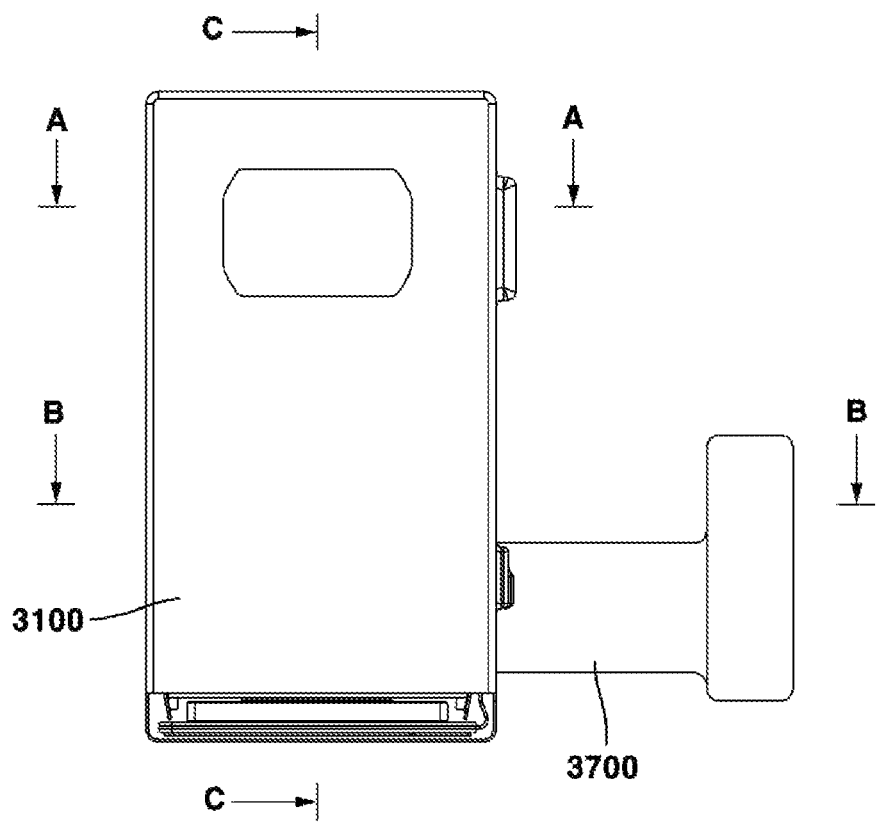
FIG. 3 is a flat surface diagram of a camera device according to a first embodiment of the present invention.
Figure 4:
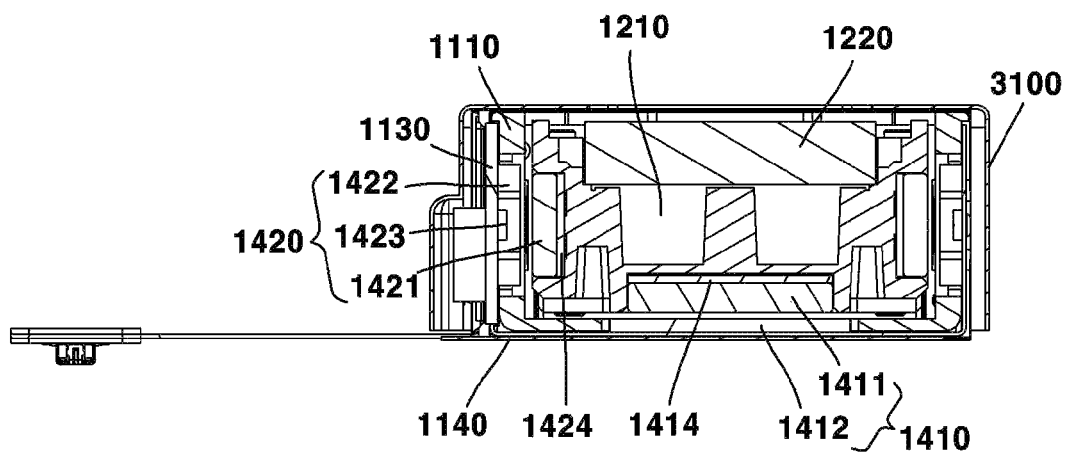
FIG. 4 is a cross-sectional view taken along line A-A of FIG. 3.
Figure 5:
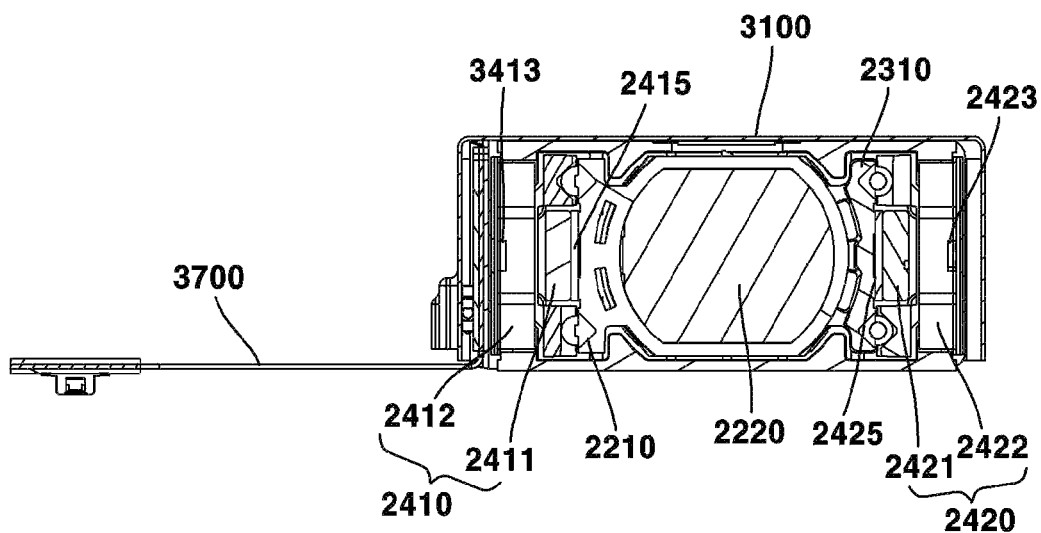
FIG. 5 is a cross-sectional view taken along line B-B of FIG. 3.
Figure 6:
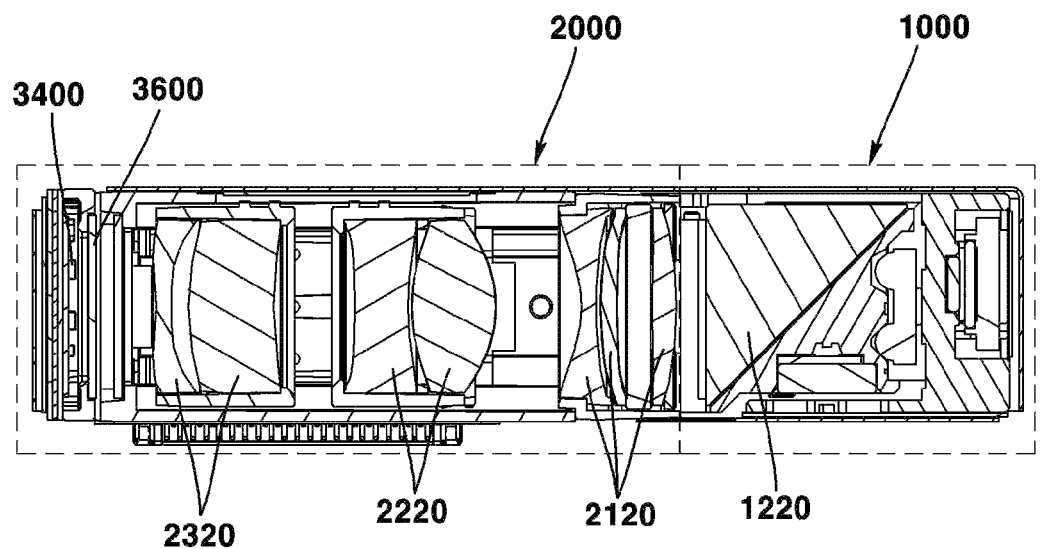
FIG. 6 is a cross-sectional view taken along line C-C of FIG. 3.
Figure 7:
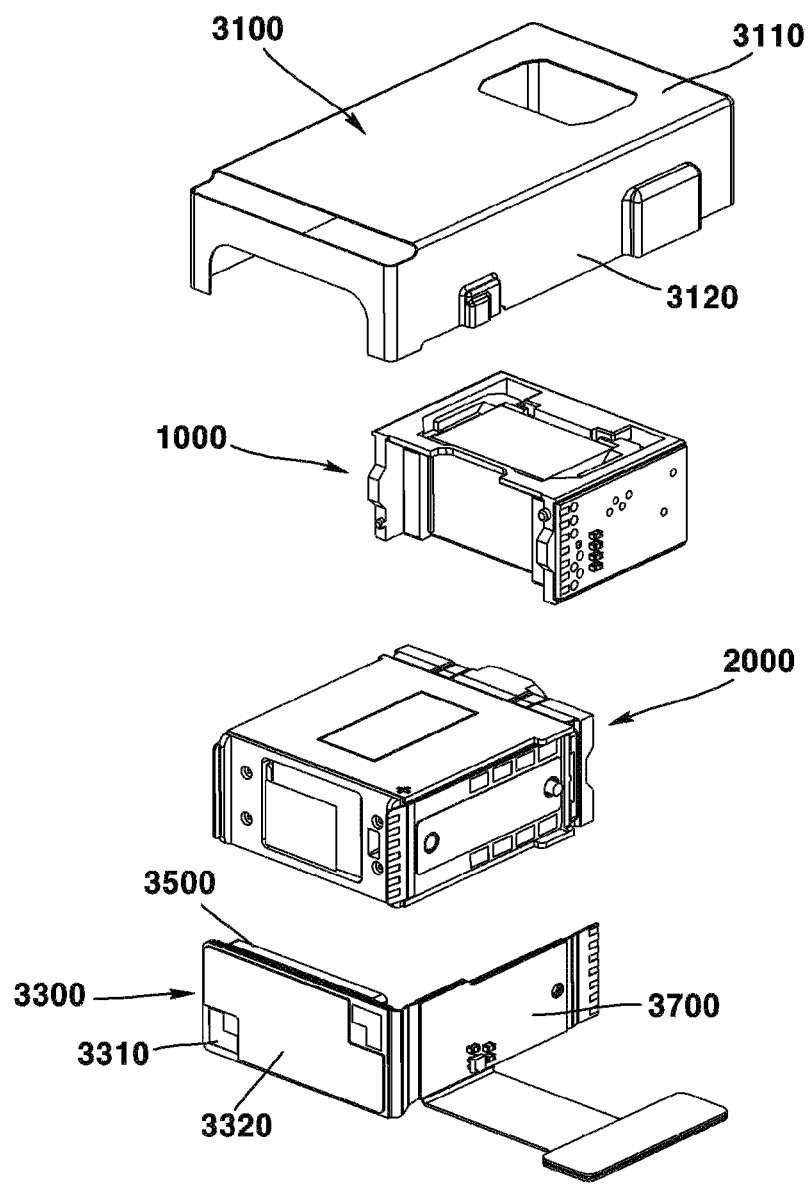
FIG. 7 is an exploded perspective view of a camera device according to a first embodiment of the present invention.
Figure 8:
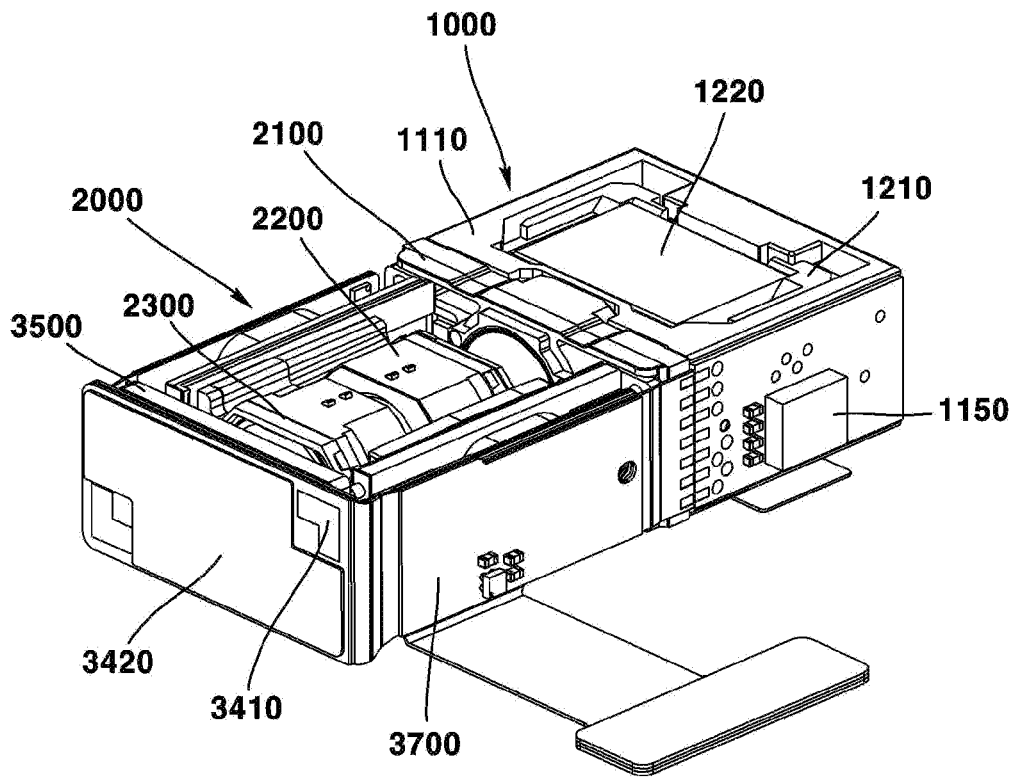
FIG. 8 is a perspective view in which the cover member is omitted from a camera device according to a first embodiment of the present invention.
Figure 56:
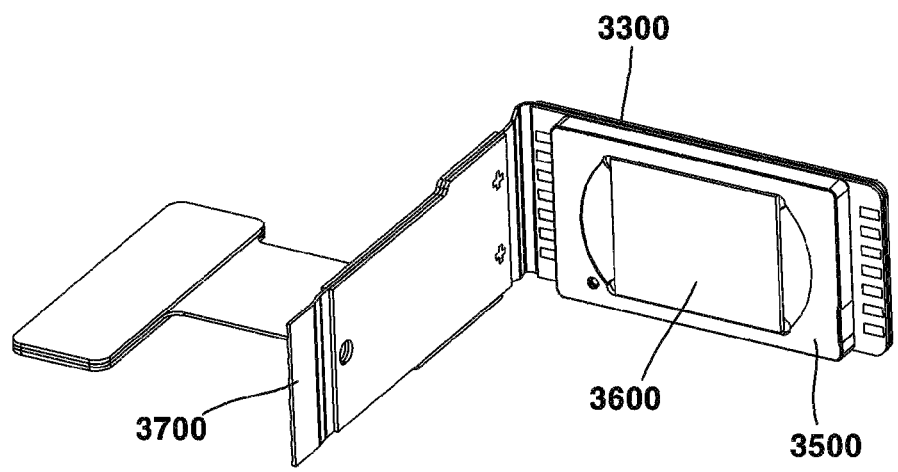
FIG. 56 is a perspective view of a partial configuration of a camera device according to a first embodiment of the present invention.
Figure 57:
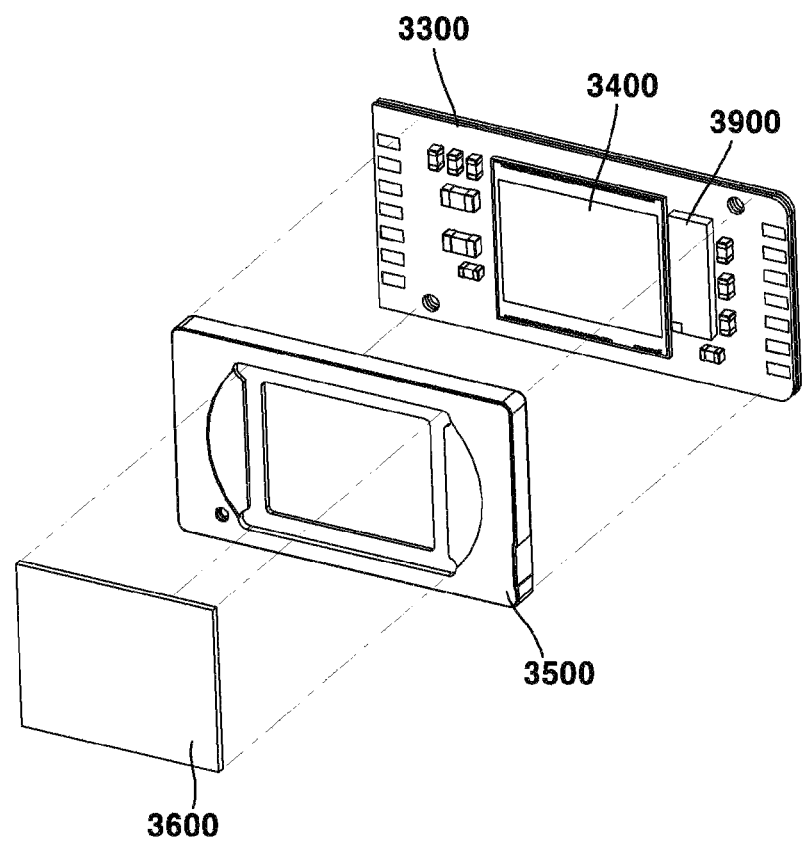
FIG. 57 is an exploded perspective view of an image sensor, a filter, and related components of a camera device according to a first embodiment of the present invention.

FIG. 1 is a perspective view of a camera device according to a first embodiment of the present invention; FIG. 2 is a bottom perspective view of a camera device according to a first embodiment of the present invention; FIG. 3 is a flat surface diagram of a camera device according to a first embodiment of the present invention; FIG. 4 is a cross-sectional view taken along line A-A of FIG. 3; FIG. 5 is a cross-sectional view taken along line B-B of FIG. 3; FIG. 6 is a cross-sectional view taken along line C-C of FIG. 3; FIG. 7 is an exploded perspective view of a camera device according to a first embodiment of the present invention; FIG. 8 is a perspective view in which the cover member is omitted from a camera device according to a first embodiment of the present invention; FIG. 56 is a perspective view of a partial configuration of a camera device according to a first embodiment of the present invention; and FIG. 57 is an exploded perspective view of an image sensor, a filter, and a related configuration of a camera device according to a first embodiment of the present invention.

The camera device 10 may comprise a cover member 3100. The cover member 3100 may be a 'cover can' or a 'shield can'. The cover member 3100 may be disposed to cover the reflective member driving device 1000 and the lens driving device 2000. The cover member 3100 may be disposed at an outer side of the reflective member driving device 1000 and the lens driving device 2000. The cover member 3100 may surround the reflective member driving device 1000 and the lens driving device 2000. The cover member 3100 may accommodate the reflective member driving device 1000 and the lens driving device 2000. The cover member 3100 may be formed of a metal material. The cover member 3100 may block electromagnetic interference (EMI).

The cover member 3100 may comprise an upper plate 3110. The upper plate 3110 may comprise an opening or a hole. Light may be incident through the opening or hole of the upper plate 3110. An opening or a hole in the upper plate 3110 may be formed at a position corresponding to the reflective member 1220.

The cover member 3100 may comprise a side plate 3120. The side plate 3120 may comprise pluralities of side plates. The side plate 3120 may comprise four side plates. The side plate 3120 may comprise first to fourth side plates. The side plate 3120 may comprise first and second side plates disposed opposite to each other, and third and fourth side plates disposed opposite to each other.

The camera device 10 may comprise a printed circuit board 3300 (PCB). The printed circuit board 3300 may be a board or a circuit board. A sensor base 3500 may be disposed on the printed circuit board 3300. The printed circuit board 3300 may be electrically connected to the reflective member driving device 1000 and the lens driving device 2000. The printed circuit board 3300 may be provided with various circuits, elements, control units, and the like to convert an image formed on the image sensor 3400 into an electrical signal and transmit it to an external device.

The printed circuit board 3300 may comprise a marking unit 3310. The marking unit 3310 may be disposed on the rear surface of the printed circuit board 3300.

The camera device 10 may comprise a suspension (SUS) 3320. The suspension 3320 may be disposed on a rear surface of the printed circuit board 3300. The suspension 3320 may reinforce the strength of the printed circuit board 3300. The suspension 3320 may radiate heat generated in the printed circuit board 3300.

The camera device 10 may comprise an image sensor 3400. The image sensor 3400 may be disposed on the printed circuit board 3300. Light passing through the lens and filter 3600 may be incident to the image sensor 3400 to form an image. The image sensor 3400 may be electrically connected to the printed circuit board 3300. For example, the image sensor 3400 may be coupled to the printed circuit board 3300 by a surface mounting technology (SMT). As another example, the image sensor 3400 may be coupled to the printed circuit board 3300 by flip chip technology. The image sensor 3400 may be disposed so that the lens and the optical axis coincide. The optical axis of the image sensor 3400 and the optical axis of the lens may be aligned. The image sensor 3400 may convert light irradiated to the effective image area of the image sensor 3400 into an electrical signal. The image sensor 3400 may comprise any one or more among a charge coupled device (CCD), a metal oxide semi-conductor (MOS), a CPD, and a CID.

The camera device 10 may comprise a sensor base 3500. The sensor base 3500 may be disposed on the printed circuit board 3300. A filter 3600 may be disposed on the sensor base 3500. An opening may be formed in a portion of the sensor base 3500 where the filter 3600 is disposed so that light passing through the filter 3600 may be incident on the image sensor 3400.

The camera device 10 may comprise a filter 3600. The filter 3600 may serve to block light of a specific frequency band from being incident on the image sensor 3400 in light passing through the lens. The filter 3600 may be disposed between the lens and the image sensor 3400. The filter 3600 may be disposed on the sensor base 3500. The filter 3600 may comprise an infrared filter. The infrared filter may block light in the infrared region from being incident on the image sensor 3400.

The camera device 10 may comprise a substrate 3700. The substrate 3700 may be connected to the printed circuit board 3300. The substrate 3700 may be extended from the printed circuit board 3300. The substrate 3700 may comprise a terminal electrically connected to the reflective member driving device 1000. The substrate 3700 may comprise an extension portion being extended outward.

The camera device 10 may comprise a connector 3710. The connector 3710 may be disposed on the board 3700. The connector 3710 may be disposed on a lower surface of the extension portion of the board 3700. The connector 3710 may be connected to, for example, a power supply unit of a smartphone.

The camera device 10 may comprise a temperature sensor 3800. The temperature sensor 3800 may detect a temperature. The temperature detected by the temperature sensor 3800 may be used for more accurate control of any one or more among a handshake correction function, an autofocus function, and a zoom function.

The camera device 10 may comprise a driver IC 3900. The driver IC 3900 may be electrically connected to the lens driving device 2000. The driver IC 3900 may be described as one configuration of the lens driving device 2000. The driver IC 3900 may be electrically connected to the first coil 2412 and the second coil 2422 of the lens driving device 2000. The driver IC 3900 may supply current to the first coil 2412 and the second coil 2422 of the lens driving device 2000. The driver IC 3900 may control at least one of a voltage or a current applied to each of the first coil 2412 and the second coil 2422 of the lens driving device 2000. The driver IC 3900 may be electrically connected to the Hall sensors 2413, 2414, 2423, and 2424. The driver IC 3900 may perform feedback control of the voltage and current applied to the first coil 2412 and the second coil 2422 through the positions of the second lens 2220 and the third lens 2320 detected by the Hall sensors 2413, 2414, 2423, and 2424.

Hereinafter, an optical device according to a present embodiment will be described with reference to the drawings.

Figure 58:
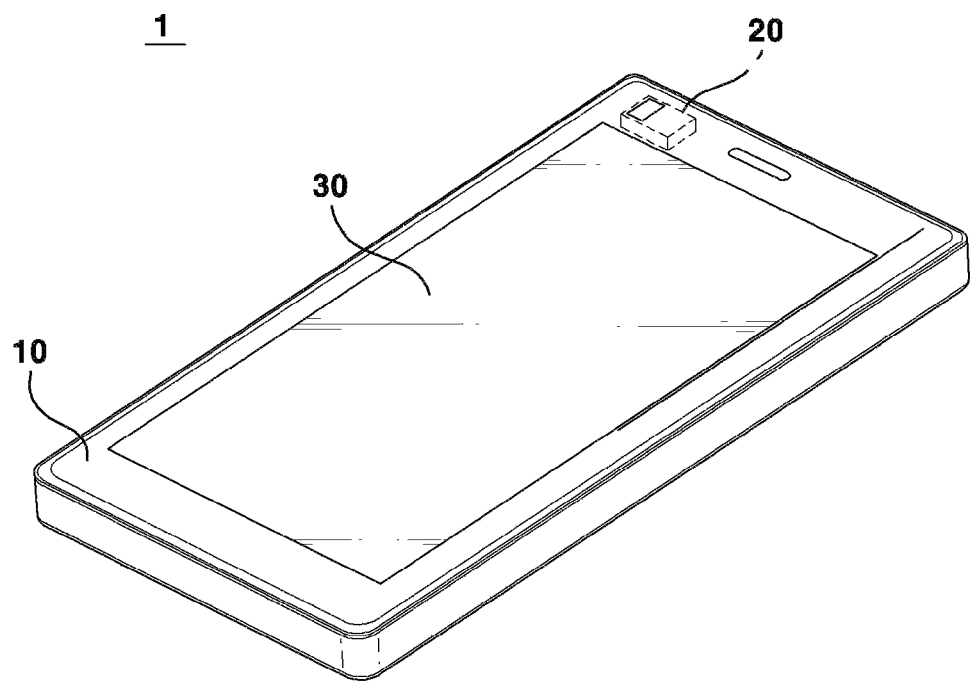
FIG. 58 is a perspective view of a front surface of an optical device according to a first embodiment of the present invention.
Figure 59:
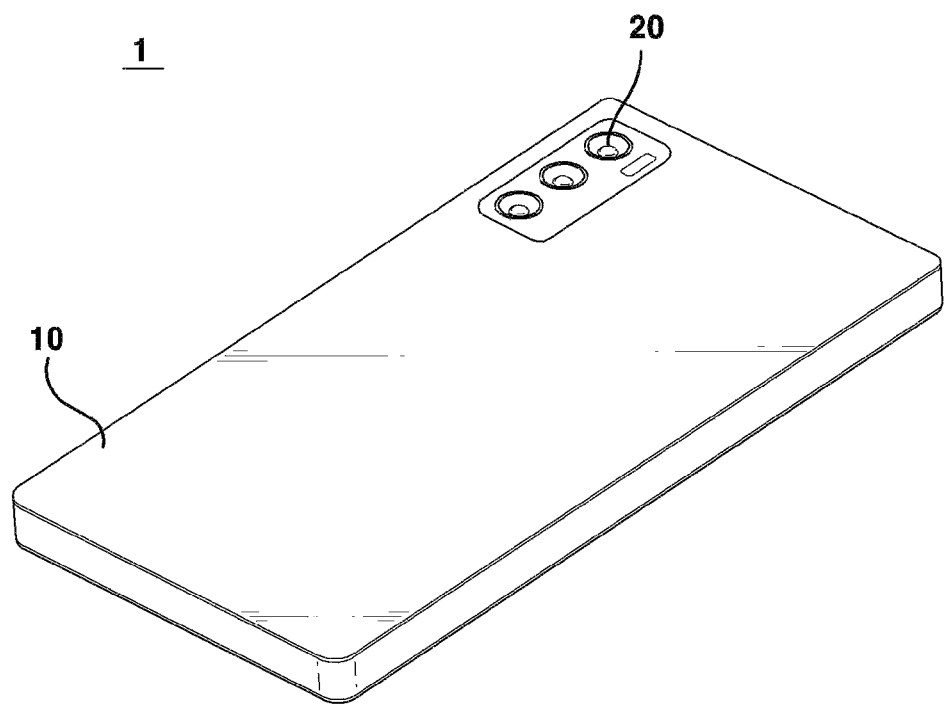
FIG. 59 is a perspective view of a rear surface of an optical device according to a first embodiment of the present invention.

FIG. 58 is a perspective view of the front side of an optical device according to a first embodiment of the present invention; and FIG. 59 is a perspective view of a rear surface of an optical device according to a first embodiment of the present invention.

The optical device 1 may comprise any one or more among a hand phone, a mobile phone, a portable terminal, a mobile terminal, a smart phone, a smart pad, a portable smart device, a digital camera, a laptop computer, a digital broadcasting terminal, personal digital assistants (PDA), portable multimedia player (PMP), and navigation. The optical device 1 may comprise any device for photographing an image or a photo.

The optical device 1 may comprise a main body 20. The optical device 1 may comprise a camera device 10. The camera device 10 may be disposed in the main body 20. The camera device 10 may photograph a subject. The optical device 1 may comprise a display 30. The display 30 may be disposed on the main body 20. The display 30 may output any one or more of a video and an image photographed by the camera device 10. The display 30 may be disposed on a first surface of the main body 20. The camera device 10 may be disposed on any one or more of the first surface of the main body 20 and the second surface opposite to the first surface.

The camera device 10 according to a first embodiment of the present invention may be a folded camera module. The folded camera module may have an angle of view of 15 degrees to 40 degrees. The folded camera module may have a focal length of 18 mm to 20 mm or more. The folded camera module may be used as a rear camera of the optical device 1. A main camera having an angle of view of 70 degrees to 80 degrees may be disposed on the rear surface of the optical device 1. At this time, the folded camera can be disposed next to the main camera. That is, the camera device 10 according to the present embodiment may be applied to any one or more of pluralities of rear cameras of the optical device 1. The camera device 10 according to the present embodiment may be applied to one camera among the rear cameras such as two, three, four or more of the optical device 1.

Meanwhile, the camera device 10 according to a first embodiment of the present invention may be disposed on the front surface of the optical device 1. However, when the front camera of the optical device 1 is one, a wide-angle camera may be applied. When there are two or more of front cameras in the optical device 1, one of them may be a telescopic camera as in a first embodiment of the present invention. However, since the focal length is shorter than that of the rear telescopic camera, a normal camera module that does not comprise a reflective member rather than a folded camera module may be applied.

Hereinafter, a second embodiment of the present invention will be described with reference to the drawings.

Figure 60:
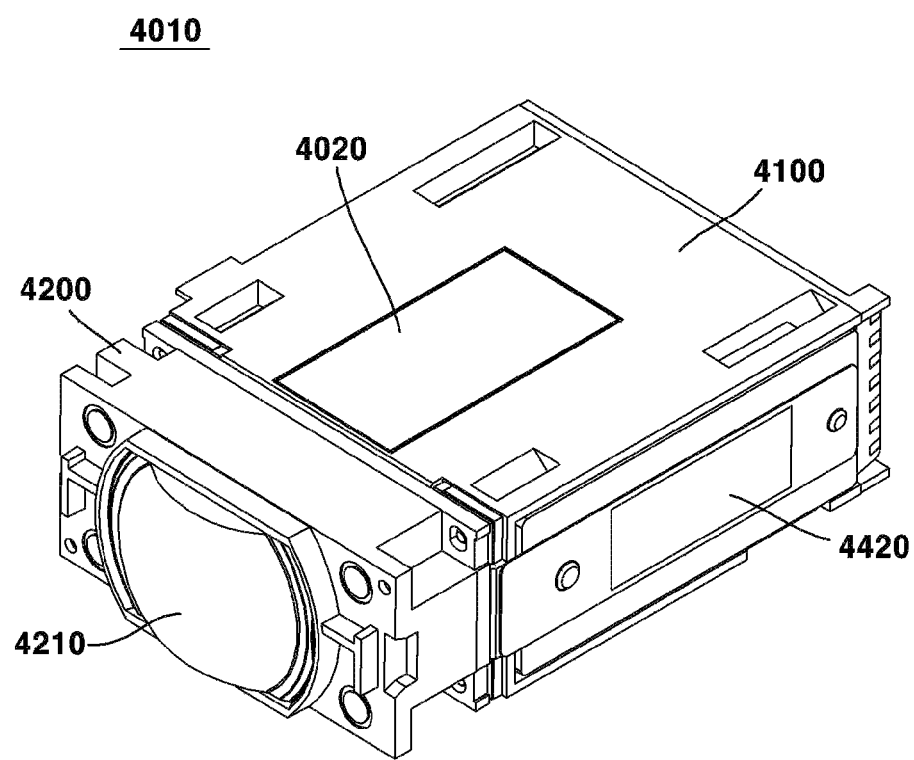
FIG. 60 is a perspective view of a camera module according to a second embodiment of the present invention.
Figure 61:
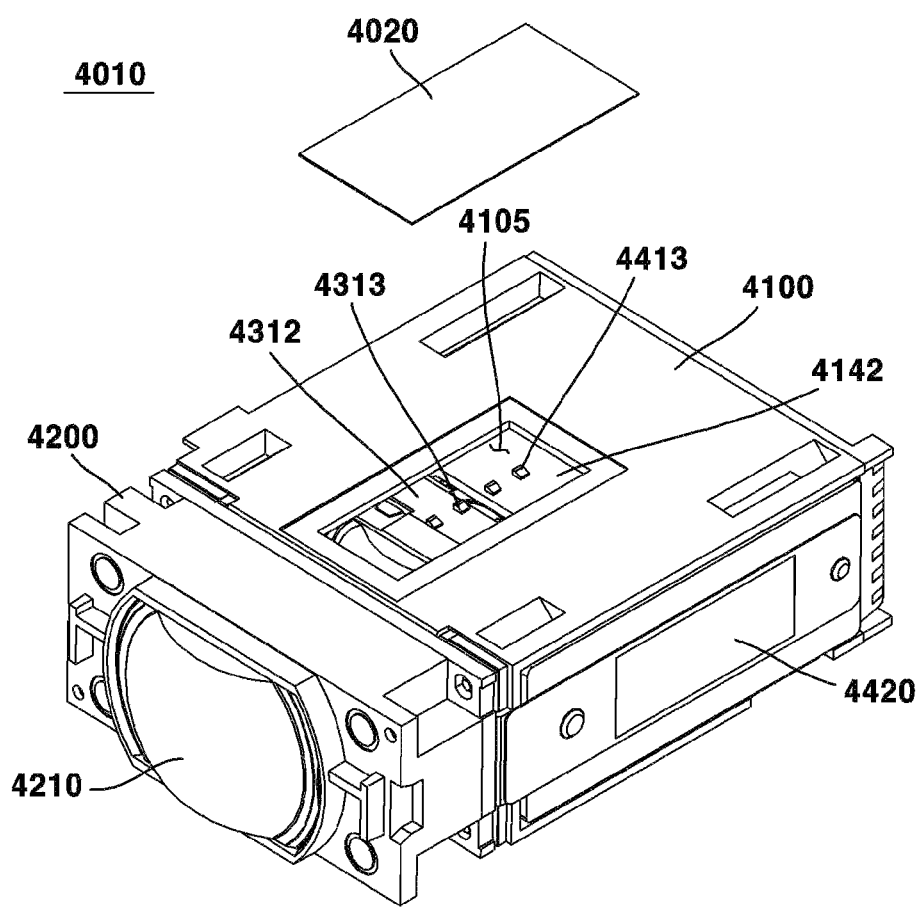
FIG. 61 is a perspective view in which the cover is disassembled in FIG. 60.
Figure 62:
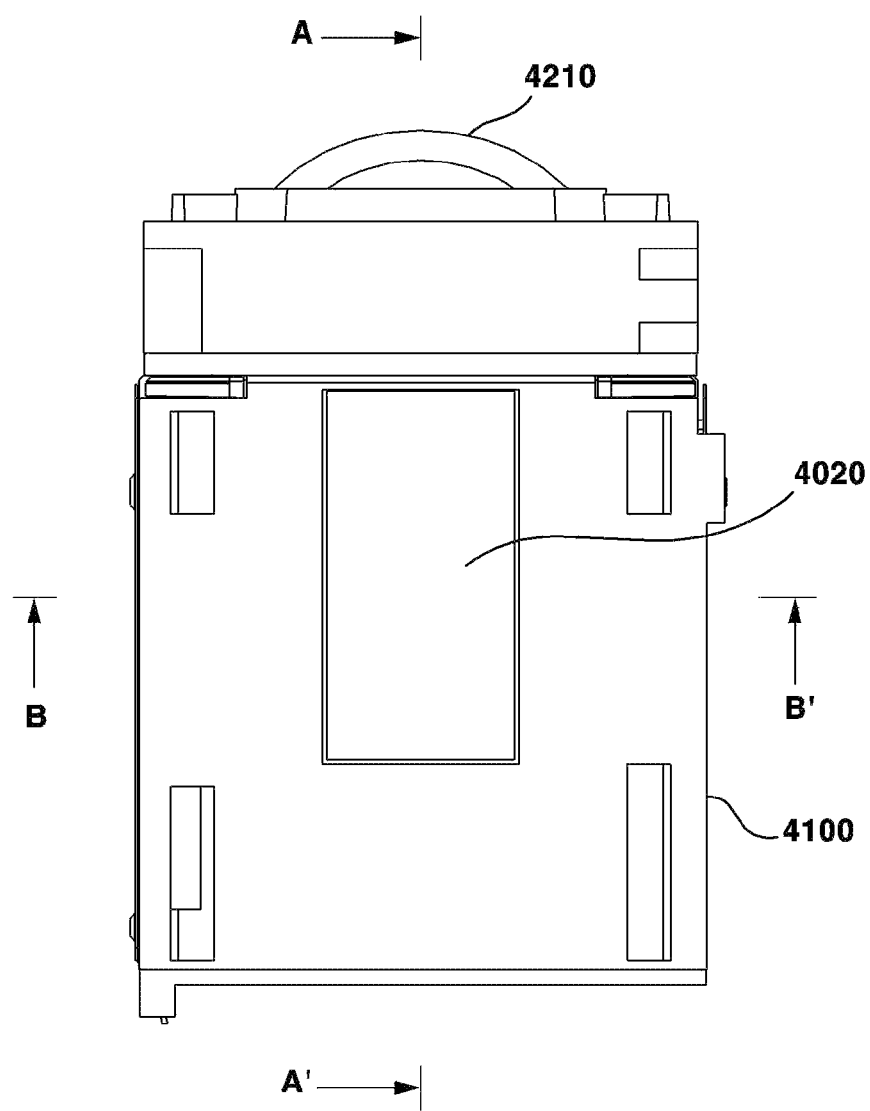
FIG. 62 is a plan view illustrating one side surface of a camera module according to a second embodiment of the present invention.
Figure 63:
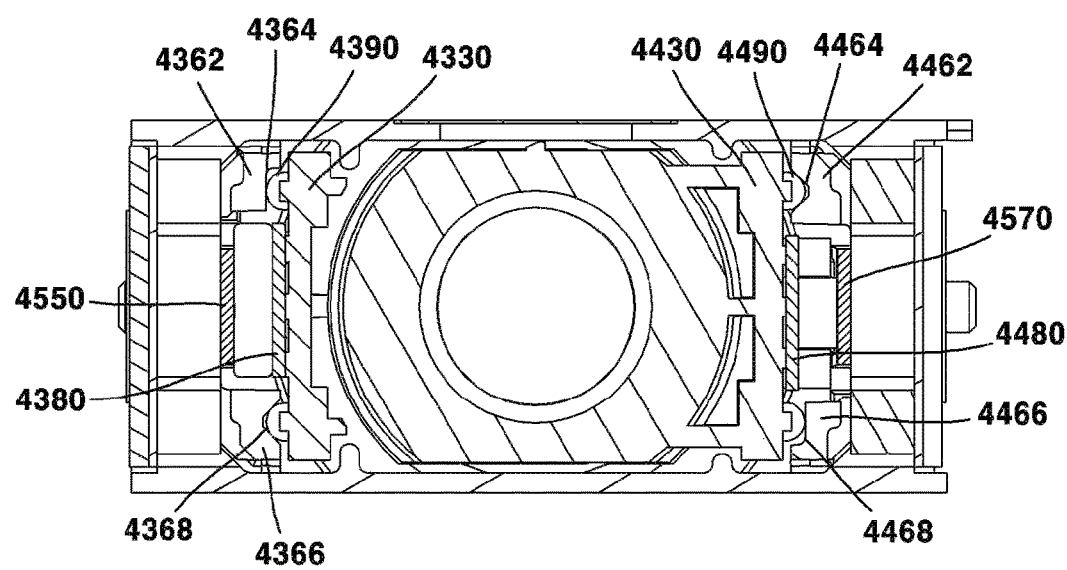
FIG. 63 is a cross-sectional view taken along line B-B' of FIG. 62.
Figure 64:
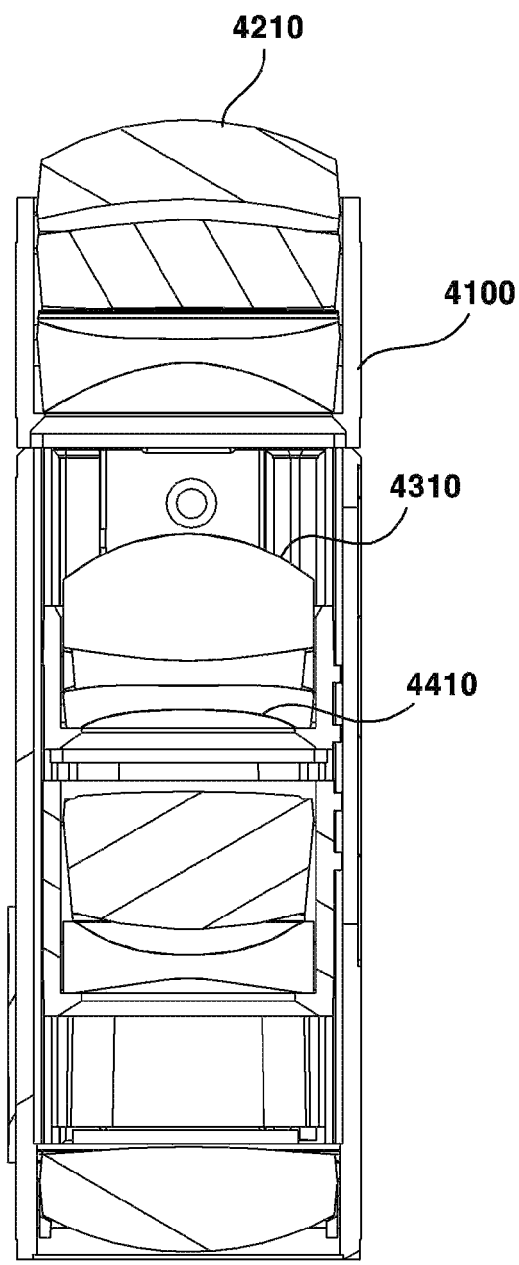
FIG. 64 is a cross-sectional view taken along line A-A' of FIG. 62.
Figure 65:
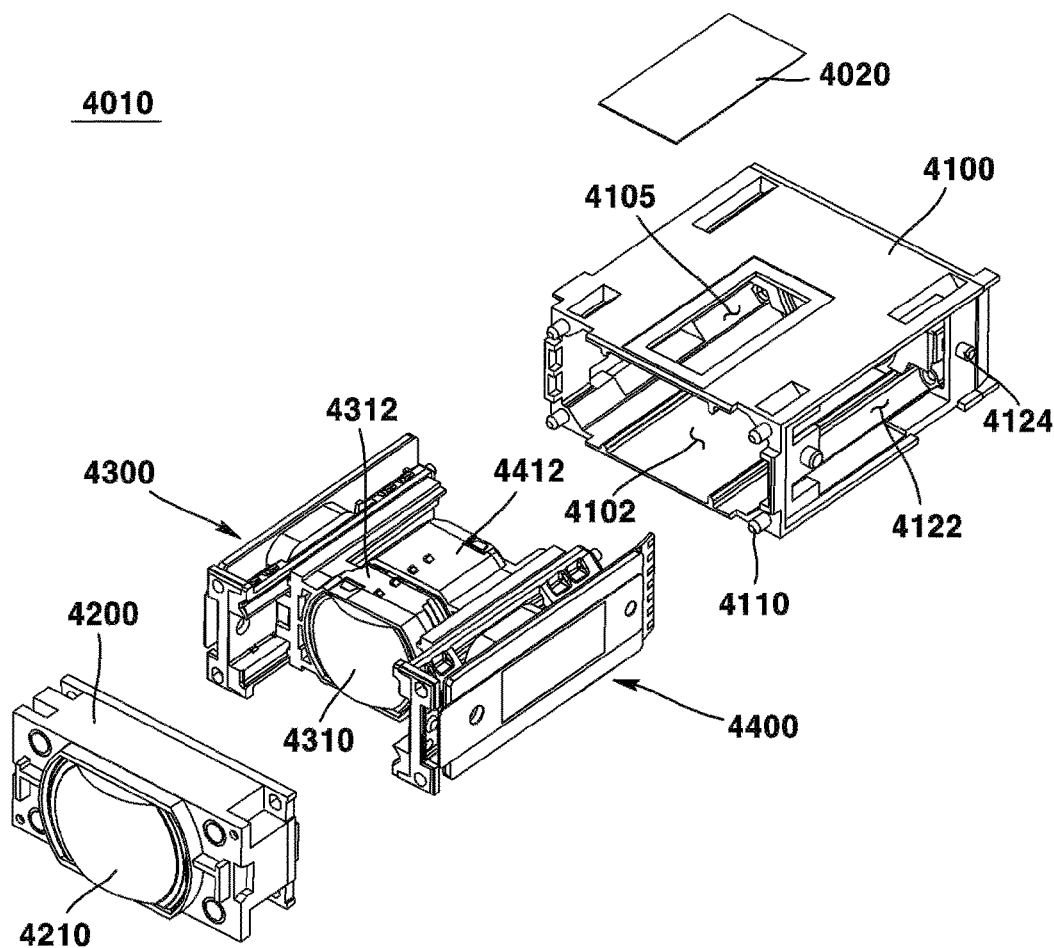
FIG. 65 is a first exploded perspective view of a camera module according to a second embodiment of the present invention.
Figure 66:
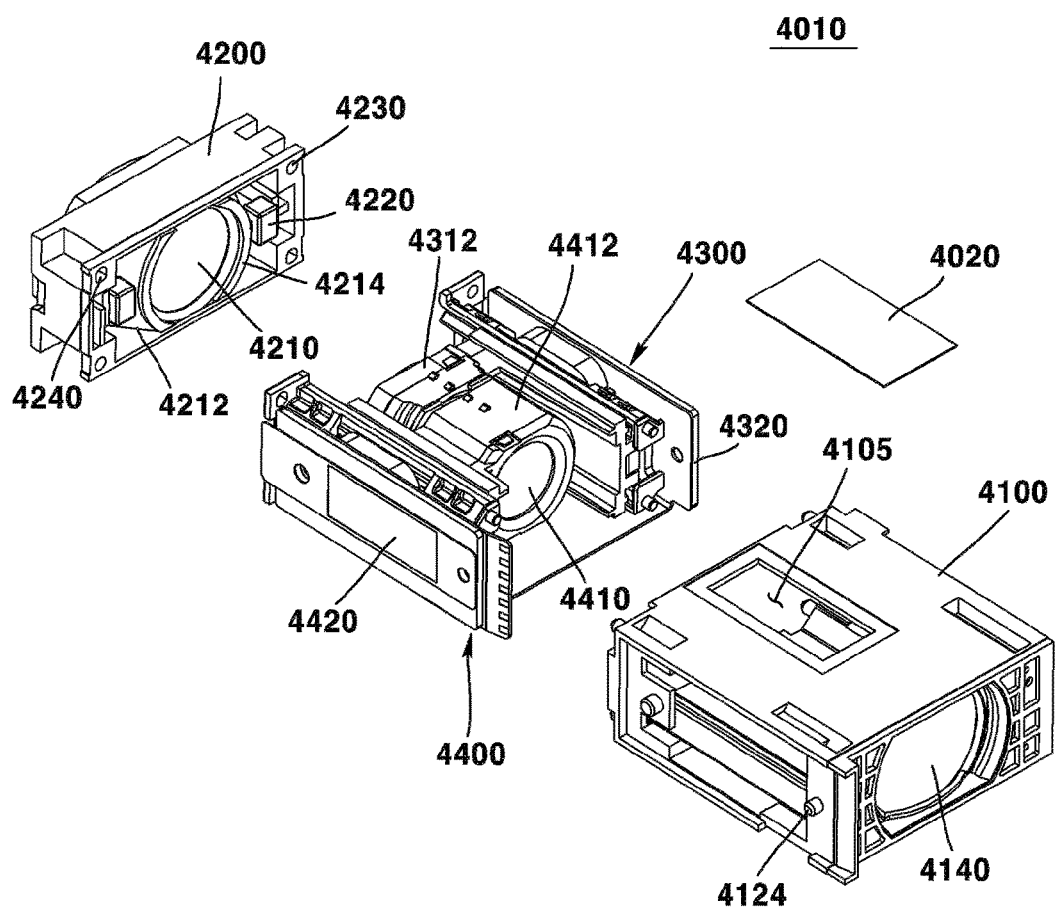
FIG. 66 is a view illustrating FIG. 63 from another angle.
Figure 67:
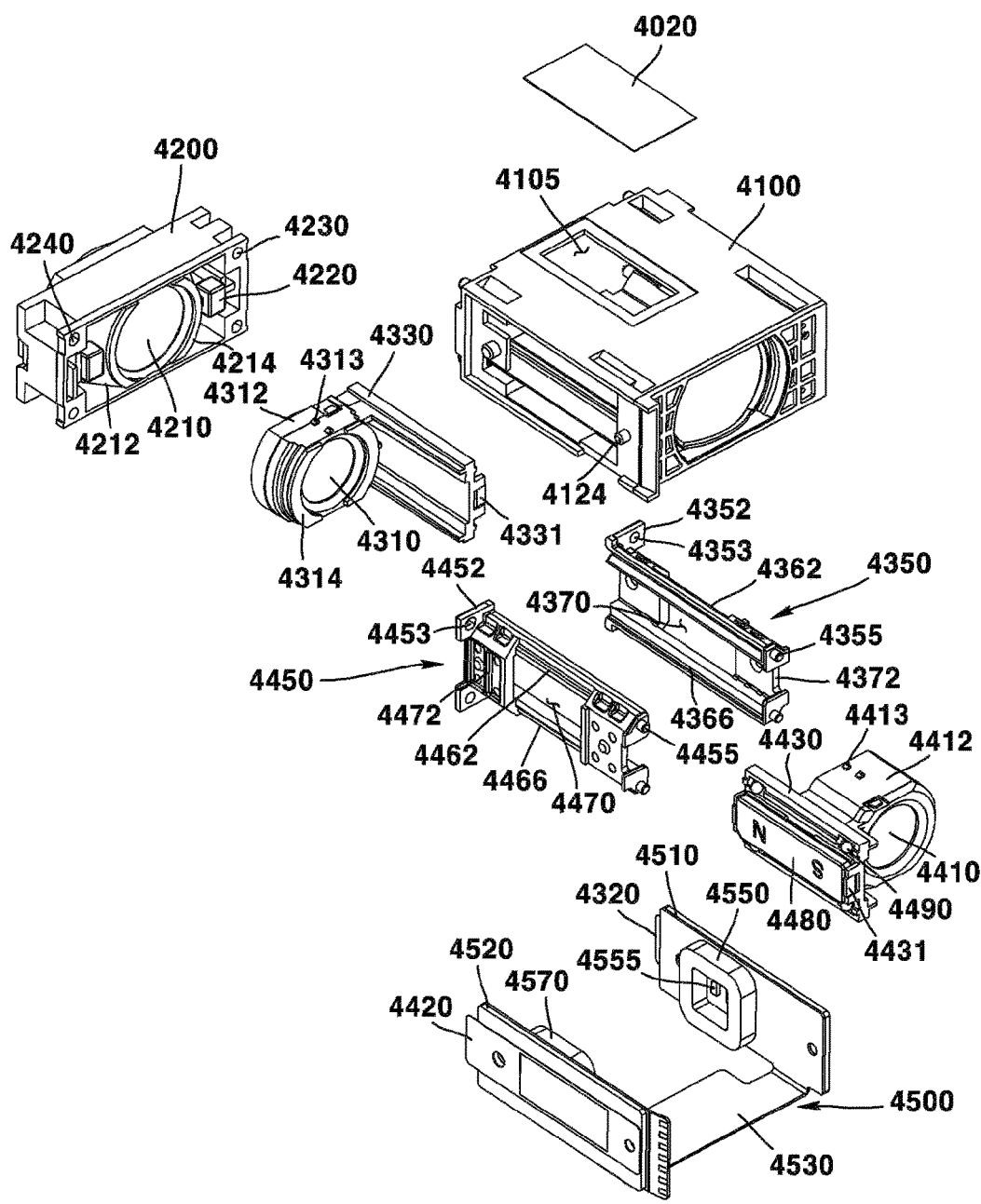
FIG. 67 is a second exploded perspective view of the camera module according to a second embodiment of the present invention.
Figure 68:
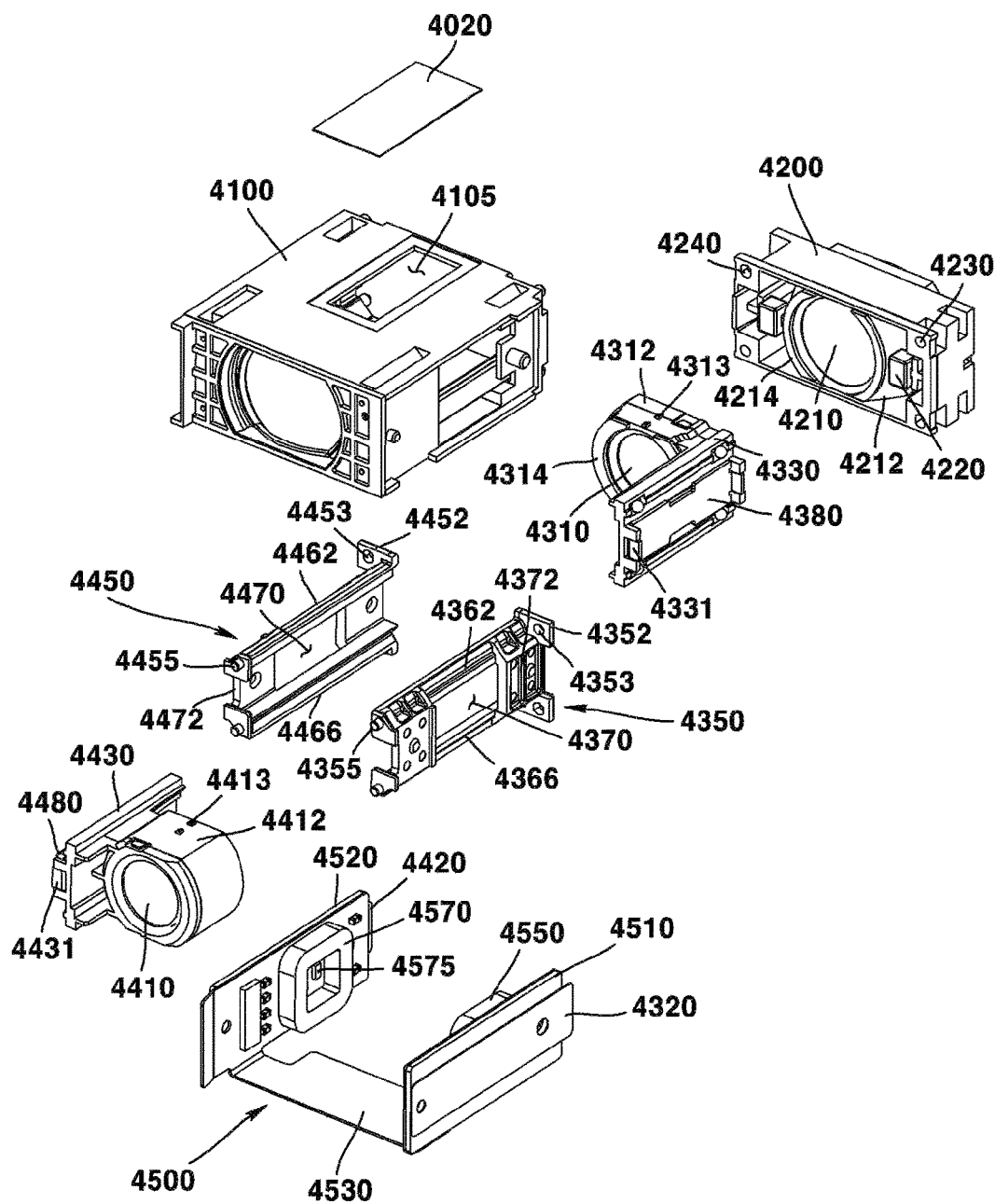
FIG. 68 is a view illustrating FIG. 67 from another angle.
Figure 69:
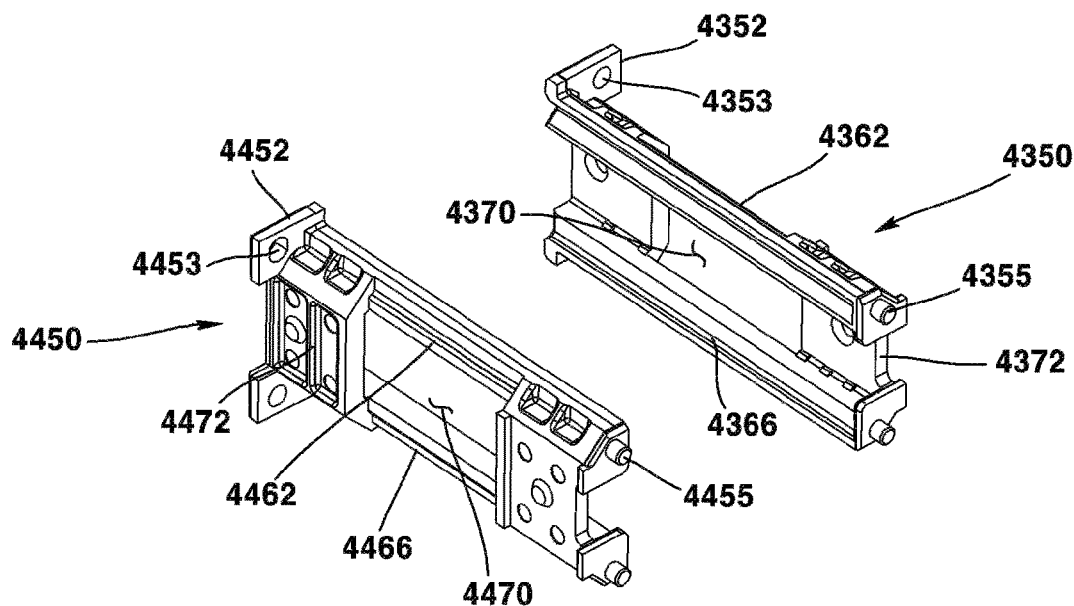
FIG. 69 is a perspective view of a guide part according to a second embodiment of the present invention.
Figure 70:
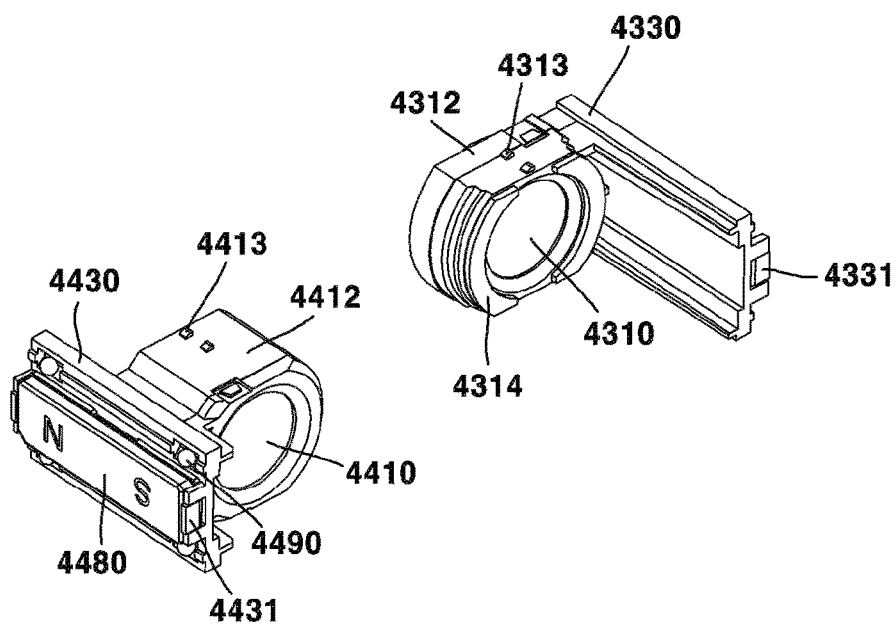
FIG. 70 is an exploded perspective view of a second lens group and a third lens group according to a second embodiment of the present invention.
Figure 71:
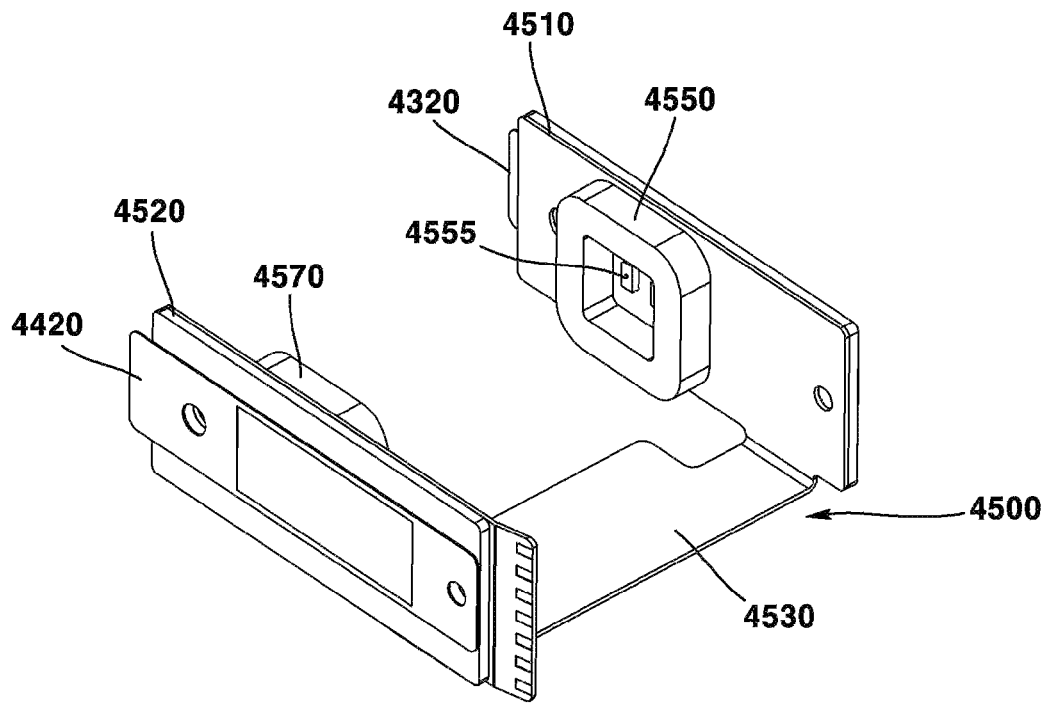
FIG. 71 is a perspective view of a substrate according to a second embodiment of the present invention.

FIG. 60 is a perspective view of a camera module according to a second embodiment of the present invention; FIG. 61 is a perspective view in which the cover is disassembled in FIG. 60; FIG. 62 is a plan view illustrating one side surface of a camera module according to a second embodiment of the present invention; FIG. 63 is a cross-sectional view taken along line B-B' of FIG. 62; FIG. 64 is a cross-sectional view taken along line A-A' of FIG. 62; FIG. 65 is a first exploded perspective view of a camera module according to a second embodiment of the present invention; FIG. 66 is a view illustrating FIG. 63 from another angle; FIG. 67 is a second exploded perspective view of the camera module according to a second embodiment of the present invention; FIG. 68 is a view illustrating FIG. 67 from another angle; FIG. 69 is a perspective view of a guide part according to a second embodiment of the present invention; FIG. 70 is an exploded perspective view of a second lens group and a third lens group according to a second embodiment of the present invention; and FIG. 71 is a perspective view of a substrate according to a second embodiment of the present invention.

Referring to FIGS. 60 to 71, the camera module 4010 according to a second embodiment of the present invention may comprise a housing 4100, a first lens assembly 4200, a second lens assembly 4300, and a third lens assembly 4400, and the substrate 4500, but may be implemented except for some of these configurations, and additional configurations are not excluded.

The camera module 4010 according to the second embodiment of the present invention may comprise: a housing 4100; a first lens assembly 4200; a second lens assembly 4300; a third lens assembly 4400; and a driving unit that moves the second lens assembly 4300 and the third lens assembly 4400, but may be implemented except for some of these configurations, and does not exclude additional configurations.

The camera module 4010 may comprise a housing 4100. The housing 4100 may form the outer appearance of the camera module 4010. The housing 4100 may have a hexahedral shape in which the inside is being exposed. The housing 4100 may have front and rear surfaces open to the outside. At least a portion of a side surface of the housing 4100 may be open to the outside. The second lens assembly 4200, the third lens assembly 4300, and the substrate 4500 may be disposed inside the housing 4100. A space 4102 for accommodating the above-described components may be formed inside the housing 4100.

The camera module 4010 may comprise a lens assembly. The lens assembly may be disposed inside the housing 4100 or on an outer surface of the housing 4100.

The lens assembly may comprise a first lens assembly 4200. The first lens assembly 4200 may be disposed on a front surface of the housing 4100. The first lens assembly 4200 may be coupled to the housing 4100. The first lens assembly 4200 may be coupled to the front of the housing 4100. A rib 4110 being more protruded outward than other regions may be disposed on the front surface of the housing 4100. A groove 4230 to which the rib 4110 is coupled may be formed on a rear surface of the first lens assembly 4200 facing the front surface of the housing 4100. The first lens assembly 4200 and the housing 4110 may be coupled to each other by coupling the rib 4110 and the groove 4230.

The first lens assembly 4200 may be disposed in front of the second lens assembly 4300. The first lens assembly 4200 may comprise a first lens group 4210. The first lens group 4210 may comprise at least one lens. The first lens group 4210 may be a D-cut lens. A first lens barrel 4212 accommodating the first lens group 4210 may be disposed inside the first lens assembly 4200. The first lens group 4210 may be disposed inside the first lens barrel 4212. A first shock absorbing part 4214 for absorbing an impact with a second lens assembly 4300, which will be described later, may be disposed on a rear surface of the first lens barrel 4212. The first shock absorbing part 4214 may be formed of a rubber material, and may absorb shock generated when it comes into contact with the second lens assembly 4300. The first shock absorbing part 4214 may comprise pluralities of regions having an arc shape, and the pluralities of regions may be disposed to face each other centered about the first lens group 4210.

A limiting part 4220 may be formed on a rear surface of the first lens assembly 4200 to limit a movement distance of the second lens assembly 4300, which will be described later, by being more protruded rearward than other regions. The limiting part 4220 may be made of a rubber material.

The first lens group 4210 may be a fixed lens being fixed on the front surface of the housing 4100.

The lens assembly may comprise a second lens assembly 4300. The second lens assembly 4300 may be disposed inside the housing 4100. The second lens assembly 4300 may be aligned with the first lens assembly 4200 and the third lens assembly 4400. The second lens assembly 4300 may be disposed between the first lens assembly 4200 and the third lens assembly 4400. The second lens assembly 4300 may move in an optical axis direction by electromagnetic interaction between the first driving unit 4380 and the second driving unit 4550. The movement of the second lens assembly 4300 in the optical axis direction may be guided by the first guide part 4350.

The second lens assembly 4300 may comprise a second lens barrel 4312 on which a second lens group 4310 is disposed, and a first side surface 4330 disposed on one side of the second lens barrel 4312. The second lens barrel 4312 may have a cylindrical shape. The second lens group 4310 may be accommodated inside the second lens barrel 4312. The second lens group 4310 may comprise at least one lens. A second shock absorbing part 4314 for absorbing an impact with a third lens assembly 4400, which will be described later, may be disposed on a rear surface of the second lens barrel 4312. The second shock absorbing part 4314 is made of rubber. It is formed of a material and can absorb an impact generated when it comes into contact with the third lens assembly 4400. The second shock absorbing part 4314 may comprise pluralities of regions having an arc shape, and the pluralities of regions may be disposed to face the second lens group 4310 as a center.

The first side surface 4330 may be formed in a square plate shape. The second lens barrel 4312 may be disposed on an inner surface of the first side surface 4330. The second lens barrel 4312 may be disposed adjacent to a front end of the first side 4330. The first side surface 4330 may be formed integrally with the second lens barrel 4312. A first driving unit 4380 may be disposed on an outer surface of the first side surface 4330. The first side surface 4330 may be protruded outward to form a first support part 4331 supporting the side surface of the first driving unit 4380. A firstball 4390 may be disposed on an outside of the disposed region of the first driving unit 4380 among the outer surfaces of the first side surface 4330. The first ball 4390 may be rotated along an inner surface of a first guide part 4350, which will be described later. Accordingly, the second lens assembly 4300 may slide against the first guide part 4350. Pluralities of the first balls 4390 may be provided to be spaced apart from one another. For example, four of the first balls 4390 are provided, two are disposed in a region adjacent to the front end of the first side surface 4330, and two may be disposed in a region adjacent to the rear end of the first side surface 4330. The four first balls 4390 may be disposed in each corner region of an outer surface of the first side surface 4330. The length of the first side surface 4330 in an optical axis direction may be longer than length of the second lens barrel 4312 in an optical axis direction. The length of the first side surface 4330 in an optical axis direction may be greater than the sum of the lengths of the second lens barrel 4312 and a third lens barrel 4412, which will be described later, in an optical axis direction.

The lens assembly may comprise a third lens assembly 4400. The third lens assembly 4400 may be disposed inside the housing 4100. The third lens assembly 4400 may be aligned with the first lens assembly 4200 and the second lens assembly 4300. The third lens assembly 4400 may be disposed at a rear direction the second lens assembly 4300. The third lens assembly 4400 may move in an optical axis direction by electromagnetic interaction between the third driving unit 4480 and the fourth driving unit 4570. The movement of the third lens assembly 4400 in the optical axis direction may be guided by the second guide part 4450.

The third lens assembly 4400 may comprise a third lens barrel 4412 on which a third lens group 4410 is disposed, and a second side surface 4430 disposed on one side of the third lens barrel 4412. The third lens group 4410 may be accommodated inside the third lens barrel 4412. The third lens group 4410 may comprise at least one lens.

The second side surface 4430 may be formed in a square plate shape. The third lens barrel 4412 may be disposed on an inner surface of the second side surface 4430. The third lens barrel 4412 may be disposed adjacent to a rear end of the second side surface 4430. The second side surface 4430 may be formed in one body with the third lens barrel 4412. The third driving unit 4480 may be disposed on an outer surface of the second side surface 4430. The second side surface 4430 may be protruded outward to form a second support portion 4431 supporting a side surface of the third driving unit 4480. A second ball 4490 may be disposed on an outside of the disposed region of the second driving unit 4480 among the outer surfaces of the second side surface 4430. The second ball 4490 may be rotated along an inner surface of a second guide part 4450, which will be described later. Accordingly, the third lens assembly 4400 may slide against the second guide part 4450. Pluralities of the second balls 4490 may be provided to be spaced apart from one another. For example, four second balls 4490 are provided, two are disposed in a region adjacent to the front end of the second side surface 4430, and two may be disposed in a region adjacent to the rear end of the second side surface 4430. The four second balls 4490 may be disposed in each corner region of an outer surface of the second side surface 4430. The length of the second side surface 4430 in an optical axis direction may be longer than the length of the third lens barrel 4412 in an optical axis direction. The length of the second side surface 4430 in an optical axis direction may be greater than the sum of the lengths of the second lens barrel 4312 and the third lens barrel 4412 in an optical axis direction.

Meanwhile, a fourth lens 4140 may be disposed on a rear surface of the housing 4100 being disposed at a rear side of the third lens barrel 4412. The fourth lens 4140 may be disposed to face the first lens 4210, the second lens 4310, and the third lens 4410 in an optical axis direction. The fourth lens 4140 may be fixed in a way similar to the first lens 4210.

In addition, a zooming function may be implemented by the movement of the second lens 4310 and the third lens 4410 in an optical axis direction, but is not limited thereto, and an auto focusing (AF) function may be implemented by movement of the 4410 in an optical axis direction. In addition, a zooming function may be implemented by moving one of the second lens 4310 and the third lens 4410, and an auto focusing function may be implemented by moving one of other lenses.

The camera module 4010 may comprise a guide part. The guide part may be disposed inside the housing 4100. The guide part may be assembled inside the housing 4100. The guide part may guide the movement of the second lens assembly 4300 and the third lens assembly 4400 in an optical axis direction.

The guide part may comprise a first guide part 4350. The first guide part 4350 may be disposed inside the housing 4100. The first guide part 4350 may be disposed on one side of the second and third lens assemblies 4300 and 4400. The first guide part 4350 may be disposed outside the first side surface 4330.

The front surface of the first guide part 4350 is coupled to a rear surface of the first lens assembly 4200, and the rear surface of the first guide part 4350 may be coupled to the bottom surface of the space 4102 inside the housing 4100. To this end, a coupling part 4352 having a hole 4353 through which the rib 4110 passes may be disposed at a front end of the first guide part 4350. Accordingly, the rib 4110 of the housing 4100 may penetrate through the hole 4353 to be coupled to the groove 4230. A rib 4355 being protruded more rearward than other regions may be formed on a rear surface of the first guide part 4350. A groove (not shown) to which the rib 4355 is coupled may be disposed on a bottom surface of the housing 4100 facing the rib 4355. With the above described structure, the first guide part 4350 may be firmly fixed to a space 4102 inside the housing 4100.

The first guide part 4350 may comprise a first opening 4370 penetrating from an inner surface to an outer surface. The first driving unit 4380 and the second driving unit 4550 may be disposed to face each other in a direction perpendicular to the optical axis direction through the first opening 4370.

First grooves 4364 and 4368 may be formed on an inner surface of the first guide part 4350. The first ball 4390 may be slidably moved or shiftably moved along the first grooves 4364 and 4368. The first grooves 4364 and 4368 may be disposed on the guide lines 4362 and 4366. In detail, the first guide part 4350 may comprise a first guide line 4362 and a second guide line 4366. The first guide line 4362 and the second guide line 4366 may be disposed parallel to each other, and the first opening 4370 may be disposed therebetween. The lengthwise directions of the first guide line 4362 and the second guide line 4366 may be defined in an optical axis direction.

A first-first groove 4364 through which the first ball 4390 moves may be formed on an inner surface of the first guide line 4362 facing the first side surface 4330. A first-second groove 4368 through which the first ball 4390 moves may be formed on an inner surface of the second guide line 4366 facing the first side surface 4330.

The first grooves 4364 and 4368 may be in contact with at least a portion of the first ball 4390. One of the first grooves 4364 and 4368 is in contact with at least a portion of the first balls 4390 at one point, and the other of the first grooves 4364 and 4368 may be in contact with a portion of the other of the first balls 4390 at with two points. As an example, the first-first groove 4364 has a letter "L" shape in cross section, and may be in contact with the first ball 4390 at one point, and the first-second groove 4368 has a letter "V" shape in cross section and may be in contact with the first ball 4390 at two points. According to a second embodiment of the present invention, since four of the first balls 4390 are disposed in each corner region of an outer surface of the first side surface 4330, the two first balls 4390 disposed to face the first guide line 4362 are being moved along the first-first groove 4364, and the two first balls 4390 disposed to face the second guide line 4366 may be moved along the first-second groove 4368.

Meanwhile, the first guide part 4350 may comprise a connection part 4372 connecting the first guide line 4362 and the second guide line 4366. The connection part 4372 may be screw-coupled to an inner surface of the housing 4100. The connection part 4372 is provided in plurality, and may be respectively disposed on both sides of the first opening 4370.

The guide part may comprise a second guide part 4450. The second guide part 4450 may be disposed inside the housing 4100. The second guide part 4450 may be disposed on the other side of the second and third lens assemblies 4300 and 4400. The second guide part 4450 may be disposed outside the second side surface 4430.

A front surface of the second guide part 4450 is coupled to a rear surface of the first lens assembly 4200, and a rear surface of the second guide part 4450 may be coupled to a bottom surface of the space 4102 inside the housing 4100. To this end, a coupling portion 4452 having a hole 4453 through which the rib 4110 penetrates may be disposed at a front end of the second guide part 4450. Accordingly, the rib 4110 of the housing 4100 may penetrate through the hole 4453 to be coupled to the groove 4230. A rib 4455 being more protruded rearward than other regions may be formed on a rear surface of the second guide part 4450. A groove (not shown) to which the rib 4455 is coupled may be disposed on a bottom surface of the housing 4100 facing the rib 4455. With the above described structure, the second guide part 4450 may be firmly fixed to the space 4102 inside the housing 4100.

The second guide part 4450 may comprise a second opening 4470 penetrating from an inner surface to an outer surface. The third driving unit 4480 and the fourth driving unit 4570 may be disposed to face each other in a direction perpendicular to the optical axis direction through the second opening 4470.

Second grooves 4464 and 4468 may be formed on an inner surface of the second guide part 4450. The second ball 4490 may be slidably moved or shiftably moved along the second grooves 4464 and 4468. The second grooves 4464 and 4468 may be disposed on the guide lines 4462 and 4466. In detail, the second guide part 4450 may comprise a third guide line 4462 and a fourth guide line 4466. The third guide line 4462 and the fourth guide line 4466 are disposed parallel to one another, and the second opening 4470 may be disposed therebetween. The lengthwise directions of the third guide line 4462 and the fourth guide line 4466 may be defined in an optical axis direction.

A second-first groove 4464 through which the second ball 4490 moves may be formed on an inner surface of the third guide line 4462 facing the second side surface 4430. A second-second groove 4468 through which the second ball 4490 moves may be formed on an inner surface of the fourth guide line 4466 facing the second side surface 4330.

The second grooves 4464 and 4468 may be in contact with at least a portion of the second ball 4490. One of the second grooves 4464 and 4468 may be in contact with a portion of the second balls 4490 at one point, and the other one of the second grooves 4464 and 4468 may be in contact with another portion of the second ball 4390 at two points. For example, the second-first groove 4464 has a "V" shape in cross section, and can contact the second ball 4490 at two points, the second-second groove 4468 has a letter "L" shape in cross section and may be in contact with the second ball 4490 at one point. According to a second embodiment of the present invention, since four of the second balls 4490 are disposed in each corner region of the outer surface of the second side surface 4430, the two first balls 4490 disposed to face the third guide line 4462 are moved along the second-first groove 4464, and the two second balls 4490 disposed to face the fourth guide line 4466 may move along the second-second groove 4468.

Meanwhile, the second guide part 4450 may comprise a connection portion 4472 connecting the third guide line 4462 and the fourth guide line 4466. The connection portion 4472 may be screw-coupled to an inner surface of the housing 4100. The connection portion 4472 is provided in plurality, and may be respectively disposed on both sides of the second opening 4470.

The camera module 4010 may comprise a first driving unit 4380. The first driving unit 4380 may be disposed in the second lens assembly 4300. The first driving unit 4380 may comprise a magnet. The first driving unit 4380 may be disposed to face the second driving unit 4550. The first driving unit 4380 may move the second lens assembly 4300 in an optical axis direction through electromagnetic interaction with the second driving unit 4550. The front side of the first driving unit 4380 may be magnetized in a first polarity and the rear side may be magnetized in a second polarity. The first driving unit 4380 may be formed in a hexahedral shape. Meanwhile, a yoke (not shown) is interposed between the first side surface 4330 and the first driving unit 4380 to prevent leakage of the magnetic field of the first driving unit 4380.

The camera module 4010 may comprise a third driving unit 4480. The third driving unit 4480 may be disposed in the third lens assembly 4400. The third driving unit 4480 may comprise a magnet. The third driving unit 4480 may be disposed to face the fourth driving unit 4570. The third driving unit 4480 may move the third lens assembly 4400 in an optical axis direction through electromagnetic interaction with the fourth driving unit 4570. The front side of the third driving unit 4480 may be magnetized in a first polarity and the rear side may be magnetized in a second polarity. The third driving unit 4480 may be formed in a hexahedral shape. Meanwhile, a yoke (not shown) is interposed between the second side surface 4430 and the third driving unit 4480 to prevent leakage of the magnetic field of the third driving unit 4480.

The camera module 4010 may comprise a second driving unit 4550. The second driving unit 4550 may be disposed inside the housing 4100. The second driving unit 4550 may be disposed in the first opening 4370. The second driving unit 4550 may comprise a coil. The second driving unit 4550 may be coupled to a substrate 4500, which will be described later. The second driving unit 4550 may receive current from the substrate 4500. The second driving unit 4550 may have a "D" shape in cross section.

The camera module 4010 may comprise a fourth driving unit 4570. The fourth driving unit 4570 may be disposed inside the housing 4100. The fourth driving unit 4570 may be disposed in the second opening 4470. The fourth driving unit 4570 may comprise a coil. The fourth driving unit 4570 may be coupled to a substrate 4500, which will be described later. The fourth driving unit 4570 may receive current from the substrate 4500. The fourth driving unit 4570 may have a "D" shape in cross section.

The camera module 4010 may comprise yokes 4320 and 4420. The yokes 4320 and 4420 may be disposed outside the second driving unit 4550 and the fourth driving unit 4570. The yokes 4320 and 4420 may be coupled to a substrate 4500, which will be described later. The yokes 4320 and 4420 may prevent leakage of an electric field between the second driving unit 4550 and the fourth driving unit 4570.

The yokes 4320 and 4420 may comprise a first yoke 4320. The first yoke 4320 may be coupled to the substrate 4500. The first yoke 4320 may be disposed outside the second driving unit 4550. At least a portion of the substrate 4500 may be disposed between the first yoke 4320 and the second driving unit 4550. The first yoke 4320 may be coupled to one side surface of the housing 4100.

The yokes 4320 and 4420 may comprise a second yoke 4420. The second yoke 4420 may be coupled to the substrate 4500. The second yoke 4420 may be disposed outside the fourth driving unit 4570. At least a portion of the substrate 4500 may be disposed between the second yoke 4420 and the fourth driving unit 4570. The second yoke 4420 may be coupled to the other side surface of the housing 4100.

A rib 4124 may be formed on a side surface of the housing 4100 so that the yokes 4320 and 4420 are coupled, and a hole through which the rib 4124 penetrates may be formed in the yokes 4320 and 4420.

The camera module 4010 may comprise a substrate 4500. The substrate 4500 may be disposed in the housing 4100. The second driving unit 4550 and the fourth driving unit 4570 may be coupled to the substrate 4500. Sensors 4555 and 4575 may be disposed on the substrate 4500. The substrate 4500 may be electrically connected to the second driving unit 4550, the fourth driving unit 4570, and the sensors 4555 and 4575 to supply current.

The substrate 4500 may comprise a printed circuit board (PCB). The substrate 4500 may comprise a flexible printed circuit board (FPCB).

The substrate 4500 may comprise a first substrate 4510, a second substrate 4520, and a connection substrate 4530. The first substrate 4510 may be disposed outside the first side surface 4330. The first substrate 4510 may be disposed parallel to the first side surface 4330. The second driving unit 4550 may be disposed on an inner surface of the first substrate 4510, and the first yoke 4320 may be disposed on an outer surface of the first substrate 4510.

The second substrate 4520 may be disposed outside the second side surface 4430. The second substrate 4520 may be disposed parallel to the second side surface 4430. The fourth driving unit 4570 may be disposed on an inner surface of the second substrate 4520, and the second yoke 4420 may be disposed on an outer surface of the second substrate 4520. The second substrate 4520 may be disposed parallel to the first substrate 4510.

The connection substrate 4530 connects the first substrate 4510 and the second substrate 4520, and may be formed as one body with the first substrate 4510 and the second substrate 4520. The connection substrate 4530 may be vertically disposed with respect to the first substrate 4510 or the second substrate 4520.

The camera module 4010 may comprise sensors 4555 and 4575. The sensors 4555 and 4575 may comprise a first sensor 4555 being disposed on an inner surface of the first substrate 4510 and a second sensor 4575 being disposed on the inner surface of the second substrate 4520. The sensors 4555 and 4575 may comprise Hall sensors. Based on the information sensed by the sensors 4555 and 4575, the control unit may detect the positions of the second lens assembly 4300 and the third lens assembly 4400.

The first sensor 4555 may be disposed at an inner side of the second driving unit 4550. The first sensor 4555 is disposed to face the first driving unit 4380 and may sense the first driving unit 4380.

The second sensor 4575 may be disposed at an inner side of the fourth driving unit 4570. The second sensor 4575 is disposed to face the third driving unit 4480, and can detect the third driving unit 4480.

Meanwhile, in a second embodiment of the present invention, it was taken as an example that the positions of the second lens assembly 4300 and the third lens assembly 4400 are detected by the sensors 4555 and 4575 through the magnetic field of the first driving unit 4380 or the third driving unit 4480, but in each of the second lens assembly 4300 and the third lens assembly 4400, separate sensor magnets (not shown) for sensing a magnetic field by the first sensor 4555 or the second sensor 4575 may be additionally provided.

The camera module 4010 according to a second embodiment of the present invention is characterized in that the optical performance of the second lens 4310 and the third lens 4410 is measured through the inclined surfaces disposed on an outer surface of the second lens assembly 4300 and the third lens assembly 4400.

Figure 72:
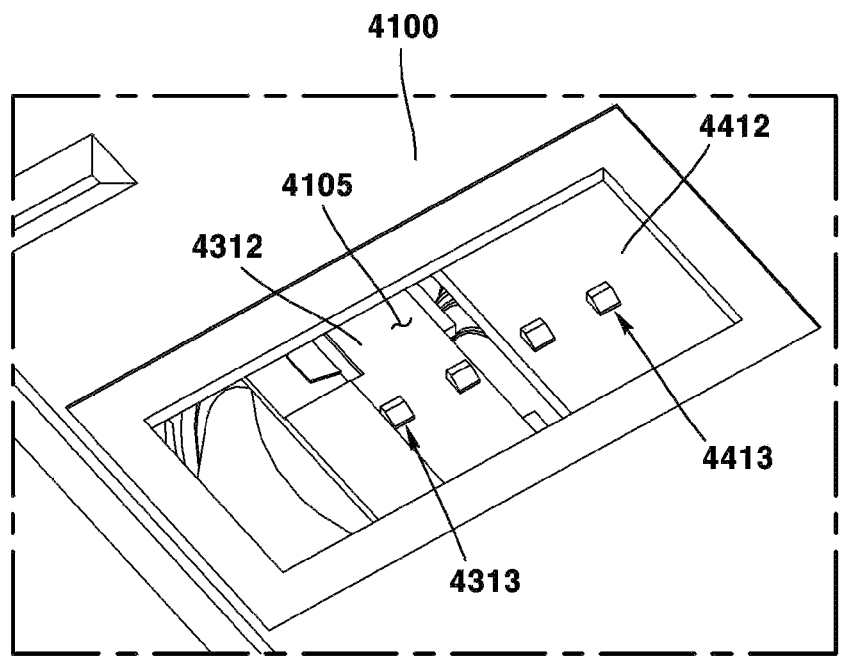
FIG. 72 is a perspective view illustrating an installation state of a second lens assembly and a third lens assembly inside a housing according to a second embodiment of the present invention.
Figure 73:
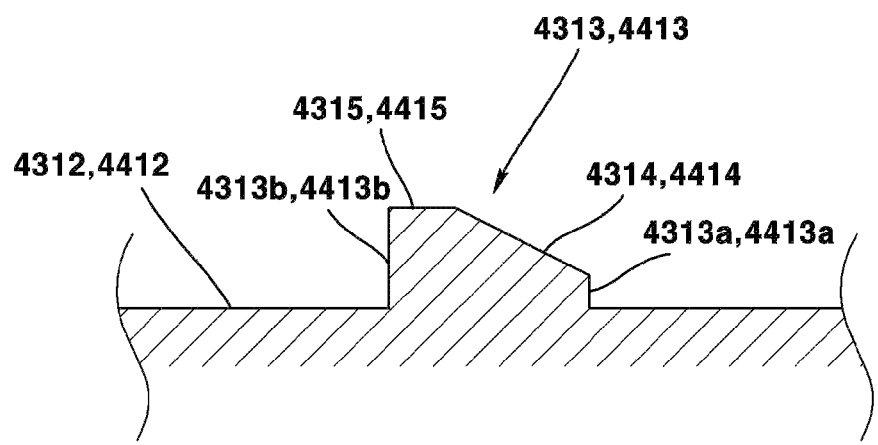
FIG. 73 is a cross-sectional view of a projection according to a second embodiment of the present invention.

FIG. 72 is a perspective view illustrating an installation state of a second lens assembly and a third lens assembly inside a housing according to a second embodiment of the present invention; and FIG. 73 is a cross-sectional view of a projection according to a second embodiment of the present invention.

Referring to FIGS. 72 and 73, the second lens assembly 4300 and the third lens assembly 4400 according to a second embodiment of the present invention may comprise protrusions 4313 and 4413, respectively.

The protrusions 4313 and 4413 may comprise a first protrusion 4313 disposed on a side surface of the second lens barrel 4312 and a second protrusion 4413 disposed on a side surface of the third lens barrel 4412. The housing 4100 may comprise an opening 4105 for exposing the second lens barrel 4312 and the third lens barrel 4412 to the outside. The protrusions 4313 and 4413 may be exposed to the outside through the opening 4105. That is, the protrusions 4313 and 4413 may be viewed from the outside of the housing 4100 through the opening 4105 for performance testing. In some cases, a structure being protruded to the outside of the housing 4100 may be implemented by adjusting the protrusion height of the protrusions 4313 and 4413.

The protrusions 4313 and 4413 may comprise inclined surfaces 4314 and 4414. The inclined surfaces 4314 and 4414 may be disposed on outer surfaces of the protrusions 4313 and 4413 being protruded toward the outside.

In detail, the protrusions 4313 and 4413 have side surfaces defined through side surfaces of one side ends 4313$a$ and 4413$a$ and side surfaces of other side ends 4313$b$ and 4413$b$, and inclined surfaces 4314 and 4414 may be disposed between the one side ends 4313$a$ and 4413$a$ and the other side ends 4313$b$ and 4413$b$. For example, the inclined surfaces 4314 and 4414 may have a shape in which the length being protruded from the side surface of the second lens barrel 4312 or the side surface of the third lens barrel 4412 may be increased as the one side ends 4313$a$ and 4413$a$ are traveling toward the other side ends 4313$b$ and 4413$b$. Accordingly, the heights of the side ends 4313$a$ and 4413$a$ and the other side ends 4313$b$ and 4413$b$ defined by a side surface of the second lens barrel 4312 or a side surface of the third lens barrel 4412 may be different from each other.

Meanwhile, in FIG. 73, the one side ends 4313$a$ and 4413$a$ is protruded by a predetermined distance from a side surface of the second lens barrel 4312 or a side surface of the third lens barrel 4412 as an example, but is not limited thereto, and the one side ends 4313$a$ and 4413$a$ may be defined by a side surface of the second lens barrel 4312 or a side surface of the third lens barrel 4412.

According to the above structure, the light irradiated through the light emitting unit disposed outside is reflected through the inclined surfaces 4314 and 4414, and the reflected light may be detected by the light receiving unit. Accordingly, optical performance such as decentering or lens tilting of the second lens group 4310 or the third lens group 4410 can be measured.

As illustrated, the inclined surfaces 4314 and 4414 may be formed on a portion of outer surfaces of the protrusions 4313 and 4413, and flat surfaces 4315 and 4415 or a curved surface having a predetermined curvature may be formed on the remaining portions.

Unlike this, the inclined surfaces 4314 and 4414 may be formed on the entire outer surface of the protrusions 4313 and 4413, and accordingly, the inclined surfaces 4314 and 4414 may connect one side end and the other side end of the protrusions 4313 and 4413.

In addition, the inclined surfaces 4314 and 4414 may comprise curved surfaces having a predetermined curvature.

Meanwhile, when the performance measurement is completed, since the space inside the housing 4100 must be sealed from other regions, the camera module 4010 may comprise a cover 4020 that covers the opening 4105. For example, the cover 4020 may be a tape to which an adhesive is applied.

In addition, as illustrated, the first protrusion 4313 and the second protrusion 4413 are provided in plurality, respectively, so as to be disposed to be spaced apart from a side surface of the second lens barrel 4312 and a side surface of the third lens barrel 4412 in an optical axis direction. At this time, the distance between the pluralities of first protrusions 4313 in an optical axis direction or the distance between the pluralities of second protrusions 4413 in an optical axis direction may be 0.2 mm to 3 mm. For example, the distance between the pluralities of first protrusions 4313 or between the pluralities of second protrusions 4413 in the optical axis direction may be 0.7 mm.

According to the above structure, not only it is possible to easily measure the optical performance of the lens through the protrusion during the assembly process of the camera module, but also there is an advantage in that it is easy to maintain the components in the module during the use process.

Meanwhile, in the second embodiment of the present invention, the first protrusion 4313 and the second protrusion 4413 have the same shape as an example, but are not limited thereto, and shapes of the first protrusion 4313 and the second protrusion 4413 may be different.

As an example, the angle of the inclined surface 4314 disposed on the first protrusion 4313 may be different from the angle of the inclined surface 4414 disposed on the second protrusion 4413.

As another example, the first inclined surface 4314 disposed in the first protrusion 4313 may be disposed at one side end of the first protrusion 4313, and the second inclined surface 4414 disposed in the second protrusion 4413 may be disposed at the other side end of the second protrusion 4413. Here, one side end of the first protrusion 4313 and the other side end of the second protrusion 4413 may be symmetrical regions with respect to the optical axis direction.

Furthermore, of course it is possible that the shape between the pluralities of first protrusions 4313 or the shape between the pluralities of second protrusions 4413 may be implemented to have different shapes comprising the above described structures.

Figure 74:
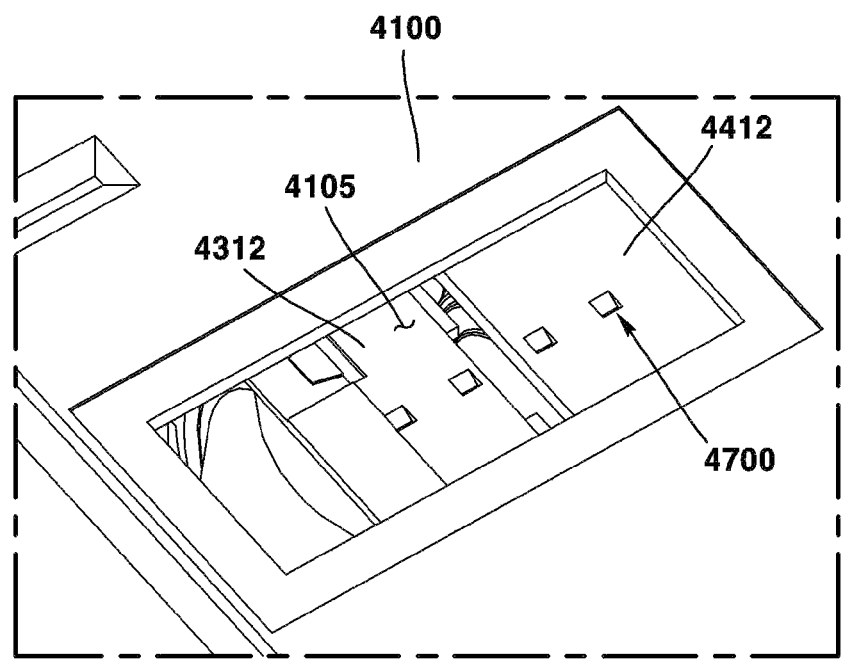
FIGS. 74 and 75 are views illustrating a modified embodiment of forming an inclined surface in a camera module according to a second embodiment of the present invention.
Figure 75:
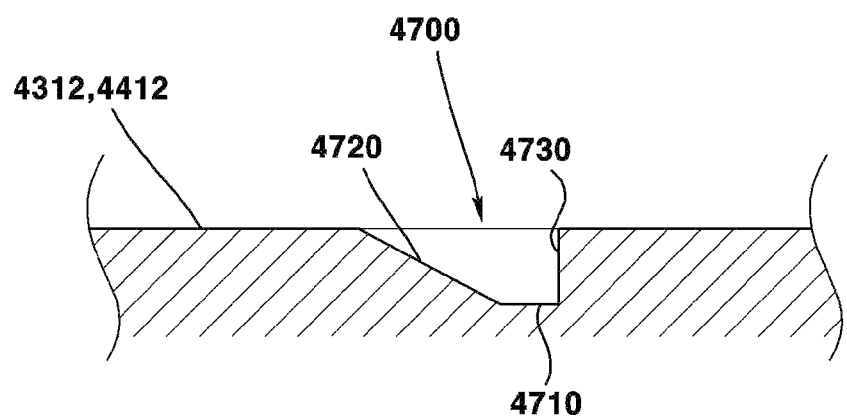

FIGS. 74 and 75 are views illustrating a modified embodiment of forming an inclined surface in a camera module according to a second embodiment of the present invention.

Referring to FIGS. 74 and 75, the second lens assembly 4300 and the third lens assembly 4400 may comprise a groove 4700. This modified embodiment may be implemented through the bottom surface of the groove 4700.

In detail, on the bottom surface of the groove 4700, an inclined surface 4720 may be formed in a shape so that the distance to the side surface of the second lens barrel 4312 or the third lens barrel 4412 is increased or decreased as it travels from one side end to the other side end. Accordingly, since light is reflected through the inclined surface 4720, the optical performance of the camera module 4010 can be tested.

Pluralities of the grooves 4700 may be provided to be spaced apart from the side surface of the second lens barrel 4312 in an optical axis direction or disposed to be spaced apart from the side surface of the third lens barrel 4412 in an optical axis direction. Similarly, a distance between the pluralities of grooves 4700 may be 0.2 mm to 3 mm. For example, the distance between the pluralities of grooves 4700 may be 0.7 mm.

In addition, the inclined surface 4720 may be formed on the entire bottom surface of the groove 4700, but as illustrated, the inclined surface 4720 is formed on a portion of the bottom surface of the groove 4700, and the remaining portion may be formed with a flat surface 4710 or a curved surface having a predetermined curvature. Accordingly, an inner circumferential surface 4730 of the groove 4700 connecting the side surface of the second lens barrel 4312 or the side surface of the third lens barrel 4412 and the flat surface 4710 may be formed to be perpendicular to the flat surface 4710.

Meanwhile, of course it is possible that the inclined surface 4720 may also be implemented as a curved surface having a predetermined curvature Meanwhile, in a second embodiment of the present invention, the groove 4700 disposed in the second lens barrel 4312 and the groove 4700 disposed in the third lens barrel 4412 are the same as an example, but are not limited thereto, and the shape of the groove 4700 disposed in the second lens barrel 4312 and the shape of the groove 4700 disposed in the third lens barrel 4412 may be different from each other.

As an example, the angle of the inclined surface of the groove 4700 disposed in the second lens barrel 4312 may be different from the angle of the inclined surface of the groove 4700 disposed in the third lens barrel 4412.

As another example, an inclined surface of the groove 4700 disposed in the second lens barrel 4312 may be disposed at one side end of the groove 4700, and an inclined surface of the groove 4700 disposed in the third lens barrel 4412 may be disposed on the other side end of the groove 4700. Here, one side end and the other side end of the groove 4700 may be a symmetrical region with respect to the optical axis direction.

Furthermore, of course it is possible that a shape between pluralities of grooves disposed on the second lens barrel 4312 or a shape between pluralities of grooves disposed on the third lens barrel 4412 may also be implemented to have different shapes comprising the above described structures.

Although the first and second embodiments of the present invention have been separately described above, the camera module 4010 of the second embodiment may replace the lens driving device 2000 of the first embodiment. Furthermore, some configurations of the lens driving device 2000 of the first embodiment may be omitted, and some configurations of the camera module 4010 of the second embodiment may be applied. As an example, the protrusions 4313 and 4413 and/or the groove 4700 of the second embodiment may be applied to the lens driving device 2000 of the first embodiment. Conversely, some configurations of the camera module 4010 of the second embodiment may be omitted and some configurations of the lens driving device 2000 of the first embodiment may be applied.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

The invention claimed is:

1. An actuator device comprising:
a housing;
a holder disposed in the housing;
a reflective member disposed on the holder;
a moving plate disposed between the housing and the holder;
a rigid mover coupled to the holder; and
a damper coupled to the rigid mover,
wherein a first portion of the housing is disposed between the rigid mover and the moving plate,
wherein the rigid mover comprises a body portion disposed on an opposite side of the moving plate with respect to the first portion of the housing, a coupling portion extending from the body portion and coupled with the holder, and a protruding portion protruding from the body portion, and
wherein the protruding portion of the rigid mover is coupled with the housing by the damper.

2. The actuator device of claim 1, wherein the housing comprises a groove disposed with at least a portion of the protruding portion.

3. The actuator device of claim 2, wherein the groove of the housing is open to an outside of the housing.

4. The actuator device of claim 2, wherein the protruding portion of the rigid mover comprises a first protruding region protruding to one side and a second protruding region protruding to the other side.

5. The actuator device of claim 4, wherein the groove of the housing comprises a first groove disposed with at least a portion of the first protruding region and a second groove disposed with at least a portion of the second protruding region.

6. The actuator device of claim 2, wherein the groove of the housing is greater than the protruding portion of the rigid mover and is spaced apart from the protruding portion in an initial state and during operation.

7. The actuator device of claim 2, wherein the groove of the housing and the protruding portion of the rigid mover are in contact with each other by an external impact.

8. The actuator device of claim 1, wherein the protruding portion is disposed on a central region of the rigid mover.

9. A camera device comprising:
a printed circuit board;
an image sensor disposed on the printed circuit board;
the actuator device of claim 1; and
a lens disposed on an optical path formed by the reflective member of the actuator device and the image sensor.

10. An optical device comprising:
a main body;
the camera device of claim 9 disposed on the body; and
a display disposed on the main body and configured to output an image photographed by the camera device.

11. An actuator device comprising:
a housing;
a holder disposed in the housing;
a reflective member disposed on the holder;
a moving plate disposed between the housing and the holder;
a rigid mover coupled with the holder; and
a damper connecting the rigid mover and the housing,
wherein a first portion of the housing is disposed between the rigid mover and the moving plate,
wherein the rigid mover comprises a body portion disposed on an opposite side of the moving plate with respect to the first portion of the housing, a coupling portion extending from the body portion and coupled with the holder, and a protruding portion protruding from the body portion, and wherein the damper connects the protruding portion of the rigid mover and the housing.

12. The actuator device of claim 11, wherein the damper is disposed on at least one of an upper portion and a lower portion of the first portion of the housing.

13. The actuator device of claim 11, comprising:
a first magnet disposed on the rigid mover; and
a second magnet disposed on the housing and configured to generate a repulsive force with the first magnet,
wherein at least a portion of the second magnet is disposed between the first magnet and the moving plate, and is disposed on an opposite side of the moving plate with respect to the first portion of the housing.

14. The actuator device of claim 11, wherein the housing comprises a groove,
wherein at least a portion of the protruding portion of the rigid mover is disposed in the groove of the housing, and
wherein at least a portion of the damper is disposed in the groove of the housing and between the protruding portion of the rigid mover and the housing.

15. The actuator device of claim 14, wherein the groove of the housing comprises a first groove portion and a second groove portion recessed from the first groove portion, and
wherein at least a portion of the damper is disposed in the second groove portion of the housing.

16. The actuator device of claim 11, wherein the protruding portion of the rigid mover comprises a first protruding portion formed on an upper surface of the body portion of the rigid mover, and a second protruding portion formed on a lower surface of the body portion of the rigid mover.

17. The actuator device of claim 16, wherein the housing comprises a first surface facing the upper surface of the body portion of the rigid mover, and a second surface facing the lower surface of the body portion of the rigid mover,
wherein the housing comprises a first groove formed on the first surface of the housing, and a second groove formed on the second surface of the housing,
wherein at least a portion of the first protruding portion of the rigid mover is disposed in the first groove of the housing, and
wherein at least a portion of the second protruding portion of the rigid mover is disposed in the second groove of the housing.

18. An actuator device comprising:
a housing;
a holder disposed in the housing;
a reflective member disposed on the holder;
a moving plate disposed between the housing and the holder;
a rigid mover coupled with the holder;
a damper connecting the rigid mover and the housing;
a first magnet disposed on the rigid mover; and
a second magnet disposed on the housing and configured to generate a repulsive force with the first magnet,
wherein a first portion of the housing is disposed between the rigid mover and the moving plate, and
wherein at least a portion of the second magnet is disposed between the first magnet and the moving plate, and is disposed on an opposite side of the moving plate with respect to the first portion of the housing.

19. The actuator device of claim 18, wherein the rigid mover comprises a protruding portion coupled with the housing by the damper, and
wherein the housing comprises a groove disposed with at least a portion of the protruding portion.

20. The actuator device of claim 19, wherein the protruding portion of the rigid mover comprises a first protruding region protruding to one side and a second protruding region protruding to the other side.

* * * * *